US012195179B2

(12) United States Patent
Grip et al.

(10) Patent No.: US 12,195,179 B2
(45) Date of Patent: Jan. 14, 2025

(54) STRUT ASSEMBLY FOR A WING OF AN AIRCRAFT AND METHOD OF USING THE SAME

(71) Applicant: The Boeing Company, Chicago, IL (US)

(72) Inventors: Robert E. Grip, Rancho Palos Verdes, CA (US); Christopher K. Droney, Long Beach, CA (US); Nathaniel J. Noel, North Charleston, SC (US); Charles Daniel Peyton, Summerville, SC (US)

(73) Assignee: The Boeing Company, Arlington, VA (US)

( * ) Notice: Subject to any disclaimer, the term of this patent is extended or adjusted under 35 U.S.C. 154(b) by 64 days.

(21) Appl. No.: 17/980,545

(22) Filed: Nov. 3, 2022

(65) Prior Publication Data

US 2024/0150007 A1 May 9, 2024

(51) Int. Cl.

*B64C 3/18* (2006.01)
*B64C 1/26* (2006.01)
*B64C 3/16* (2006.01)

(52) U.S. Cl.

CPC .................. *B64C 3/18* (2013.01); *B64C 1/26* (2013.01); *B64C 3/16* (2013.01)

(58) Field of Classification Search

CPC .... B64C 1/26; B64C 3/14; B64C 3/16; B64C 3/18; B64C 39/068; B64C 39/08; B64C 3/00; B64C 3/52; E04B 2001/3583; E01D 19/16

See application file for complete search history.

(56) References Cited

U.S. PATENT DOCUMENTS 1,314,536 A * 9/1919 Page .......................... B64C 1/26 244/131
1,370,242 A * 3/1921 Thomas .................... B64C 3/00 244/90 R
4,739,954 A * 4/1988 Hamilton .................. B64C 3/18 244/131

(Continued)

FOREIGN PATENT DOCUMENTS

DE 19522507 A1 * 7/1996 ............... B64C 1/26

OTHER PUBLICATIONS

"Streamlined strut fairings," Ultralight News, Feb. 9, 2006 (Year: 2006).*

*Primary Examiner* — Joshua J Michener
*Assistant Examiner* — Ryan Andrew Yankey

(57) ABSTRACT

There is provided a strut assembly for a wing of an aircraft. The strut assembly has a strut having an outboard end, an inboard end, and an elongate body. The outboard end is coupled to the wing of the aircraft, and the inboard end is coupled to a fuselage of the aircraft. The strut assembly further has at least one tensioner member having a first end coupled to the strut. The strut assembly further has a first fitting element having a through opening receiving a first portion of the strut and a bearing surface facing inboard. The strut assembly further has a second fitting element having a through opening receiving a second portion of the strut and a bearing surface facing outboard. The at least one tensioner member maintains tension in the strut, to keep the strut taut and in tension, to prevent or to minimize drooping of the strut.

20 Claims, 42 Drawing Sheets

(56) References Cited

U.S. PATENT DOCUMENTS

| | | | | |
|---|---|---|---|---|
| 9,598,167 | B2 | 3/2017 | Grip et al. | |
| 10,773,786 | B2 | 9/2020 | Sclafani et al. | |
| 2012/0297694 | A1* | 11/2012 | Kim | E04G 21/12 52/223.13 |
| 2018/0281922 | A1* | 10/2018 | Sclafani | B64C 3/16 |
| 2024/0278902 | A1* | 8/2024 | Grip | B64C 3/18 |

* cited by examiner

| FIG. 7D-1 | FIG. 7D-2 |
|---|---|

STRUT ASSEMBLY FOR A WING OF AN AIRCRAFT AND METHOD OF USING THE SAME

FIELD

The disclosure relates generally to a strut for a wing of an aircraft, and more particularly, to a strut assembly for a wing of an aircraft having a tensioner member to maintain tension in the strut.

BACKGROUND

Wings of an aircraft having strut support, i.e., strut-braced wings, reduce the overall weight of the wing and reduce the bending moment in the inboard wing, where the wing attaches to the fuselage, as compared to wings that do not have strut support, i.e., cantilever wings. With the aircraft in flight, a strut connected to the fuselage of the aircraft and connected to the underside of the wing generally experiences a load condition, such as a tension load, and with the aircraft on the ground the strut experiences a load condition, such as compression load under 1 g (gravitational force) conditions. A strut must also be designed for a −1 g (minus one g) pushover flight condition for the aircraft, which places the strut in axial compression. The amount of axial material in the strut is sized by the tension condition, while the thickness the strut is sized is typically by Euler buckling under the −1 g pushover flight condition.

Known designs of struts exist to address the −1 g pushover flight condition. One known strut design includes a full-span strut that spans and connects between the fuselage of the aircraft and the underside of the wing and that generally has a low aerodynamic drag. However, such full-span struts may be thick and heavy because the buckling length is longer.

Another known strut design includes the addition of one or more jury struts, or auxiliary struts, fastened along a length of a primary strut and substantially normal to an axis of the primary strut, where the primary strut is typically thinner than a full-span strut. Jury struts, or auxiliary struts, break up the buckling length of the primary strut into smaller segments along the length of the primary strut, and save weight because the buckling length is shorter. However, the addition of one or more jury struts, or auxiliary struts, may increase aerodynamic drag of the aircraft.

Yet another known strut member design includes a cable strut that is very thin and light and is connected between the fuselage of the aircraft and the underside of the wing. Although the aerodynamic drag is low with this design, the wing must be sized for the −1 g pushover flight condition as a cantilever wing, and the wing may be heavier to take the −1 g pushover flight condition as a cantilever wing. Under 1 g gravity conditions sitting on the ground, a downward deflection of the wing may cause the cable to droop. In an intermediate loading range, i.e., from 1 g on the ground to 1 g in flight, drooping cables on the wings may vibrate in an uncontrolled manner. Pre-stressing the cables to reduce or eliminate droop under the −1 g pushover flight condition may require larger connection hardware or increased compression in the wing box, which may result in unwanted weight.

Accordingly, there is a need in the art for an improved strut for a wing of an aircraft that is effective in tension while preserving a weight-savings aspect for the wing, that eliminates cable drooping without adding unwanted weight, that avoids excessive tension to the wing to prevent bending stresses, that has a low aerodynamic drag, and that provides advantages over known strut members and strut assemblies.

SUMMARY

Example implementations of the present disclosure provide a strut assembly for a wing of an aircraft and method of using the same. As discussed in the below detailed description, versions of the strut assembly and method may provide significant advantages over known assemblies and methods.

In a version of the disclosure, there is provided a strut assembly for a wing of an aircraft. The strut assembly comprises a strut having an outboard end, an inboard end opposite the outboard end, and an elongate body formed between the outboard end and the inboard end. The outboard end is coupled to the wing of the aircraft, and the inboard end is coupled to a fuselage of the aircraft. The strut assembly further comprises at least one tensioner member having a first end coupled to the strut, a second end opposite the first end, and an extendable body formed between the first end and the second end.

The strut assembly further comprises a first fitting element having a through opening and a bearing surface facing inboard. The through opening of the first fitting element receives a first portion of the strut extending through the first fitting element. The strut assembly further comprises a second fitting element having a through opening receiving a second portion of the strut extending through the second fitting element. The second fitting element has a bearing surface facing outboard and opposite the bearing surface of the first fitting element. The at least one tensioner member maintains tension in the strut, to keep the strut taut and in tension, to prevent or to minimize drooping of the strut.

In another version of the disclosure, there is provided an aircraft. The aircraft comprises a fuselage, and two wings coupled to the fuselage and extending from the fuselage opposite each other. The aircraft further comprises a strut assembly coupled to each wing.

The strut assembly comprises a strut having an outboard end, an inboard end opposite the outboard end, and an elongate body formed between the outboard end and the inboard end. The outboard end is coupled to the wing of the aircraft, and the inboard end is coupled to a fuselage of the aircraft. The strut assembly further comprises at least one spring member having a first end coupled to the strut, a second end opposite the first end, and an extendable body formed between the first end and the second end.

The strut assembly further comprises a first fitting element having a through opening and a bearing surface facing inboard. The strut assembly further comprises a bushing element disposed within the through opening of the first fitting element. The bushing element has an opening receiving a first portion of the strut extending through both the bushing element and the first fitting element.

The strut assembly further comprises a second fitting element having a through opening receiving a second portion of the strut extending through the second fitting element. The second fitting element has a bearing surface facing outboard and opposite the bearing surface of the first fitting element. The at least one spring member maintains tension in the strut, to keep the strut taut and in tension, to prevent or to minimize drooping of the strut.

In another version of the disclosure, there is provided a method of using a strut assembly to maintain tension in a strut of a wing of an aircraft. The method comprises the step of coupling the strut assembly to the wing of the aircraft.

The strut assembly comprises the strut having an outboard end, an inboard end opposite the outboard end, and an elongate body formed between the outboard end and the inboard end. The outboard end is coupled to the wing of the aircraft, and the inboard end is coupled to a fuselage of the aircraft. The strut assembly further comprises at least one spring member having a first end coupled to the strut, a second end opposite the first end, and an extendable body formed between the first end and the second end.

The strut assembly further comprises a first fitting element having a through opening and a bearing surface facing inboard. The through opening of the first fitting element receives a first portion of the strut extending through the first fitting element. The strut assembly further comprises a second fitting element having a through opening receiving a second portion of the strut extending through the second fitting element. The second fitting element has a bearing surface facing outboard and opposite the bearing surface of the first fitting element.

The method further comprises the step of using the at least one spring member of the strut assembly, to apply a tension load to the strut, so that the at least one spring member maintains tension in the strut, to keep the strut taut and in tension, to prevent or to minimize drooping of the strut.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

FIG. 7D-1 is an illustration of a top view of a right portion of a fuselage with another exemplary version of strut assemblies, each with the strut of FIG. 7C;

FIG. 7D-2 is an illustration of a top view of a left portion of the fuselage with another exemplary version of strut assemblies, each with the strut of FIG. 7C;

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to “one version” or “a version”. The instances of the phrases “one version” or “a version” do not necessarily refer to the same version. Particular features, structures, or characteristics may be combined in any suitable manner consistent with this disclosure.

As used herein, “comprising” is an open-ended term, and as used in the claims, this term does not foreclose additional structures or steps.

As used herein, “configured to” means various parts or components may be described or claimed as “configured to” perform a task or tasks. In such contexts, “configured to” is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 1:
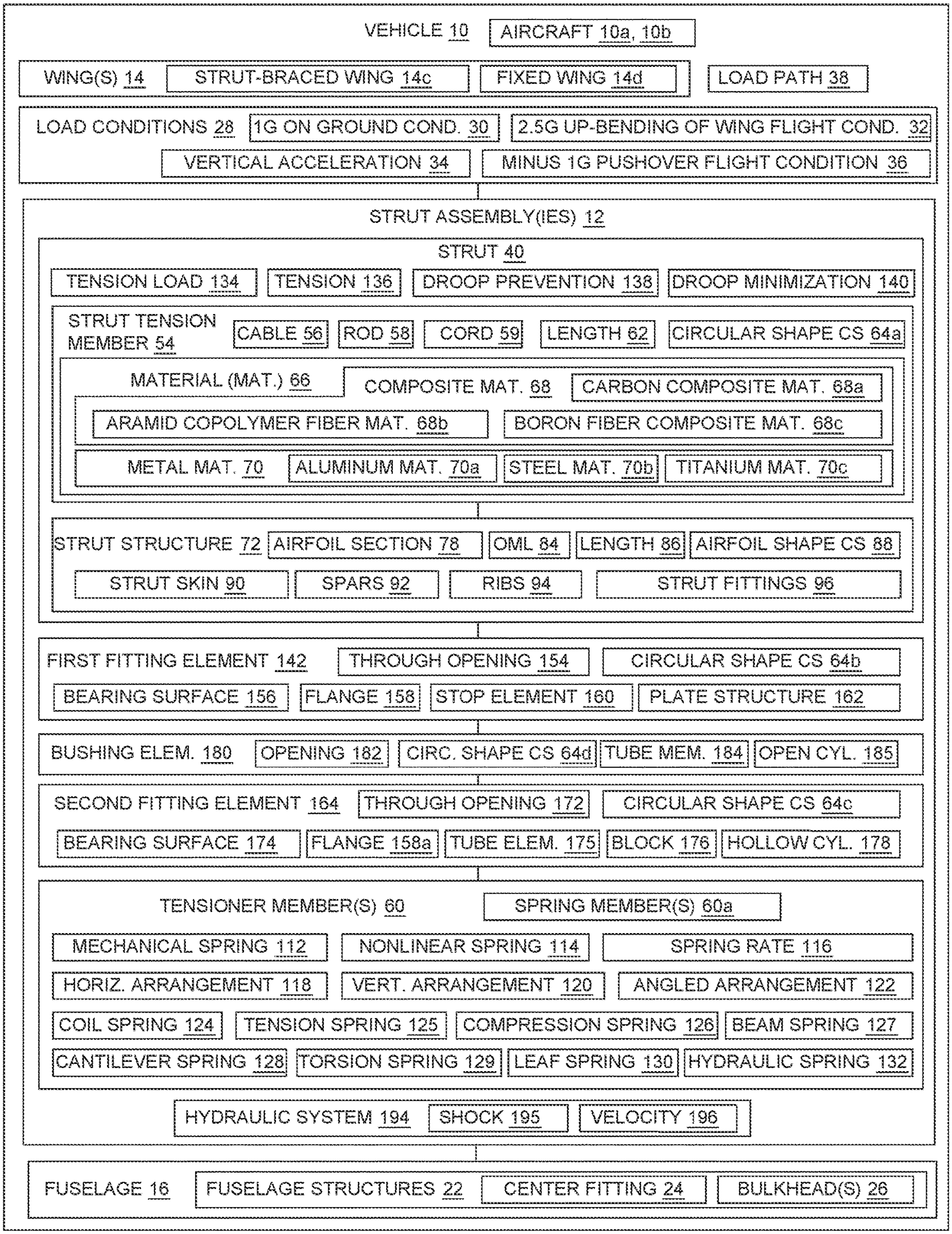
FIG. 1 is an illustration of a block diagram of an exemplary vehicle having an exemplary version of a strut assembly of the disclosure.

Now referring to FIG. 1, FIG. 1 is an illustration of a block diagram of an exemplary vehicle 10, such as an aircraft 10*a* (see also FIGS. 2A-2B), or aircraft 10*b* (see also FIG. 4A), having an exemplary version of a strut assembly 12 of the disclosure. The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the strut assembly 12 in FIG. 1 are not meant to imply physical or architectural limitations to the manner in which an illustrative example may be implemented. Other components in addition to, or in place of, the ones illustrated may be used. Some components may be unnecessary.

As shown in FIG. 1, the strut assembly 12 is configured for coupling, and is coupled, to a wing 14, of the vehicle 10, such as the aircraft 10*a*, 10*b*, and is configured for coupling, and is coupled, to a fuselage 16, of the vehicle 10, such as the aircraft 10*a*, 10*b*. The vehicle 10, such as the aircraft 10*a*, 10*b*, preferably has two wings 14, including a first wing 14*a* (see FIGS. 2A-2B), or left wing, and a second wing 14*b* (see FIGS. 2A-2B), or right wing. One or more strut assemblies 12 are coupled to each wing 14 (see FIG. 2A). In one version, the strut assemblies 12 comprise a first strut assembly 12*a* (see FIGS. 4A, 5A), or left strut assembly, coupled, or attached, to the first wing 14*a* (see FIG. 4A), and a second strut assembly 12*b* (see FIG. 5A), or right strut assembly, coupled, or attached to the second wing 14*b* (see FIG. 4A). In another version, as shown in FIGS. 7D-1, 7D-2, the strut assemblies 12 comprise two strut assemblies 12, such as two left strut assemblies, both coupled, or attached, to the first wing 14*a* (see FIG. 4A), and comprise two strut assemblies 12, such as two right strut assemblies, both coupled, or attached, to the second wing 14*b* (see FIG. 4A). As shown in FIG. 1, each wing 14 comprises a strut-braced wing 14*c* and is in the form of a fixed wing 14*d*. Each wing 14 has a topside 17 (see FIG. 2A) and an underside 18 (see FIG. 2A).

The strut assembly 12 may be used with any aircraft, such as aircraft 10*a* (see FIGS. 2A-2B), and 10*b* (see FIG. 4A), having strut-braced wings 14*c*, including small jet aircraft, large jet aircraft, commercial aircraft, military aircraft, cargo aircraft, and other types of aircraft. The strut assembly 12 is particularly suitable for large jet aircraft with high Mach numbers in a subsonic range, since low aerodynamic drag in the subsonic range is desirable.

As further shown in FIG. 1, the vehicle 10, such as aircraft 10*a*, and aircraft 10*b*, comprises the fuselage 16, also referred to as the body. The fuselage 16 has an interior 20*a* (see FIG. 2A) and an exterior 20*b* (see FIGS. 2A-2B), and sides 21 (see FIGS. 2A, 4G, 8C) with side portions 21*a* (see FIGS. 2A, 4G), or side-of-body portions. The fuselage 16 includes fuselage structures 22 (see FIG. 1) in the interior 20*a* of the fuselage 16. As shown in FIG. 1, the fuselage structures 22 include a center fitting 24 (see also FIG. 4C) and one or more bulkheads 26 (see also FIG. 4C). The fuselage structures 22 may also comprise other suitable fuselage structures within the interior 20*a* of the fuselage 16 or coupled to the fuselage 16. Each of the one or more bulkheads 26 comprises a carry-through structure, that is, a carry-through of load structure. As shown in FIG. 4B, the bulkheads 26 comprise a forward bulkhead 26*a* and an aft bulkhead 26*b*.

The vehicle 10, such as the aircraft 10*a*, 10*b*, experiences load conditions 28 (see FIG. 1) when on the ground and when in flight. When the aircraft 10*a* is on the ground, the aircraft 10*a*, 10*b*, is in, or at, a 1 g on ground condition (COND.) 30 (see FIG. 1). As used herein "g" means gravitational force. The gravitational force is attractive and a downward force toward the center of the earth, and forces on the landing gear of the aircraft 10*a* are upward forces and are a reaction against the downward force. The 1 g on ground condition 30 results in compression in the strut 40 because the dead weight of the wing 14 from the downward force of gravity makes the wing 14 tend to sag or deflect downward, and thus the length of the strut 40 tends to shorten. The downward load is reacted upward by the landing gear. An intermediate loading condition or range may be from 1 g on the ground to 1 g in flight, or another suitable intermediate loading condition.

When the aircraft 10*a*, 10*b*, is in flight, the aircraft 10*a*, 10*b*, may be in, or at, for example, a 2.5 g up-bending of wing flight condition (COND.) 32 (see FIG. 1), when the wing 14 is bending up. For up-bending of the wing flight conditions, a vertical acceleration 34 (see FIG. 1) of the aircraft 10*a*, 10*b* is a factor, as discussed in further detail below. In the 2.5 g up-bending of wing flight condition 32, the air load on the wing 14 is in the upward direction. It is balanced by the weight of the aircraft 10*a* in the downward direction. The 2.5 g up-bending of wing flight condition 32 is a flight maneuver that imparts 2.5 times the force of gravity as a downward acceleration on the vehicle, which is reacted by the upward force on the wing 14. This tends to lengthen the strut 40, which puts it in tension 136 (see FIG. 1).

Further, when the aircraft 10*a*, 10*b* is in flight, the aircraft may be in, or at, for example, a minus 1 g (−1 g) pushover flight condition 36 (see FIG. 1), when the wing 14 is bending down, as discussed in further detail below. In the minus 1 g pushover flight condition 36, the direction of weight-force is opposite to the direction of g-force acceleration. A strut 40 (see FIG. 1) is designed for the minus 1 g pushover flight condition 36, as the minus 1 g pushover flight condition 36 puts the strut 40 into axial compression. The minus 1 g pushover flight condition 36 is the opposite of the 2.5 g up-bending of wing flight condition 32. In the minus 1 g pushover flight condition 36, an upward acceleration on the vehicle 10 is balanced by a downward force on the wing 14 from the air load pressures on the wing 14. This tends to bend the wing 14 downward and shorten the length of the strut 40. The strut assembly 12 has a load path 38 (see FIG. 1), discussed in further detail below, that is different for each load condition 28.

As shown in FIG. 1, the strut assembly 12 comprises the strut 40. The strut 40 has an outboard end 42 (see FIGS. 2A-2B), an inboard end 44 (see FIGS. 2A-2B) opposite the outboard end 42, and an elongate body 46 (see FIGS. 2A-2B) formed between the outboard end 42 and the inboard end 44. The outboard end 42 of each strut 40 is coupled, or attached, to each wing 14 of the vehicle 10, such as the aircraft 10*a*, 10*b*. Preferably, the outboard end 42 of the strut 40 is coupled, or attached, to a first underside portion 18*a* (see FIG. 2A) on the underside 18 of the wing 14. A wing strut fairing 48 (see FIG. 2A) is positioned at the outboard end 42*a* of the strut 40, at the junction of the first underside portion 18*a* of the wing 14 and the outboard end 42 of the strut 40.

The fuselage 16 of the vehicle 10, such as the aircraft 10*a*, 10*b*, has openings 50 (see FIG. 2A) through the exterior 20*b* (see FIG. 2A) of the side portions 21*a* (see FIGS. 2A, 4G), or side-of-body portions. If the strut 40 is in the form of a strut tension member 54 (see FIG. 1) that extends from the wing 14 into the interior 20*a* of the fuselage 16, the inboard end 44 of the strut 40 is inserted through the opening 50 and extends into the interior 20*a* of the fuselage 16. The vehicle 10, such as the aircraft 10*a*, further has a fuselage strut fairing 52 (see FIGS. 2A-2B, 4E).

Figure 2A:
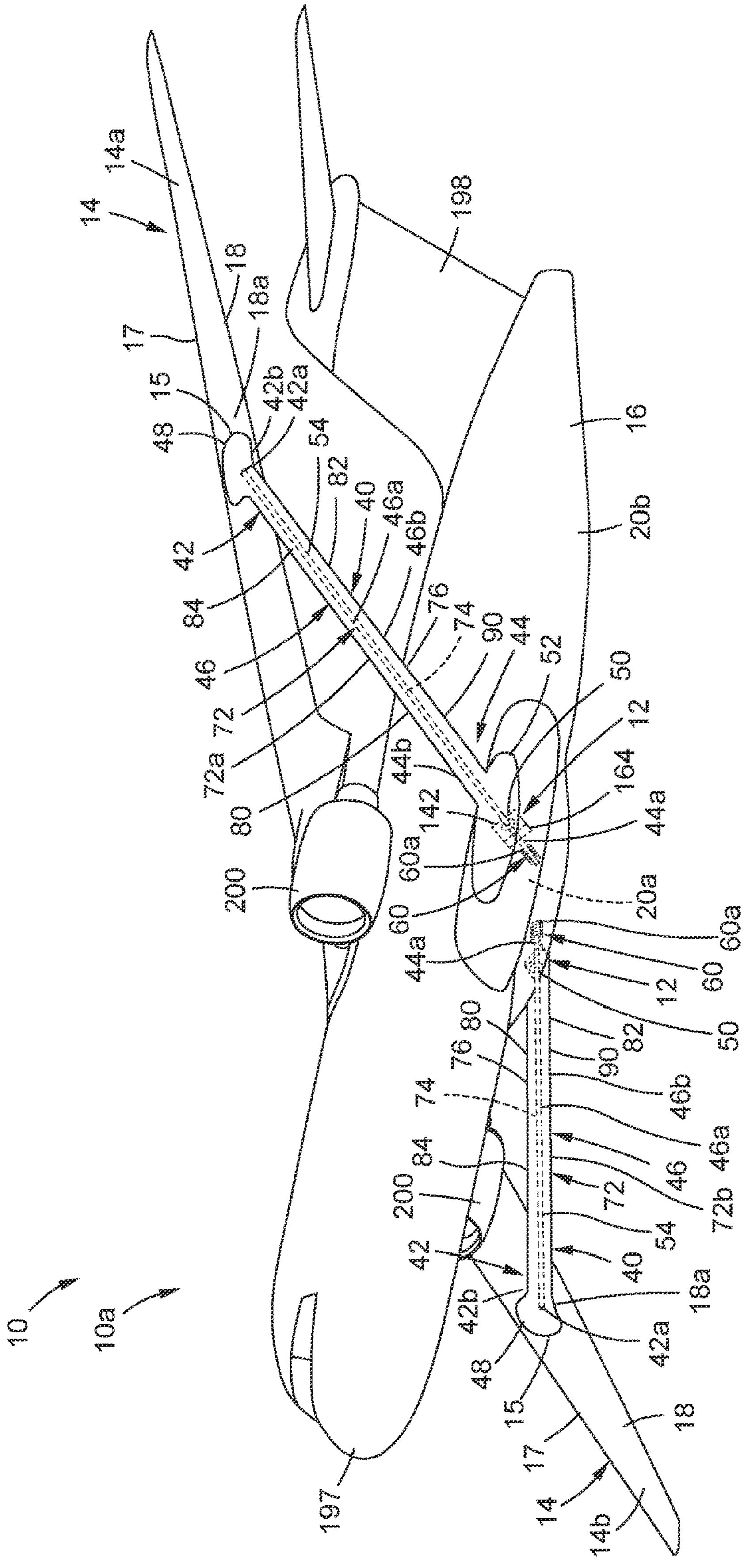
FIG. 2A is an illustration of a front perspective view of an exemplary aircraft having wings each with an exemplary strut assembly of the disclosure, with a version of a strut having a strut tension member within a strut structure.

In one version, as shown in FIGS. 1, 2A, the strut 40 comprises the strut tension member 54. The strut tension member 54 has an outboard end 42*a* (see FIG. 2A), an inboard end 44*a* (see FIG. 2A) opposite the outboard end 42*a*, and an elongate body 46*a* (see FIG. 2A) formed between the inboard end 44*a* and the outboard end 42*a*. The outboard end 42*a* of the strut tension member 54 is coupled, or attached, to the wing 14, such as the underside 18 of the wing 14, of the vehicle 10, such as the aircraft 10*a*, 10*b*. In this version, the inboard end 44*a* of the strut tension member 54 is inserted through the opening 50 of the fuselage 16, of the vehicle 10, such as the aircraft 10*a*, 10*b*, and coupled to at least one tensioner member 60 (see FIG. 1), such as at least one spring member 60*a* (see FIG. 1), discussed in further detail below.

As shown in FIG. 1, the strut tension member 54 comprises one of, a cable 56, a rod 58, a cord 59, or another suitable strut tension member. The strut tension member 54 has a length 62 (see FIG. 1) that is sufficient to span between the underside 18 of the wing 14 and the at least one tensioner member 60, such as the spring member 60*a*. The strut tension member 54 preferably has a circular shape cross section (CS) 64*a* (see FIG. 1). However, the strut tension member 54 may have another suitable cross section shape.

As shown in FIG. 1, the strut tension member 54 is made of a material (MAT.) 66 comprising one or more of, a composite material (MAT.) 68, including a carbon composite material (MAT.) 68*a*, an aramid copolymer fiber material (MAT.) 68*b*, a boron fiber composite material (MAT.) 68*c*, or a metal material (MAT.) 70, including an aluminum material (MAT.) 70*a*, a steel material (MAT.) 70*b*, a titanium material (MAT.) 70*c*, or another suitable material. Preferably, the material 66 is a strong and suitably stiff and capable of being pulled and held taut by the at least one tensioner member 60, such as the spring member 60*a*.

Figure 2B:
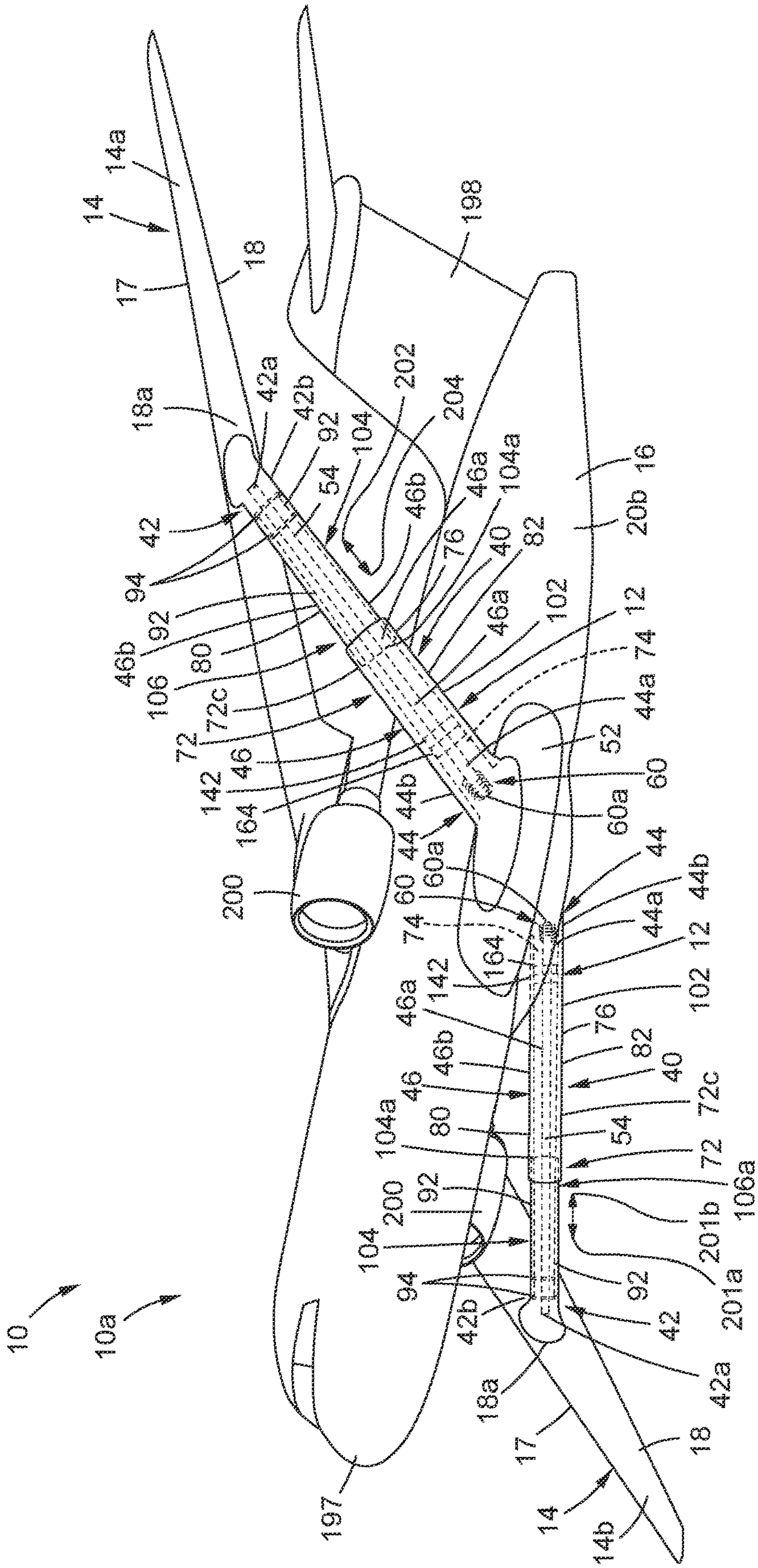
FIG. 2B is an illustration of a front perspective view of an exemplary aircraft having wings each with an exemplary strut assembly of the disclosure, with another version of a strut having a strut tension member within a strut structure comprising a telescoping strut structure.
Figure 5A:
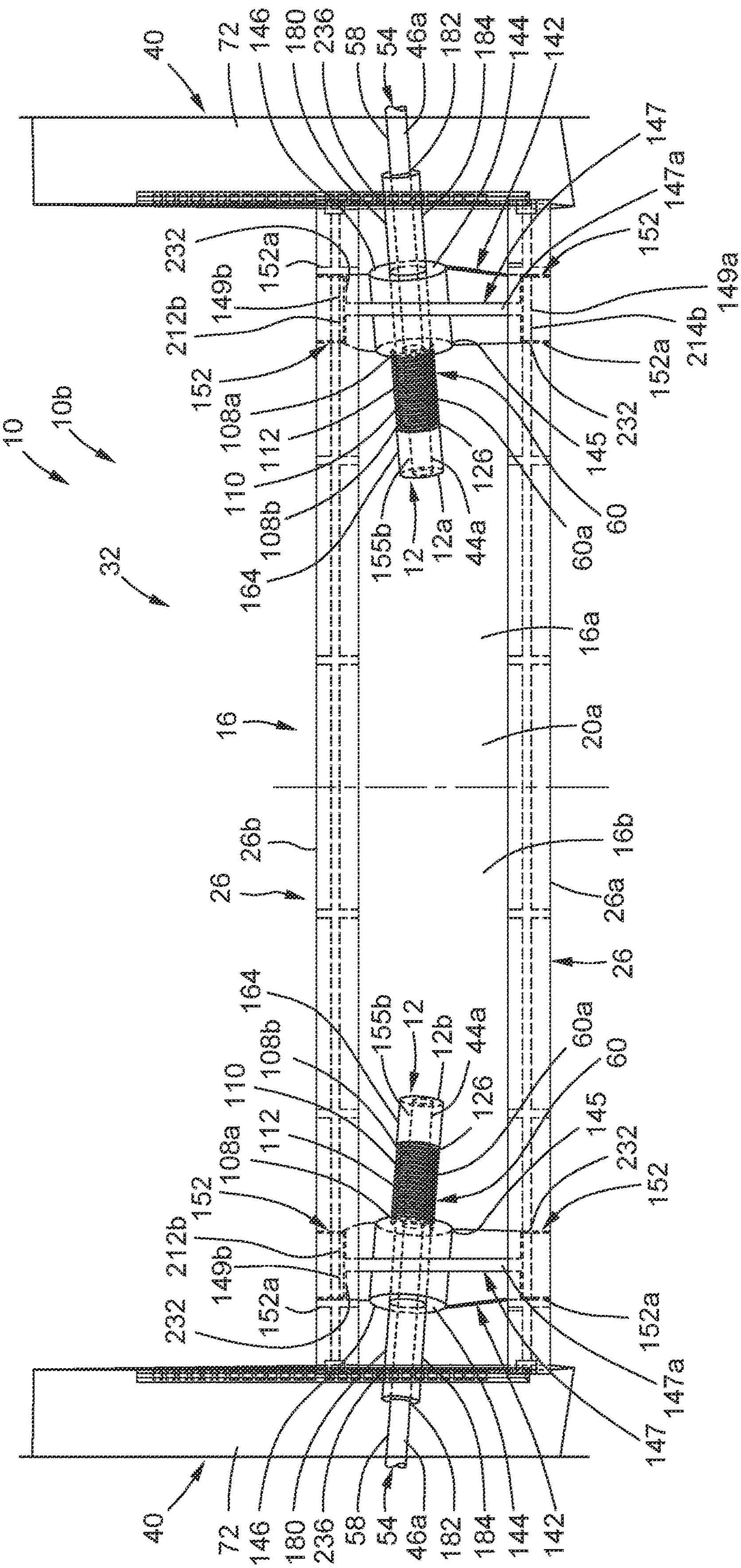
FIG. 5A is an illustration of a top view of a version of exemplary strut assemblies in an interior of a fuselage of an aircraft, when the aircraft is in flight in a 2.5 g up-bending of wing flight condition, and where the strut assemblies have compression springs.

In another version, as shown in FIG. 1, the strut 40 comprises the strut tension member 54 axially positioned within a strut structure 72. As shown in FIG. 2B, the vehicle 10, such as the aircraft 10*a*, comprises two strut structures 72, such as a first strut structure 72*a* and a second strut structure 72*b*. Each strut structure 72 has an interior 74 (see FIGS. 2A-2B) and an exterior 76 (see FIGS. 2A-2B). The strut tension member 54 is axially positioned within the interior 74 of the strut structure 72. The strut structure 72 has an outboard end 42*b* (see FIGS. 2A-2B), an inboard end 44*b* (see FIGS. 2A-2B) opposite the outboard end 42*b*, and an elongate body 46*b* (see FIGS. 2A-2B) formed between the inboard end 44*b* and the outboard end 42*b*. The outboard end 42*b* of the strut structure 72 is coupled, or attached, to the wing 14, such as the underside 18 (see FIGS. 2A-2B) of the wing 14, of the vehicle 10, such as the aircraft 10*a*, 10*b*. The inboard end 44*b* of the strut structure 72 is coupled, or attached, to the fuselage 16. In one version, as shown in FIG. 2A, 5A, the inboard end 44*a* of the strut tension member 54 extends from the interior 74 of the strut structure 72 through the opening 50 of the fuselage 16 and into the interior 20*a* of the fuselage 16, and the inboard end 44*a* is coupled to the at least one tensioner member 60, such as the spring member 60*a*. In another version, as shown in FIG. 2B, the strut structure 72 comprises a telescoping strut structure 72*c*, and the inboard end 44*a* of the strut tension member 54 is coupled to the at least one tensioner member 60, such as the spring member 60*a*, within the interior 74 of the strut structure 72.

The strut structure 72 comprises an airfoil section 78 (see FIGS. 1, 4F, 5C) having a structural leading edge 80 (see FIGS. 2A, 3A-3C) and a structural trailing edge 82 (see FIGS. 2A, 3A-3C), an outer mold line (OML) 84 (see FIGS. 1, 3A-3C), and a length 86 (see FIGS. 1, 3A-3C). The strut structure 72 has an airfoil shape cross section (CS) 88 (see FIGS. 1, 5C). The strut structure 72 may comprise one or more of, a composite material 68 (see FIG. 1), including a carbon composite material 68*a* (see FIG. 1), or a metal material 70 (see FIG. 1), including an aluminum material 70*a* (see FIG. 1), a steel material 70*b* (see FIG. 1), a titanium material 70*c* (see FIG. 1), a combination of the composite material 68 and the metal material 70, or another suitable material.

As shown in FIG. 1, in one version, the strut structure 72 comprises a strut skin 90 (see also FIGS. 3A-3C, 5C), such as panels on the exterior 76 (see FIGS. 3A-3C, 5C) of the strut structure 72, one or more spars 92 (see also FIGS. 3C, 5C), two or more ribs 94 (see also FIGS. 5C, 5F), two or more strut fittings 96, and other suitable components or structures. Each strut fitting 96 may connect one or more of the ribs 94 to the strut tension member 54, so that the strut tension member 54 does not rotate during flight. The spars 92, ribs 94, and strut fittings 96 are positioned in the interior 74 of the strut structure 72, and the spars 92 (see FIG. 3C) are positioned parallel to the length 86 (see FIG. 3C) of the strut structure 72.

In another version, discussed in further detail below, the strut structure 72 comprises the telescoping strut structure 72*c* (see FIG. 2B). As shown in FIG. 2B, the telescoping strut structure 72*c* comprises a fixed exterior sleeve section 102 and a movable exterior sleeve section 104 having a portion 104*a* housed within the fixed exterior sleeve section 102 in a retracted position 106. The portion 104*a* of the movable exterior sleeve section 104 is configured to move or telescope, and moves or telescopes, from the retracted position 106 (see FIG. 2B) to an extended position (not shown), that is, out of, and back into, the fixed exterior sleeve section 102.

As shown in FIG. 1, the strut assembly 12 further comprises the at least one tensioner member 60, such as a spring member 60*a*. In one version, the strut assembly 12 has one tensioner member 60, such as one spring member 60*a*, coupled, or attached, to the strut tension member 54. In another version, the strut assembly 12 has two tensioner members 60, such as two spring members 60*a*, coupled, or attached, to the strut tension member 54. In other versions, the strut assembly 12 may comprise more than two spring members 60*a*, coupled, or attached, to the strut tension member 54. More than one tensioner member 60, such as the spring member 60*a*, provides for redundancy in the strut assembly 12. For example, the strut 40, such as the strut tension member 54, may be coupled, or connected, to one spring member 60*a*, two spring members 60*a*, three spring members 60*a*, four spring members 60*a*, or more than four spring members 60*a*.

Each tensioner member 60, such as each spring member 60*a*, has a first end 108*a* (see FIG. 5B), a second end 108*b* (see FIG. 5B) opposite the first end 108*a*, and an extendable body 110 (see FIG. 5B) formed between the first end 108*a* and the second end 108*b*. The first end 108*a* of the tensioner member 60, such as the spring member 60*a*, is coupled to the strut 40, and is preferably coupled to the inboard end 44 of the strut 40, such as the inboard end 44*a* of the strut tension member 54, either where the strut 40 comprises the strut tension member 54 alone, or where the strut tension member 54 is positioned in the interior 74 of the strut structure 72. In one version, the second end 108*b* of the tensioner member 60, such as the spring member 60*a*, is coupled to a fuselage structure 22, such as the center fitting 24 (see FIGS. 4D, 5D), or another suitable fuselage structure, when the at least one tensioner member 60, such as the spring member 60*a*, is located, or positioned, in the interior 20*a* of the fuselage 16. Alternatively, in another version, the second end 108*b* of the tensioner member 60, such as the spring member 60*a*, is coupled to one or more of, a spar 92, a rib 94, or a strut fitting 96 within the strut structure 72, when the at least one spring member 60*a* is located, or positioned, in the interior 74 of the strut structure 72.

As shown in FIG. 1, in one version, the spring member 60*a* comprises a mechanical spring 112 that is substantially linear. In another version, the spring member 60*a* comprises a nonlinear spring 114 (see FIG. 1), where a spring rate 116 (see FIG. 1) of the nonlinear spring 114 changes as a function of displacement, to minimize shock 195 (see FIG. 1) on the strut 40, for example, the strut tension member 54. The tensioner members 60, such as the spring members 60*a*, may be arranged in a horizontal (HORIZ.) arrangement 118 (see FIGS. 1, 4B), a vertical (VERT.) arrangement 120 (see FIG. 1), an angled arrangement 122 (see FIG. 1), or another suitable arrangement with respect to each other.

As shown in FIG. 1, each spring member 60*a* comprises one of, a coil spring 124, a tension spring 125, a compression spring 126, a beam spring 127, a cantilever spring 128, a torsion spring 129, a leaf spring 130, a hydraulic spring 132, or another suitable type of spring. One skilled in the art may use one or more of these spring members 60*a*, or may choose to use another suitable type of spring member. The tensioner members 60, such as the spring members 60*a*, may be made of a metal material 70 (see FIG. 1), such as aluminum material 70*a* (see FIG. 1), steel material 70*b* (see FIG. 1), titanium material 70*c* (see FIG. 1), or another suitable metal material. The spring member 60*a* may also be made of an elastic material, such as an elastic spring steel, a strong plastic material, or another suitable material.

As used herein, a "coil spring" means a helical-shaped or spiral mechanical spring that functions by storing mechanical potential energy in order to release it, absorb shock, or maintain force between two surfaces, and that operates by a coiling or an uncoiling action. A coil spring may be in the form of a tension spring, a compression spring, or a torsion spring. As used herein, a "tension spring" means a wound helical coil that is wrapped tightly together to create tension, and may also be referred to as an extension spring, and provides extended force when the tension spring is pulled apart from its original length. Tension springs are wound helical coils that are wrapped tightly together to create tension. Also called extension springs, tension springs provide extended force when the spring is pulled apart from its original length.

As used herein, a "compression spring" means a mechanical spring, typically a coil type, that is used to offer resistance to a force tending to compress the spring, and that stores energy when closed by the force. The compression spring is designed to operate with a compression load, so the compression spring gets shorter as the load is applied to the spring, and stored energy in the spring is brought back to its original state after the force is removed to lengthen the spring and push against the object that compressed it.

As used herein, a "beam spring" means a flat spring formed with or without an arc at or near its center, and supported on both ends, with a force applied to the center of the arc. As used herein, a "cantilever spring" means a flat spring formed with or without an arc at or near its center, and clamped at one end with a force applied to the other end, and which absorbs energy by bending.

As used herein, a "torsion spring" means a helical-shaped or spiral mechanical spring that exerts a torque or rotary force, that functions by twisting its end along its axis, that stores mechanical potential energy when it is twisted, and that operated by a coiling or an uncoiling action. As used herein, a "leaf spring" means an arc-shaped spring with a rectangular cross section consisting of one or more layers of leaves with a gradation in their size, such as the bigger layer being on top with each layer joined to the other layer. A leaf spring is a type of beam spring. As used herein, a "hydraulic spring" means a small, thick-walled cylinder in which a spring effect is produced by applying a load to a fluid in the cylinder through a small piston entering at a center of one end of the cylinder.

Each tensioner member 60, such as each spring member 60*a*, applies a tension load 134 (see FIG. 1), or tension force, to the strut 40, such as the strut tension member 54, of the strut-braced wing 14*c*, and the strut 40, such as the strut tension member 54, carries the tension load 134, for example, in one version, in a load path 38 (see FIG. 1) from the fuselage 16 to the wing 14. The one or more tensioner members 60, such as the one or more spring members 60*a*, apply the tension load 134 so that the strut 40, such as the strut tension member 54, is in tension 136 (see FIG. 1), when otherwise it would be slack under certain load conditions 28 (see FIG. 1). Each tensioner member 60, such as each spring member 60*a*, maintains tension 136 (see FIG. 1) in the strut 40, such as the strut tension member 54, to always keep or maintain the strut 40, such as the strut tension member 54, taut and in tension 136.

Maintaining tension 136 in the strut 40, such as the strut tension member 54, prevents or minimizes drooping of the strut 40, such as the strut tension member 54, to obtain droop prevention 138 (see FIG. 1) or droop minimization 140 (see FIG. 1) of the strut 40. Each tensioner member 60, such as the spring member 60*a*, always, or constantly, maintains tension 136 in the strut 40, such as the strut tension member 54, where the strut tension member 54 is alone, or where the strut tension member 54 is within the strut structure 72, even for conditions for which the wing 14 is bending down.

Figure 5B:
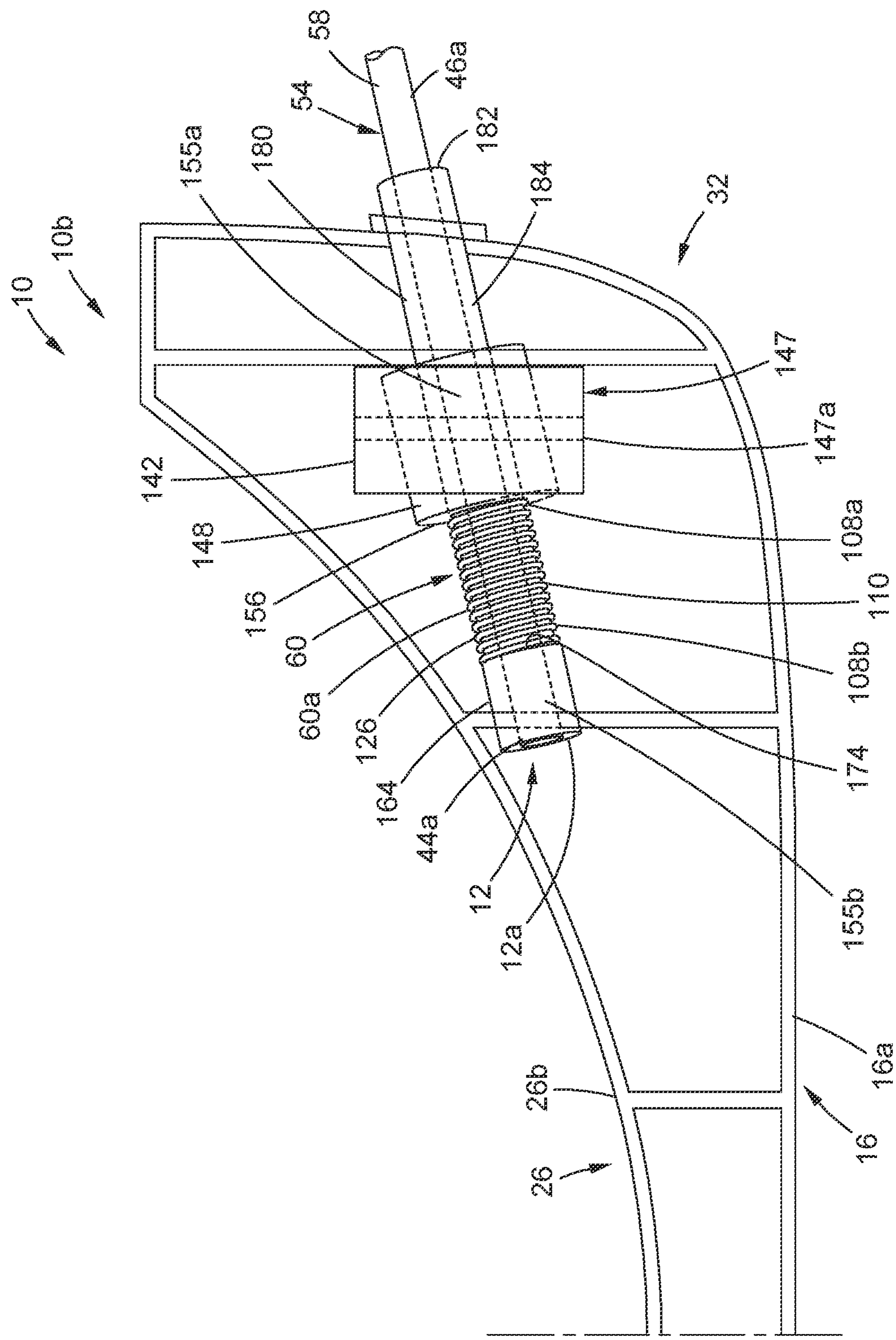
FIG. 5B is an illustration of a front view of a strut assembly of FIG. 5A, when the aircraft is in flight in the 2.5 g up-bending of wing flight condition, and where the strut assembly has a compression spring.
Figure 5C:
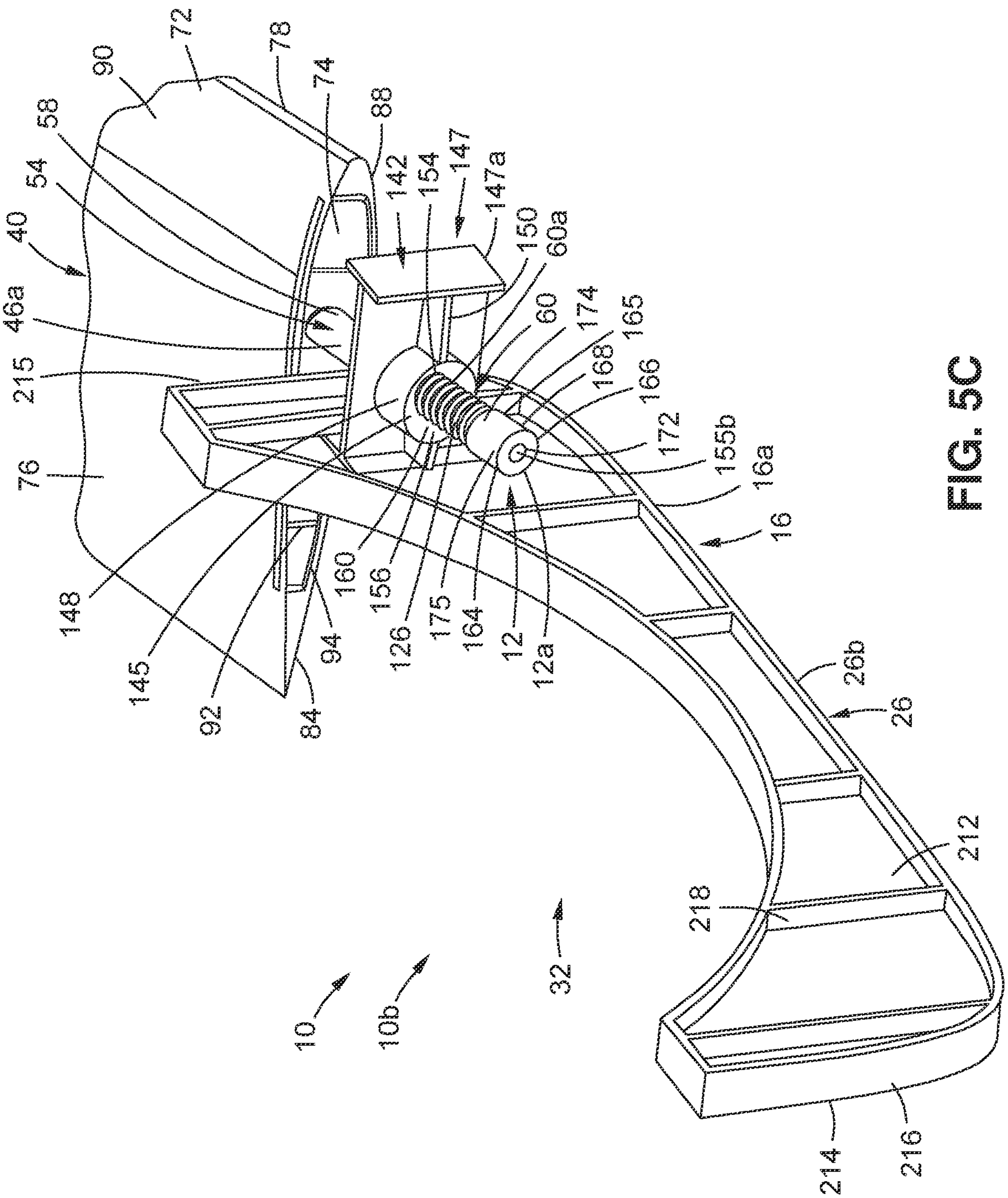
FIG. 5C is an illustration of a right side perspective view of a strut assembly of FIG. 5A, when the aircraft is in flight in the 2.5 g up-bending of wing flight condition, and where the strut assembly has a compression spring.
Figure 5D:
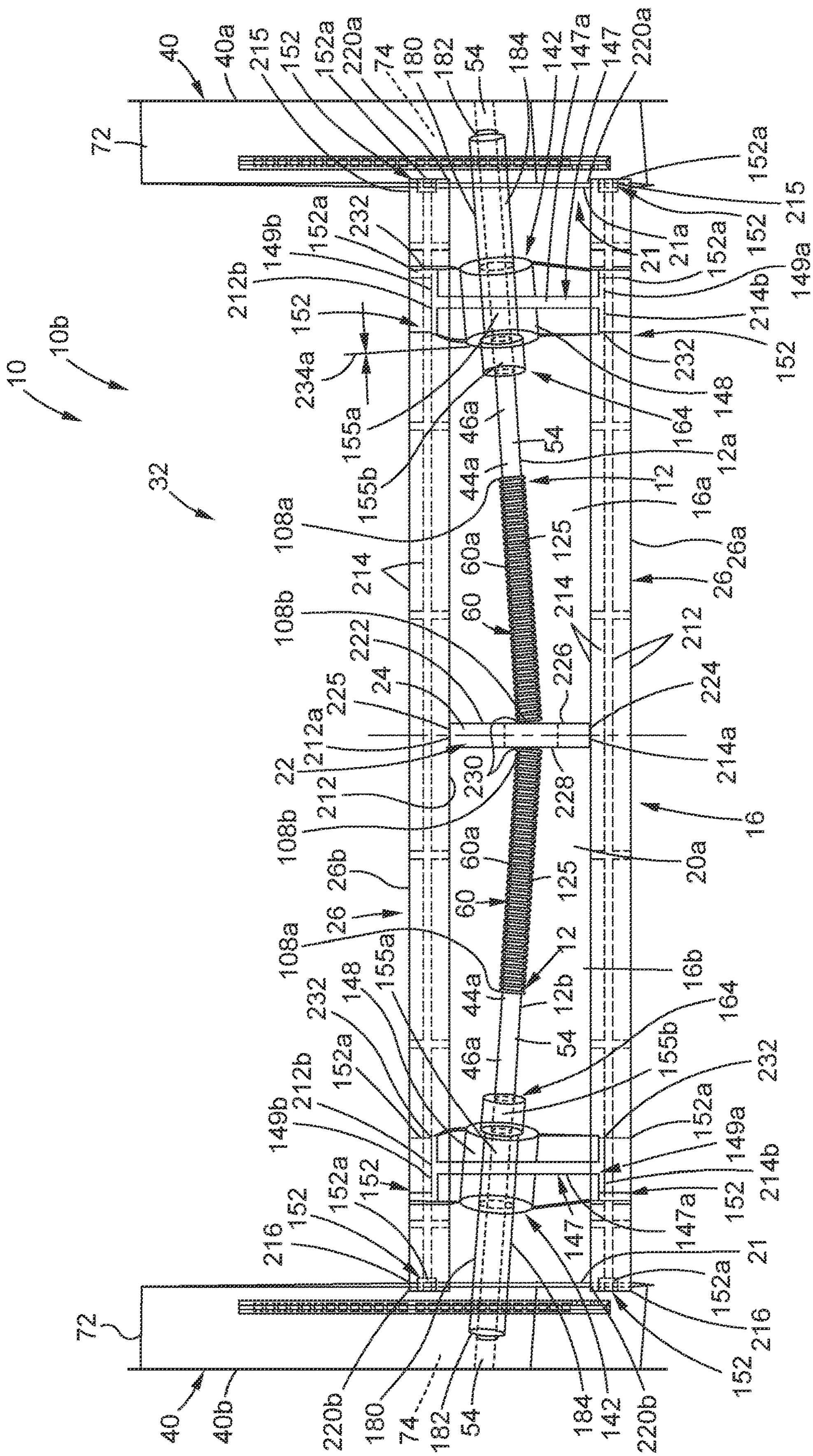
FIG. 5D is an illustration of a top view of another version of exemplary strut assemblies in an interior of a fuselage of an aircraft, when the aircraft is in flight in a 2.5 g up-bending of wing flight condition, and where the strut assemblies have tension springs.
Figure 7B:
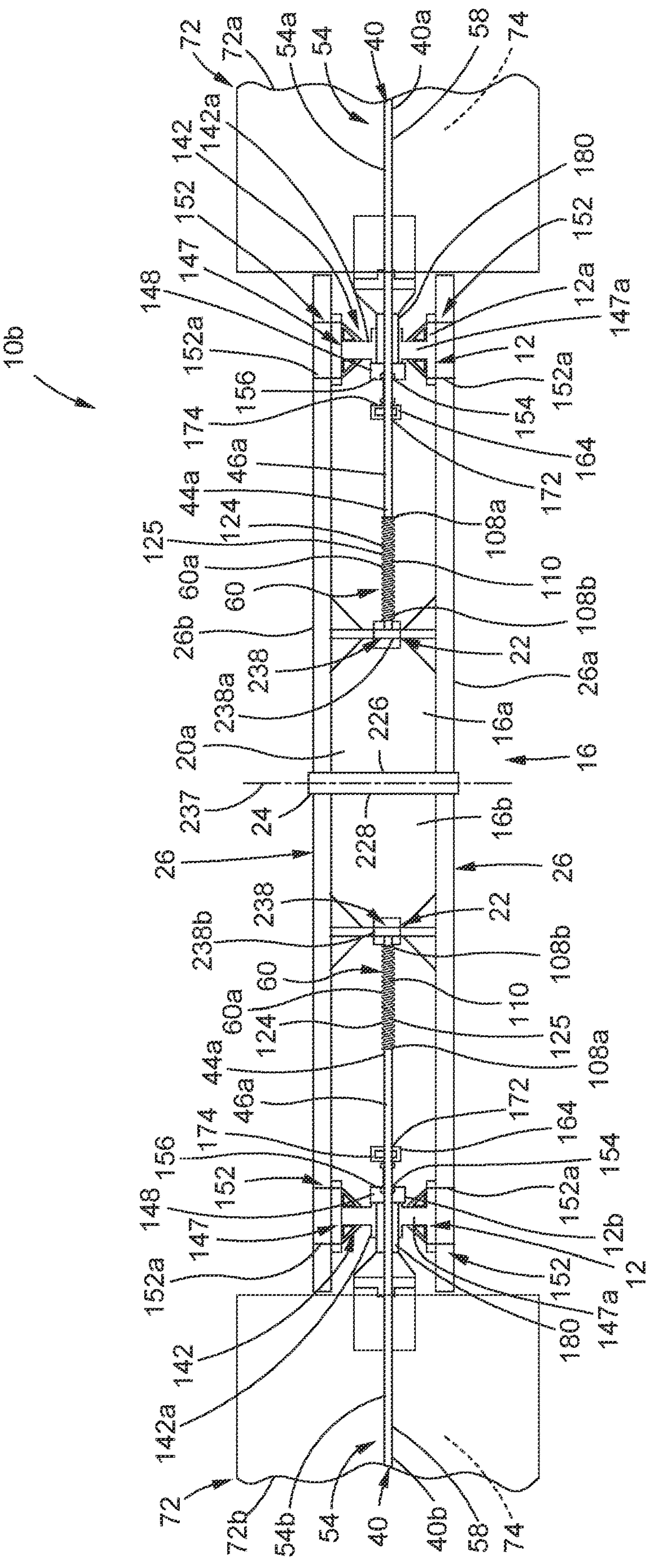
FIG. 7B is an illustration of a top view of an exemplary version of strut assemblies each with the strut of FIG. 7A.
Figures 1, 7D:
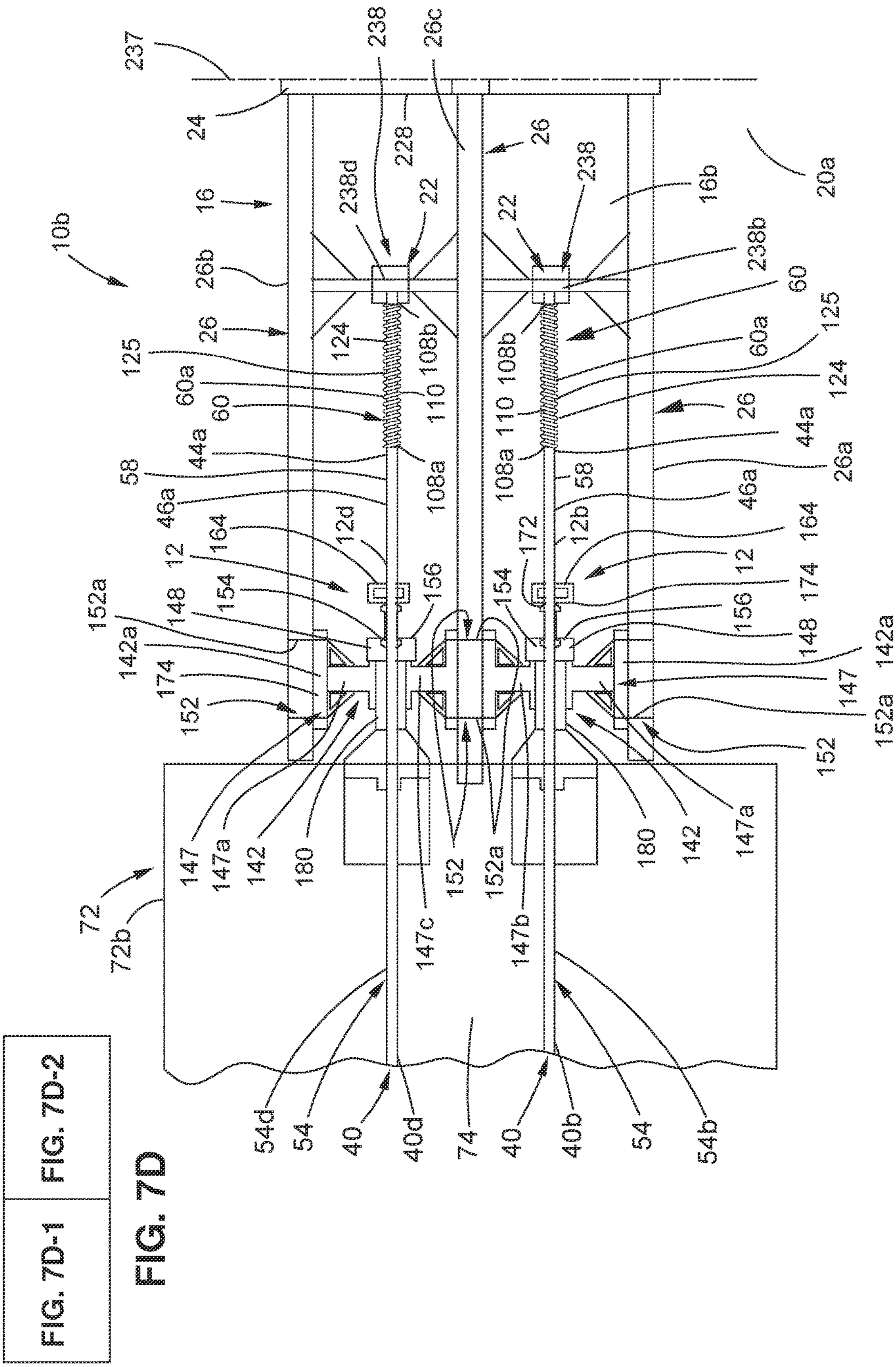
FIG. 7D is an illustration of a schematic diagram of a combination comprising FIGS. 7D-1 and 7D-2.
Figures 2, 7D:
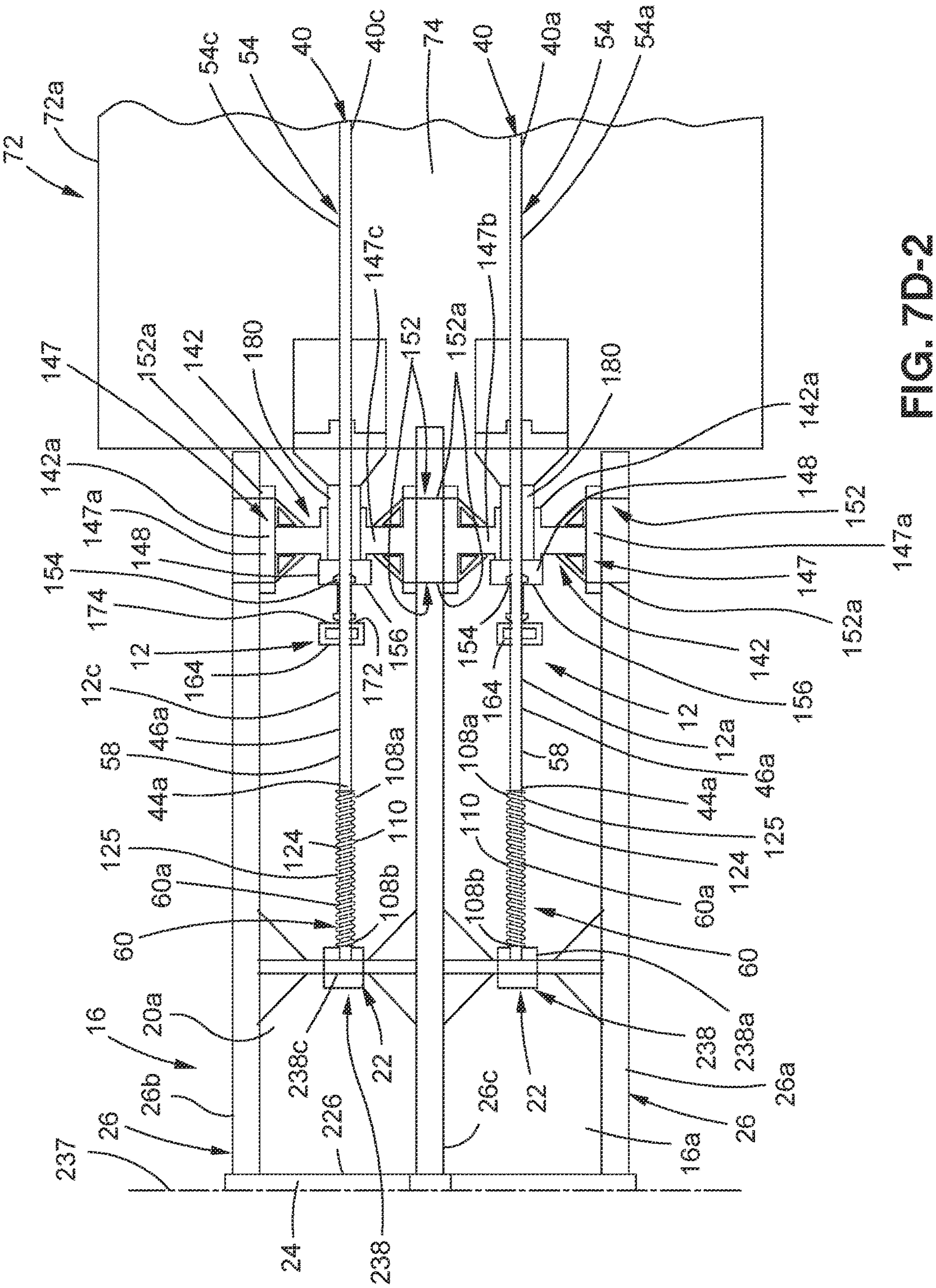
Figures 8A, 8B, 8C:
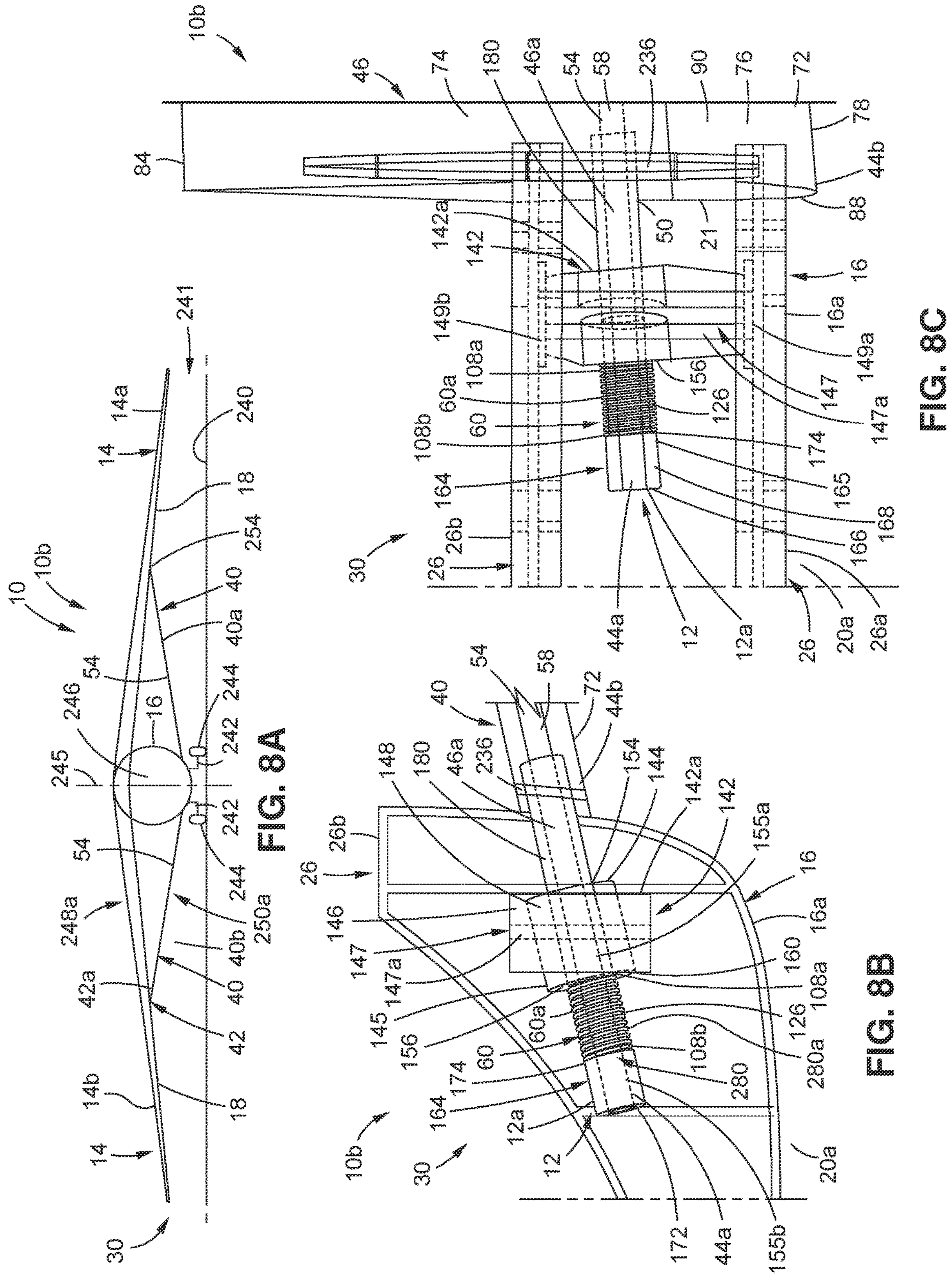
FIG. 8A is an illustration of a front view of a schematic diagram of an aircraft on the ground in a 1 g on ground condition.
FIG. 8B is an illustration of an enlarged front view of a version of a strut assembly in an interior of a fuselage of an aircraft, when the aircraft is on the ground in the 1 g on ground condition, and where the strut assembly has a compression spring.
FIG. 8C is an illustration of an enlarged top view of the strut assembly of FIG. 8B, when the aircraft is on the ground in the 1 g on ground condition, and where the strut assembly has the compression spring.
Figure 8D:
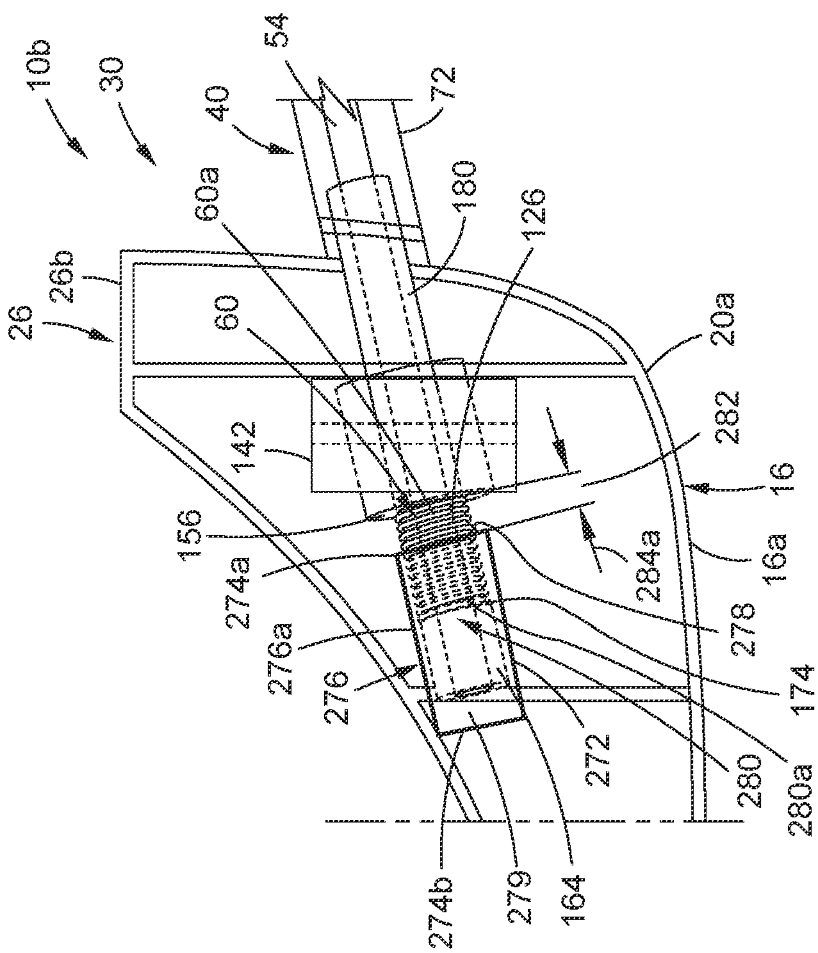
FIG. 8D is an illustration of an enlarged front view of the strut assembly of FIG. 8B, when the aircraft is on the ground in the 1 g on ground condition, and where the strut assembly has an outer sheath.
Figure 8F:
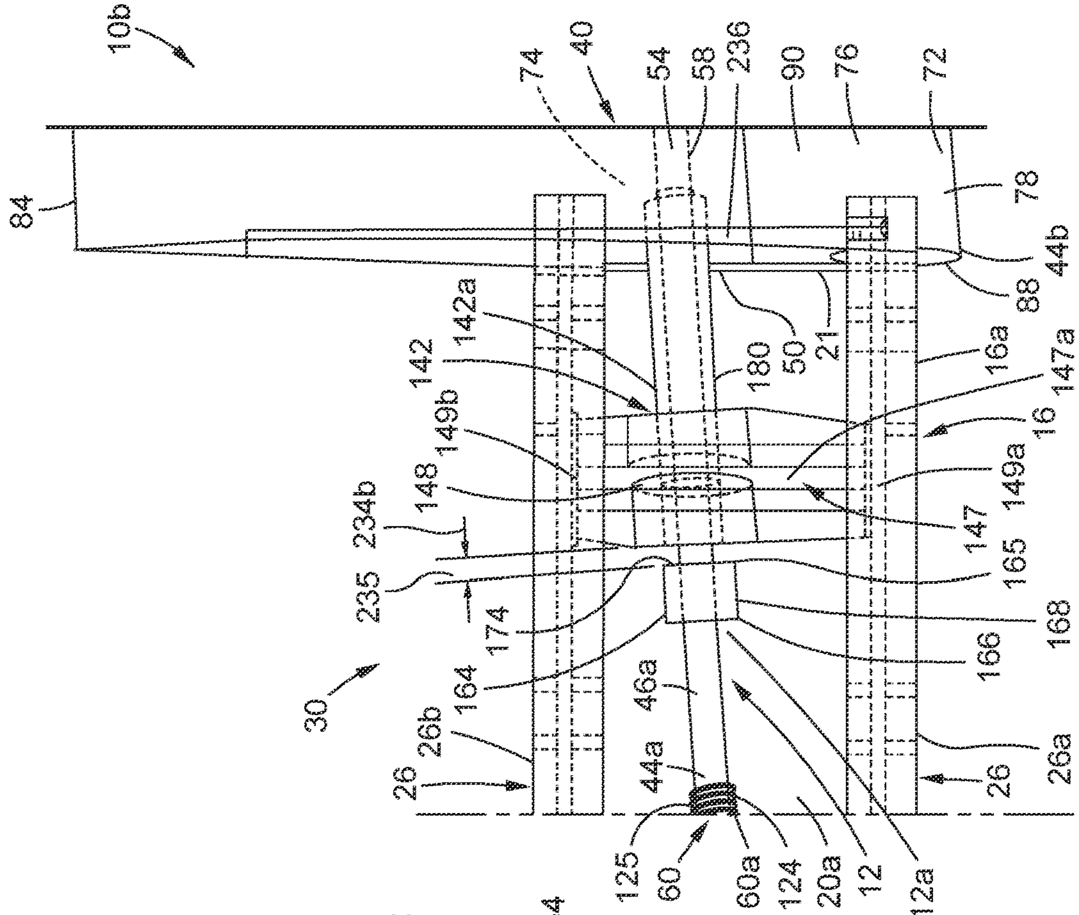
FIG. 8F is an illustration of an enlarged top view of the strut assembly of FIG. 8E, when the aircraft is on the ground in the 1 g on ground condition, and where the strut assembly has the tension spring.
Figure 8E:
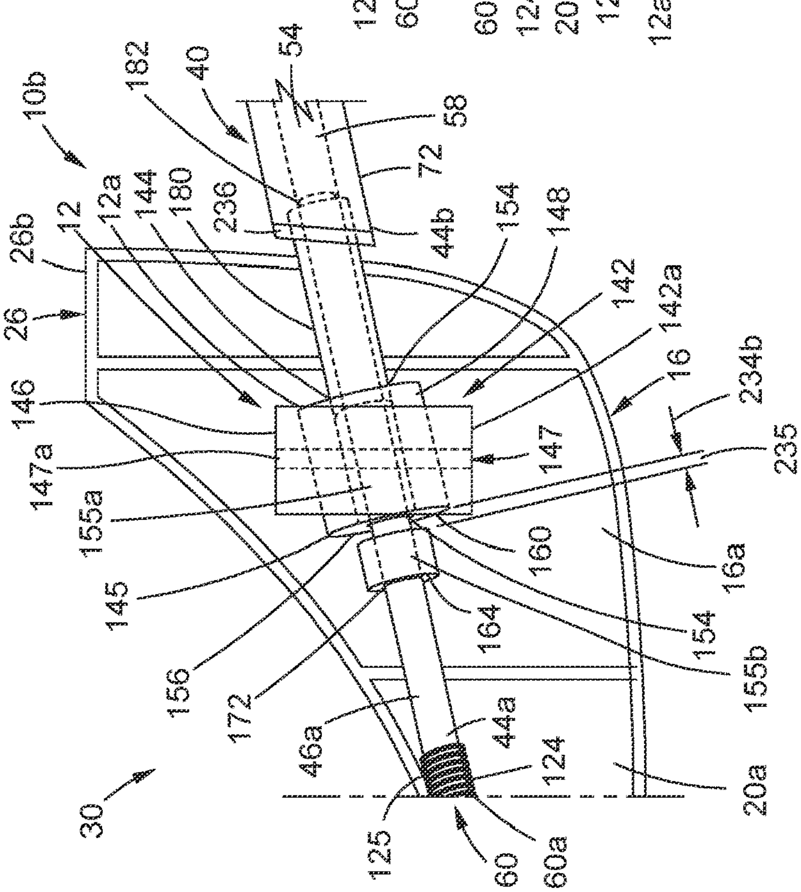
FIG. 8E is an illustration of an enlarged front view of another version of a strut assembly in an interior of a fuselage of an aircraft, when the aircraft is on the ground in the 1 g on ground condition, and where the strut assembly has a tension spring.

As shown in FIG. 1, the strut assembly 12 further comprises a first fitting element 142, such as a side-of-body fitting 142*a* (see FIGS. 8B, 8E). The first fitting element 142 has a first end 144 (see FIG. 5A), a second end 145 (see FIG. 5A), and a body 146 (see FIG. 5A) formed between the first end 144 and the second end 145. In one version, as shown in FIGS. 5C, 5F, the body 146 is comprised of a load spanning beam 147, for example, an I-beam portion 147*a*, and a cylindrical portion 148 inserted, or formed, through the I-beam portion 147*a*. The I-beam portion 147*a* of the body 146 has a first side 149*a* (see FIG. 5A), such as a forward side, and a second side 149*b* (see FIG. 5A), such as an aft side. One or more rib elements 150 (see FIG. 5F) may be coupled between the exterior of the cylindrical portion 148 and the interiors of the first side 149*a* and the second side 149*b*. When the first fitting element 142 is located or positioned in the interior 20*a* of the fuselage 16, in one version, as shown in FIG. 5A, the exterior of the first side 149*a* of the I-beam portion 147*a* is coupled, or attached, to the forward bulkhead 26*a*, and the exterior of the second side 149*b* of the I-beam portion 147*a* is coupled, or attached, to the aft bulkhead 26*b*. The first side 149*a* of the I-beam portion 147*a* of the body 146, and the second side 149*b* of the I-beam portion 147*a* of the body 146, are attached to the forward bulkhead 26*a* and the aft bulkhead 26*b*, respectively, with one or more attachment elements 152 (see FIGS. 5A, 5D, 7B, 7D-1, 7D-2), such as bolts 152*a* (see FIGS. 5A, 5D, 7B, 7D-1, 7D-2), screws, or other suitable attachment elements. Thus, when the first fitting element 142 is located or positioned in the interior 20*a* of the fuselage 16, the first fitting element 142 is fixed and does not move. Alternatively, where the strut structure 72 comprises a telescoping strut structure 72*c* (see FIG. 2B), when the first fitting element 142 is located or positioned in the interior 74 of the strut structure 72, the exterior of the first side 149*a* of the load spanning beam 147 and the exterior of the second side 149*b* of the load spanning beam 147 are coupled, or attached, to spars 92, ribs 94, strut fittings 96, or other suitable structures within the strut structure 72.

As shown in FIG. 1, the cylindrical portion 148 of the body 146 of the first fitting element 142 has a through opening 154 (see also FIGS. 5C, 5F) configured to receive, and receiving, a first portion 155*a* (see FIGS. 5B, 5E) of the strut 40, such as the strut tension member 54, extending through the first fitting element 142. The first portion 155*a* of the strut 40, such as the strut tension member 54, is movable through the through opening 154. The through opening 154 may have a circular shape cross section (CS) 64*b* (see FIG. 1). Alternatively, the through opening 154 may have a non-circular shape cross section, such as a square shape, a rectangle shape, a hexagon shape, or another suitable non-circular shape cross section, which functions to prevent rotation of the strut 40 about its axial axis.

As further shown in FIG. 1, the first fitting element 142 has a bearing surface 156 (see also FIGS. 5C, 5F) at the second end 145 of the first fitting element 142, and the bearing surface 156 faces inboard. The bearing surface 156 may comprise a flange 158 (see FIG. 1), a lip, a protrusion, a ledge, or another suitable feature formed on, or coupled to, the second end 145, and that functions as a stop element 160 (see FIGS. 1, 5C, 5F).

The cylindrical portion 148 of the first fitting element 142 may be in the form of a plate structure 162 (see FIG. 1), or another suitable structure. The first fitting element 142, such as in the form of the plate structure 162, is preferably positioned at an angle, and has the first end 144, the second end 145, and the load spanning beam 147, such as the I-beam portion 147*a*, of the body 146 with the first side 149*a* (see FIGS. 5A, 5D), such as the forward side, and the second side 149*b* (see FIGS. 5A, 5D), such as the aft side. The first fitting element 142, such as in the form of the plate structure 162, has the bearing surface 156 that functions as the stop element 160 (see FIGS. 5C, 5F), for example, in the form of a brace plate. The first fitting element 142 may also comprise another suitable structure with a different configuration, and that is positioned in the interior 20*a* of the fuselage 16, or positioned in the interior 74 of the strut structure 72.

As shown in FIG. 1, the strut assembly 12 further comprises a second fitting element 164 (see also FIGS. 5C, 5F, 8B, 8E). As shown in FIGS. 5C, 5F, the second fitting element 164 has a first end 165, a second end 166, and a body 168 formed between the first end 165 and the second end 166.

As shown in FIG. 1, the second fitting element 164 has a through opening 172 (see also FIGS. 5C, 5F) configured to receive, and receiving, a second portion 155*b* (see FIGS. 5C, 5E) of the strut 40, such as the strut tension member 54, extending through the second fitting element 164. Preferably, the through opening 172 has a circular shape cross section 64*c* (see FIG. 1). The second fitting element 164 is fixedly attached to the strut tension member 54, to transmit tension force in the strut tension member 54 to the bulkhead 26, which transmits that load to the second fitting element 164 and the strut tension member 54 on the other side of the fuselage 16 of the aircraft 10*a*. The strut tension member 54 and all of the strut assembly 12 parts fixedly attached to the strut tension member 54 slide through the through opening 154 in the first fitting element 142, which is fixedly attached to other hardware in the aircraft 10*a*. The through opening 172 of the second fitting element 164 and the through opening 154 of the first fitting element 142 are axially aligned with respect to each other along the strut 40, such as the strut tension member 54.

As further shown in FIG. 1, the second fitting element 164 has a bearing surface 174 (see also FIGS. 5B, 5E) at the first end 165 of the second fitting element 164. The bearing surface 174 faces outboard and opposite the bearing surface 156 of the first fitting element 142. The bearing surface 174 may comprise a flange 158*a* (see FIG. 1), a lip, a protrusion, a ledge, or another suitable feature formed on, or coupled to, the first end 165 of the second fitting element 164. The bearing surface 174 of the second fitting element 164 bears upon the bearing surface 156 of the first fitting element 142.

The second fitting element 164 may be in the form of a tube element (ELEM.) 175 (see FIG. 1), a block 176 (see FIG. 1), a hollow cylinder (CYL.) 178 (see FIG. 1), or another suitable structure. The second fitting element 164, such as the tube element 175, has the bearing surface 174 that bears against and contacts the bearing surface 156 of the first fitting element 142, when the strut 40, such as the strut tension member 54, is in tension 136. For example, when the vehicle 10, such as the aircraft 10*a*, 10*b*, is in flight, an up-bending of the wing 14, such as the 2.5 g up-bending of wing flight condition 32 (see FIG. 1), causes tension 136 (see FIG. 1) in the strut 40, such as the strut tension member

Figure 5E:
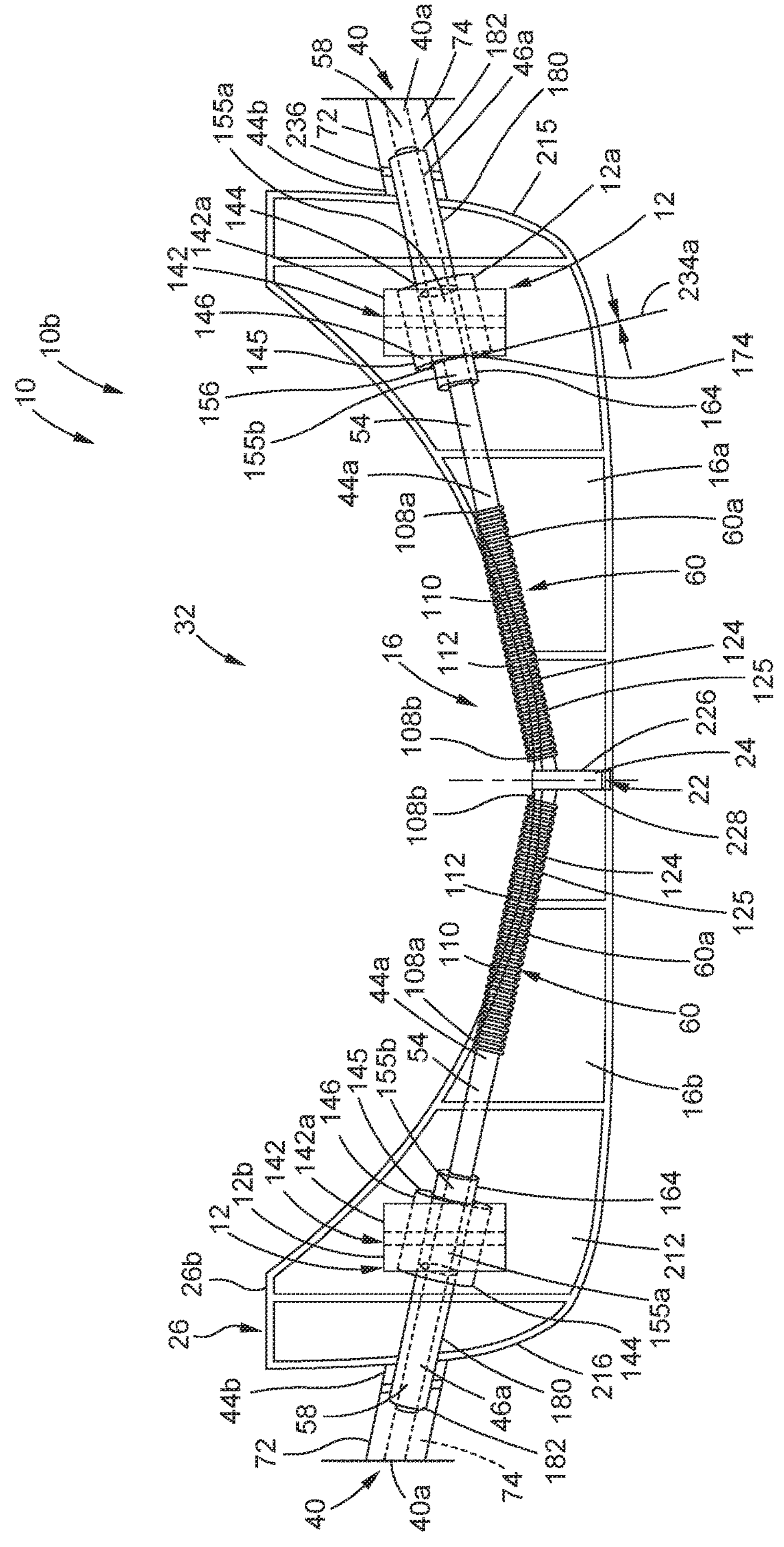
FIG. 5E is an illustration of a front view of the strut assemblies of FIG. 5D, when the aircraft is in flight in the 2.5 g up-bending of wing flight condition, and where the strut assemblies have tension springs.
Figure 5F:
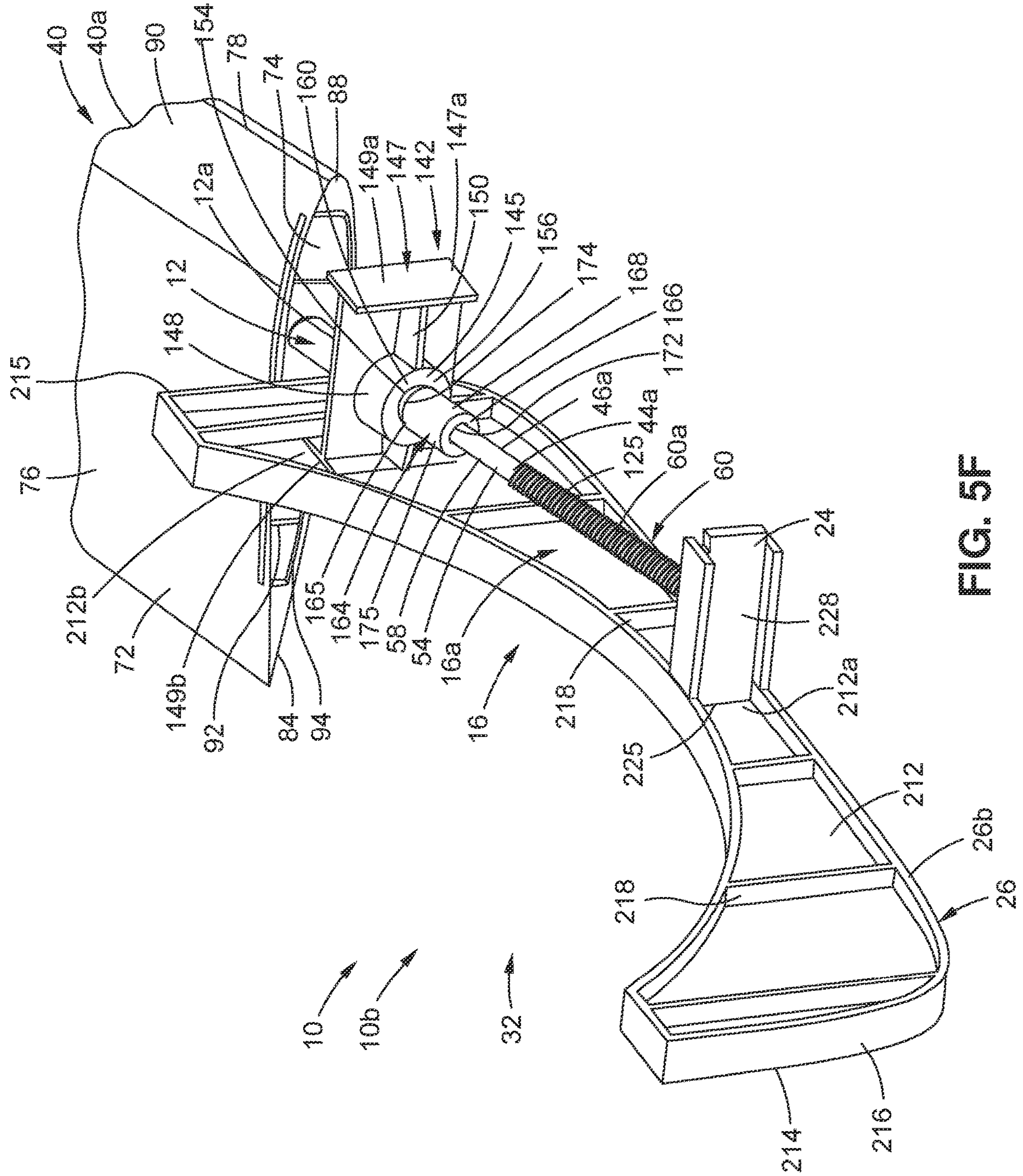
FIG. 5F is an illustration of a right side perspective view of a strut assembly of FIG. 5D, when the aircraft is in flight in the 2.5 g up-bending of wing flight condition, and where the strut assembly has a tension spring.

54, and in one version, such as shown in FIG. 5E, the bearing surface 174 of the second fitting element 164 bears against, or contacts, the bearing surface 156 of the first fitting element 142.

The one or more tensioner members 60, such as the spring members 60*a*, are used to force the second fitting element 164 with the bearing surface 174 to bear against, to maintain contact with, to engage, to disengage, or to remain clear of, the first fitting element 142 with the bearing surface 156. In one version, the second fitting element 164 bearing against the first fitting element 142 happens when the strut 40 does not have tension 136 applied from the flight loads, and it is to prevent or minimize drooping of the strut 40. In one version, the one or more tensioner members 60, such as the spring members 60*a*, are further used to move the second fitting element 164 away from the first fitting element 142 and return the second fitting element 164 back to its original position after displacement. The one or more tensioner members 60, such as the spring members 60*a*, are further used to allow some freedom of movement between the aligned components of the second fitting element 164 and the first fitting element 142 without disengaging them.

As shown in FIG. 1, the strut assembly 12 may further optionally comprise a bushing element (ELEM.) 180 (see also FIGS. 5B, 5D) disposed partially, or entirely, within the through opening 154 (see FIGS. 5C, 5F) of the first fitting element 142. The bushing element 180 is preferably inserted through, and fitted within, the through opening 154 of the first fitting element 142, and the exterior surface of the bushing element 180 is in contact against the interior surface of the through opening 154 of the first fitting element 142. The bushing element 180 has an opening 182 (see FIGS. 1, 5B, 5D) configured to receive, and receiving, the first portion 155*a* (see FIGS. 5B, 5D) of the strut 40, such as the strut tension member 54, where the first portion 155*a* extends through both the bushing element 180 and the first fitting element 142. Preferably, the opening 182 has a circular (CIRC.) shape cross section (CS) 64*d* (see FIG. 1). As shown in FIG. 1, the bushing element 180 may be in the form of a tube member (MEM.) 184, an open cylinder (CYL.) 185, or another suitable bushing element structure. The bushing element 180 allows the strut 40, such as the strut tension member 54, for example, the cable 56, the rod 58, the cord 59, or another suitable strut tension member, to avoid contact and wear against the interior surface of the through opening 154 of the first fitting element 142.

In one version, as shown in FIGS. 5A, 5D, the first fitting element 142, the second fitting element 164, the at least one tensioner member 60, such as the spring member 60*a*, and all or part of the bushing element 180, when present, are positioned in the interior 20*a* of the fuselage 16. In another version, as shown in FIG. 2B, where the strut structure 72 comprises the telescoping strut structure 72*c*, the first fitting element 142, the second fitting element 164, the at least one tensioner member 60, such as the spring member 60*a*, and the bushing element 180, when present, are located, or positioned, in the interior 74 of the strut structure 72.

In one version, as shown in FIG. 1, the strut assembly 12 may further comprise a hydraulic system 194 (see also FIGS. 12A-12D) disposed in the interior 20*a* of the fuselage 16 of the vehicle 10, such as the aircraft 10*a*, 10*b*. With the hydraulic system 194, the at least one tensioner member 60 comprises at least one spring member 60*a*, such as at least one hydraulic spring 132 (see FIG. 1) in the form of a cylinder 295 (see FIGS. 12A-12D).

In another version of the disclosure, as shown in FIG. 1, there is provided the vehicle 10, such as an aircraft 10*a* (see FIGS. 1, 2A-2B), or aircraft 10*b* (see FIGS. 1, 4A), having the strut assembly 12. The vehicle 10, such as the aircraft 10*a*, 10*b*, comprises the fuselage 16 (see FIG. 1), and two wings 14 (see FIG. 1), such as the first wing 14*a* (see FIGS. 2A-2B) and the second wing 14*b* (see FIGS. 2A-2B), coupled to the fuselage 16, and extending from the fuselage 16, opposite each other. The vehicle 10, such as the aircraft 10*a*, 10*b*, comprises the strut assembly 12 coupled to each wing 14. As discussed above, the strut assembly 12 comprises the strut 40 (see FIG. 1) having the outboard end 42 (see FIGS. 2A-2B), the inboard end 44 (see FIGS. 2A-2B) opposite the outboard end 42, and the elongate body 46 (see FIGS. 2A-2B) formed between the outboard end 42 and the inboard end 44. The outboard end 42 is coupled to the wing 14 of the aircraft 10*a*, 10*b*, and the inboard end 44 is coupled to the fuselage 16 of the aircraft 10*a*, 10*b*.

As discussed above, in one version, the strut 40 comprises the strut tension member 54 (see FIG. 1) comprising one of, a cable 56 (see FIG. 1), a rod 58 (see FIG. 1), a cord 59 (see FIG. 1), or another suitable strut tension member structure. In another version, the strut 40 comprises the strut tension member 54 axially positioned within the interior 74 (see FIGS. 2A-2B) of the strut structure 72 (see FIGS. 1, 2A-2B). The strut structure 72 comprises the airfoil section 78 (see FIGS. 1, 3A=3C) having the structural leading edge 80 (see FIGS. 2A-2B, 3A-3C) and the structural trailing edge 82 (see FIGS. 2A-2B, 3A-3C).

Figure 4A:
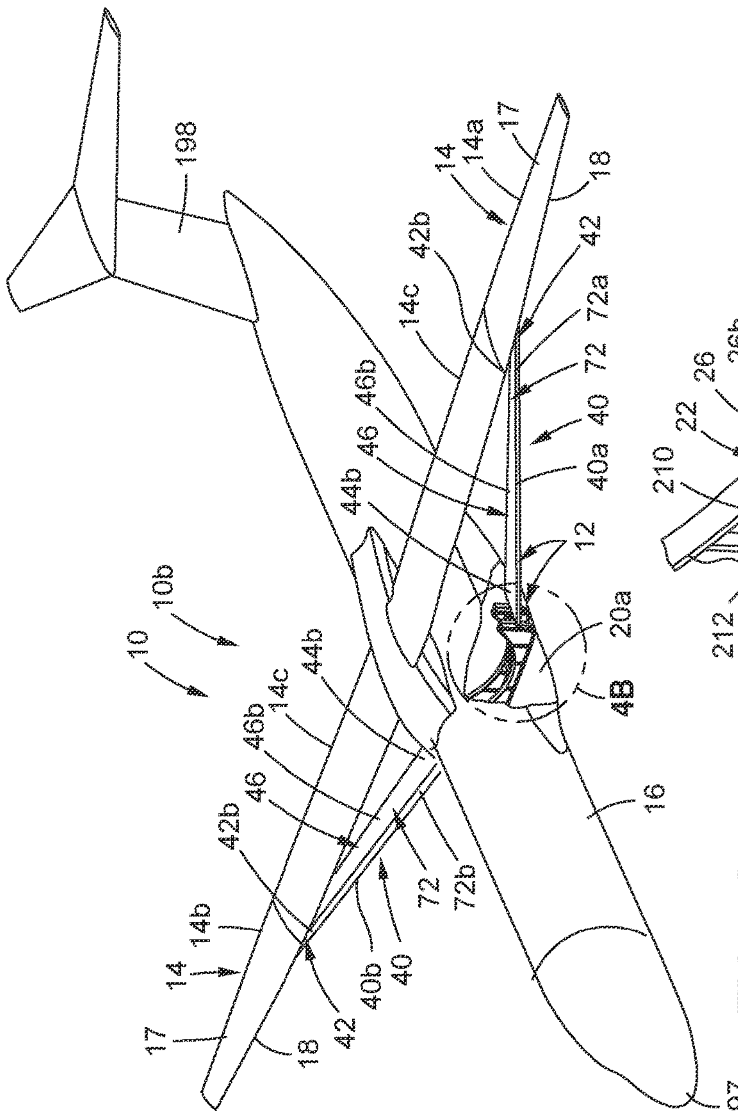
FIG. 4A is an illustration of a front perspective view of an exemplary aircraft having wings each with a version of a strut assembly of the disclosure.
Figure 4B:
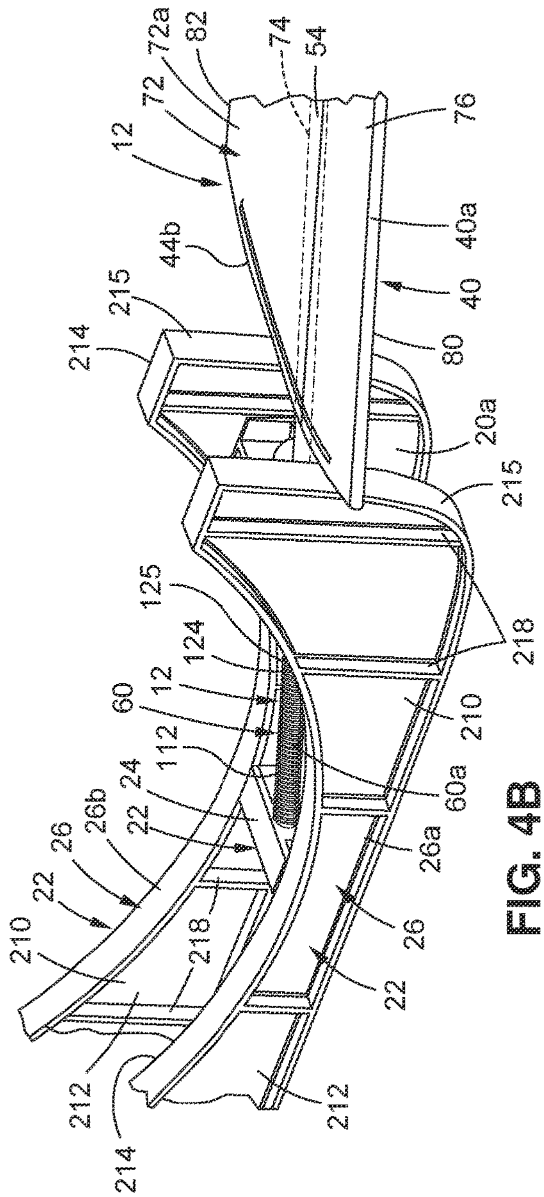
FIG. 4B is an illustration of a front perspective view of a close-up of circle 4B of FIG. 4A, showing a strut assembly, a center fitting, a forward bulkhead, and an aft bulkhead.
Figure 4C:
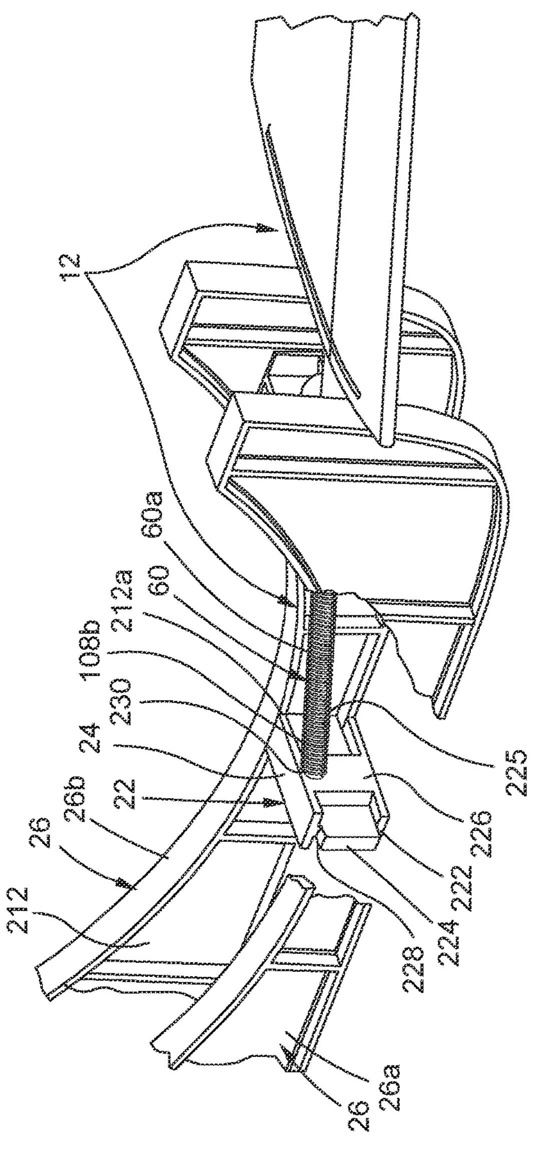
FIG. 4C is an illustration of a front perspective view of the strut assembly, center fitting, and bulkheads of FIG. 4B, with a portion of the forward bulkhead removed.
Figure 4D:
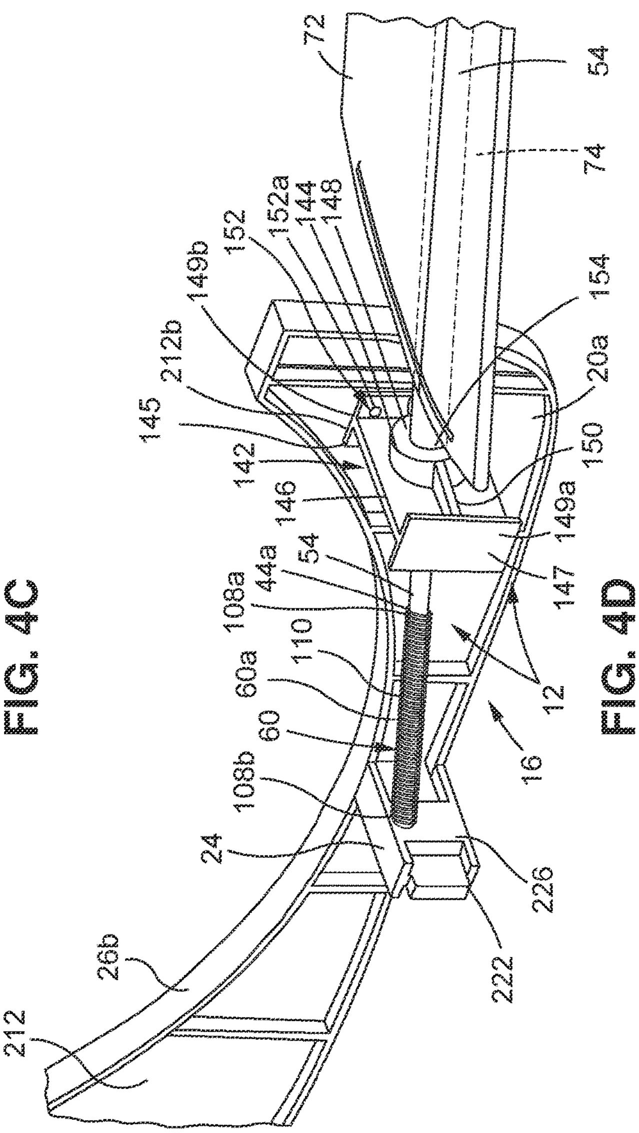
FIG. 4D is an illustration of a front perspective view of the strut assembly, center fitting, and aft bulkhead of FIG. 4C, with the forward bulkhead removed.

The strut assembly 12 further comprises at least one tensioner member 60 (see FIG. 1), such as the spring member 60*a* (see FIG. 1), having the first end 108*a* (see FIG. 4D) coupled, or attached, to the strut 40, such as the strut tension member 54, and the second end 108*b* (see FIG. 4D) coupled, or attached, to the fuselage structure 22, such as the center fitting 24 (see FIG. 4D). The second end 108*b* is opposite the first end 108*a*. As shown in FIG. 4D, the tensioner member 60, such as the spring member 60*a*, has the extendable body 110 formed between the first end 108*a* and the second end 108*b*.

As shown in FIG. 1, the strut assembly 12 further comprises the first fitting element 142 having the through opening 154 and the bearing surface 156 facing inboard. In one version, the strut assembly 12 further comprises the bushing element 180 (see FIG. 1) disposed within the through opening 154 of the first fitting element 142. The bushing element 180 (see FIGS. 5B, 5D) has the opening 182 (see FIGS. 5B, 5D) receiving the first portion 155*a* (see FIGS. 5B, 5D) of the strut 40, such as the strut tension member 54, extending through both the bushing element 180 and the first fitting element 142. As shown in FIG. 1, the bushing element 180 may be in the form of the tube member 184, the open cylinder 185, or another suitable bushing element structure.

As shown in FIG. 1, the strut assembly 12 further comprises the second fitting element 164 having the through opening 172 receiving the second portion 155*b* (see FIGS. 5B, 5D) of the strut 40, such as the strut tension member 54, extending through the second fitting element 164. The second fitting element 164 (see FIGS. 1, 5B, 5D) has the bearing surface 174 (see FIGS. 1, 5B) facing outboard and opposite the bearing surface 156 (see FIGS. 1, 5B, 5E) of the first fitting element 142 (see FIGS. 1, 5B, 5E). The at least one spring member 60*a* maintains tension 136 in the strut 40, such as the strut tension member 54, to always keep the strut 40, such as the strut tension member 54, taut and in tension 136, to prevent or minimize drooping of the strut 40, for example, the strut tension member 54, or the strut tension member 54 within the strut structure 72, to obtain droop prevention 138 (see FIG. 1) or droop minimization 140 of the strut 40.

When the vehicle 10, such as the aircraft 10*a*, 10*b*, is on ground in, or at, the 1 g on ground condition 30 (see FIGS. 1, 8A), the at least one spring member 60*a* applies a tension load 134 (see FIG. 1), or tension force, on the strut tension member 54, to prevent or to minimize drooping of the strut 40. When the vehicle 10, such as the aircraft 10*a*, 10*b*, is in flight in, or at, a 2.5 g up-bending of wing flight condition 32 (see FIGS. 1, 9A), when the wing 14 is bending up, a tension 136 in the strut tension member 54 is proportional, or about proportional, to a vertical acceleration 34 (see FIG. 1) of the vehicle 10, such as the aircraft 10*a*, 10*b*. When the vehicle 10, such as the aircraft 10*a*, 10*b*, is in flight in, or at, a minus 1 g pushover flight condition 36 (see FIGS. 1, 10A), when the wing 14 is bending down, the at least one spring member 60*a* applies a tension load 134 (see FIG. 1), or tension force, on the strut tension member 54, to prevent or to minimize drooping of the strut 40, and does not apply excessive tension load, or an excess of tension load 134, or tension force, to the wing 14.

Now referring to FIGS. 2A-2B, FIG. 2A is an illustration of a front perspective view of the vehicle 10, such as the aircraft 10*a*, with wings 14 each having an exemplary strut assembly 12 of the disclosure with another version of the strut 40 in the form of the strut tension member 54 within a strut structure 72, and the strut tension member 54 extending into the interior 20*a* of the fuselage 16 of the vehicle 10, such as the aircraft 10*a*. FIG. 2B is an illustration of a front perspective view of the vehicle 10, such as the aircraft 10*a*, with wings 14 each having an exemplary strut assembly 12 of the disclosure with another version of the strut 40 in the form of the strut tension member 54 within the strut structure 72, where the strut structure 72 comprises the telescoping strut structure 72*c*.

As shown in FIGS. 2A-2B, the vehicle 10, such as the aircraft 10*a*, comprises two wings 14, such as the first wing 14*a* and the second wing 14*b*, attached to the fuselage 16, and extending in opposite directions away from each other. A strut-wing joint 15 (see FIG. 2A) is formed between each wing 14 and each strut 40. Each wing 14 has the topside 17 (see FIGS. 2A-2B) and the underside 18 (see FIGS. 2A-2B). As shown in FIGS. 2A-2B, the vehicle 10, such as the aircraft 10*a*, further comprises a nose 197, a tail 198, and engines 200.

As shown in FIGS. 2A-2B, the strut 40 has the outboard end 42, the inboard end 44 opposite the outboard end 42, and the elongate body 46 formed between the outboard end 42 and the inboard end 44. The outboard end 42 of each strut 40 is coupled, or attached, to each wing 14 of the vehicle 10, such as the aircraft 10*a*. As shown in FIGS. 2A-2B, the strut tension member 54 has the outboard end 42*a*, the inboard end 44*a* opposite the outboard end 42*a*, and the elongate body 46*a* formed between the inboard end 44*a* and the outboard end 42*a*.

Preferably, the outboard end 42 of the strut 40 is coupled, or attached, to a first underside portion 18*a* (see FIGS. 2A-2B) on the underside 18 (see FIGS. 2A-2B) of the wing 14, to form the strut-wing joint 15 (see FIG. 2A). The wing strut fairing 48 (see FIGS. 2A-2B) is shown at the outboard end 42 of the strut 40, at the junction of the first underside portion 18*a* of the wing 14 and the outboard end 42 of the strut 40. As shown in FIGS. 2A-2B, the outboard end 42*a* of the strut tension member 54 is coupled, or attached, to the wing 14, such as the underside 18 of the wing 14, of the vehicle 10, such as the aircraft 10*a*.

A fuselage strut fairing 52 (see FIGS. 2A-2B) is shown at the opening 50 (see FIG. 2A) of the fuselage 16. In one version, as shown in FIG. 2A, the elongate body 46*a* of the strut tension member 54 extends axially from the wing 14, through the opening 50 in the fuselage 16, and into the interior 20*a* of the fuselage 16, and the inboard end 44*a* of the strut tension member 54 is coupled, or attached, to at least one tensioner member 60, such as at least one spring member 60*a*, within the interior 20*a* of the fuselage. In another version, as shown in FIG. 2B, the elongate body 46*a* of the strut tension member 54 extends axially from the wing 14 and within the interior 74 of the strut structure 72, and the inboard end 44*a* of the strut tension member 54 is coupled, or attached, to the at least one tensioner member 60, such as the at least one spring member 60*a*, within the interior 74 of the strut structure 72.

As shown in FIGS. 2A-2B, strut tension member 54 is axially positioned within the interior 74 of the strut structure 72. As shown in FIGS. 2A-2B, the strut structure 72 has the interior 74 and the exterior 76, and further has the outboard end 42*b* and the inboard end 44*b*, where the inboard end 44*b* is opposite the outboard end 42*b*, and the elongate body 46*b* formed between the inboard end 44*b* and the outboard end 42*b*. As shown in FIGS. 2A-2B, the outboard end 42*b* of the strut structure 72 is coupled, or attached, to the wing 14, such as the underside 18 of the wing 14, of the vehicle 10, such as the aircraft 10*a*. As further shown in FIG. 2A, the inboard end 44*b* of the strut structure 72 is coupled, or attached, at the opening 50 of the fuselage 16, of the vehicle 10, such as the aircraft 10*a*. With the version of the strut assemblies 12 shown in FIG. 2A, a portion of the strut tension member 54, the first fitting element 142 (see FIG. 1), optionally all or part of the bushing element 180 (see FIG. 1), the second fitting element 164 (see FIG. 1), and the tensioner member 60 (see FIG. 1), such as the spring member 60*a* (see FIG. 1), are positioned in the interior 20*a* of the fuselage 16.

As shown in FIGS. 2A-2B, the strut structure 72 comprises the structural leading edge 80, the structural trailing edge 82, and the outer mold line 84 (see FIG. 2A). The strut structure 72 further has a length 86 (see FIGS. 3A-3C). As shown in FIG. 2A, in one version, the strut structure 72 comprises the strut skin 90, such as panels on the exterior 76 of the strut structure 72. The strut structure 72 may further comprise one or more spars 92 (see FIGS. 1, 2B, 3C), two or more ribs 94 (see FIGS. 1, 2B), two or more strut fittings 96 (see FIG. 1), and other suitable components or structures. Each strut fitting 96 preferably connects one or more of the ribs 94 (see FIG. 2B) to the strut tension member 54, so that the strut tension member 54 does not rotate during flight. The spars 92, the ribs 94, and the strut fittings 96 are positioned in the interior 74 of the strut structure 72, and the spars 92 (see FIG. 3C) are positioned parallel to the length 86 (see FIG. 3C) of the strut structure 72.

As shown in FIG. 2B, in another version, the strut structure 72 comprises the telescoping strut structure 72*c* comprising the fixed exterior sleeve section 102 and the movable exterior sleeve section 104 having a portion 104*a* housed within the fixed exterior sleeve section 102. FIG. 2B shows the telescoping strut structure 72*c* in a retracted position 106 with the portion 104*a* of the movable exterior sleeve section 104 housed within the fixed exterior sleeve section 102. The telescoping strut structure 72*c* has a retracted length in the retracted position 106. The portion 104*a* of the movable exterior sleeve section 104 is configured to move or telescope, and moves or telescopes, from the retracted position 106 to an extended position (not shown).

As shown in FIG. 2B, the telescoping strut structure 72*c* is configured to move back and forth in an outboard direction 202 and an inboard direction 204. With the telescoping strut structure 72*c*, the strut assembly 12, including the strut tension member 54, the first fitting element 142 (see FIGS. 1, 2B), optionally the bushing element 180 (see FIG. 1), the second fitting element 164 (see FIGS. 1, 2B), and the tensioner member 60 (see FIGS. 1, 2B), such as the spring member 60*a* (see FIGS. 1, 2B), are positioned in the interior 74 of the strut structure 72.

Figure 3A:
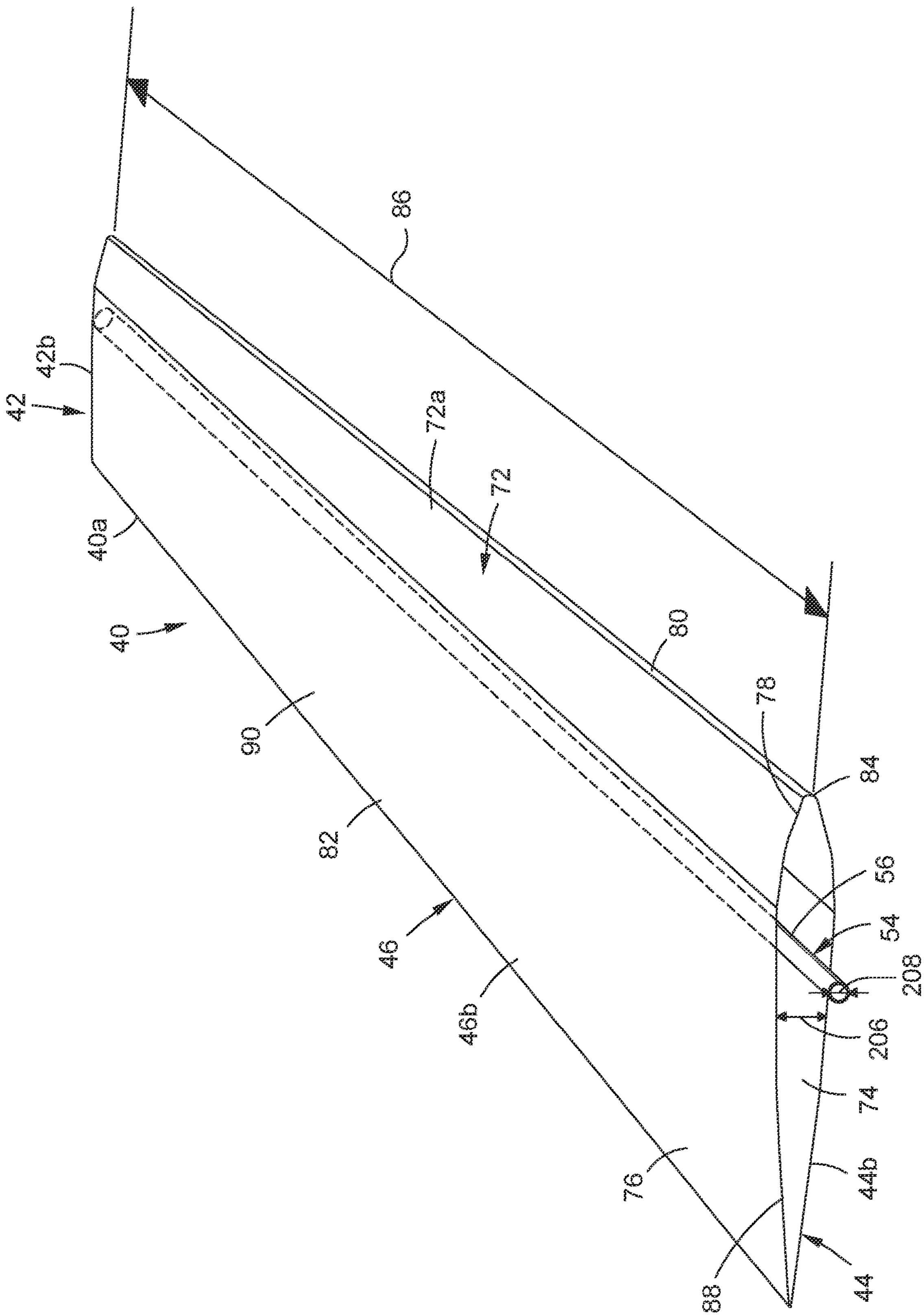
FIG. 3A is an illustration of a right side perspective view of a version of a strut with one strut tension member.
Figure 3B:
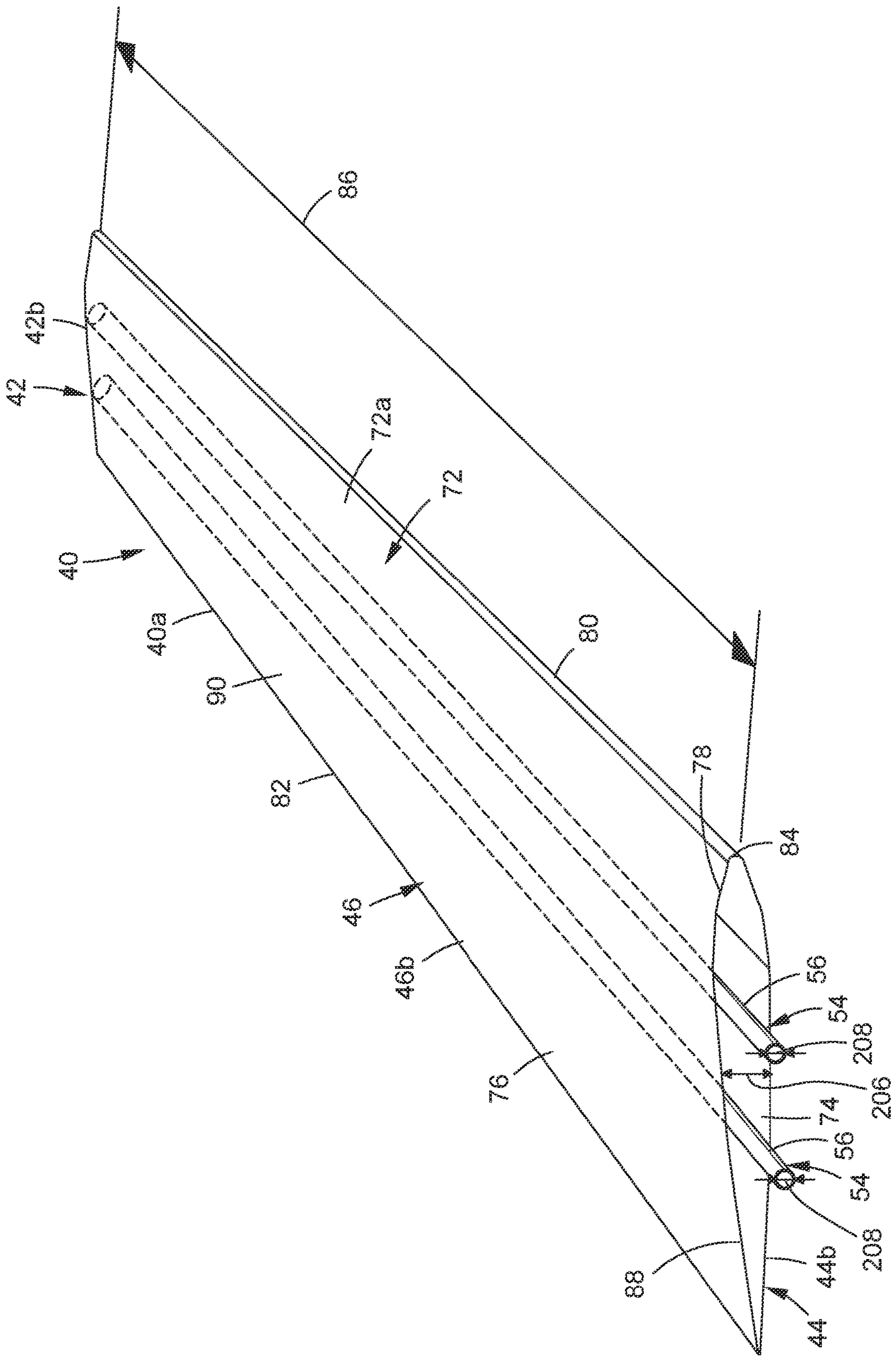
FIG. 3B is an illustration of a right side perspective view of another version of a strut with two strut tension members.
Figure 3C:
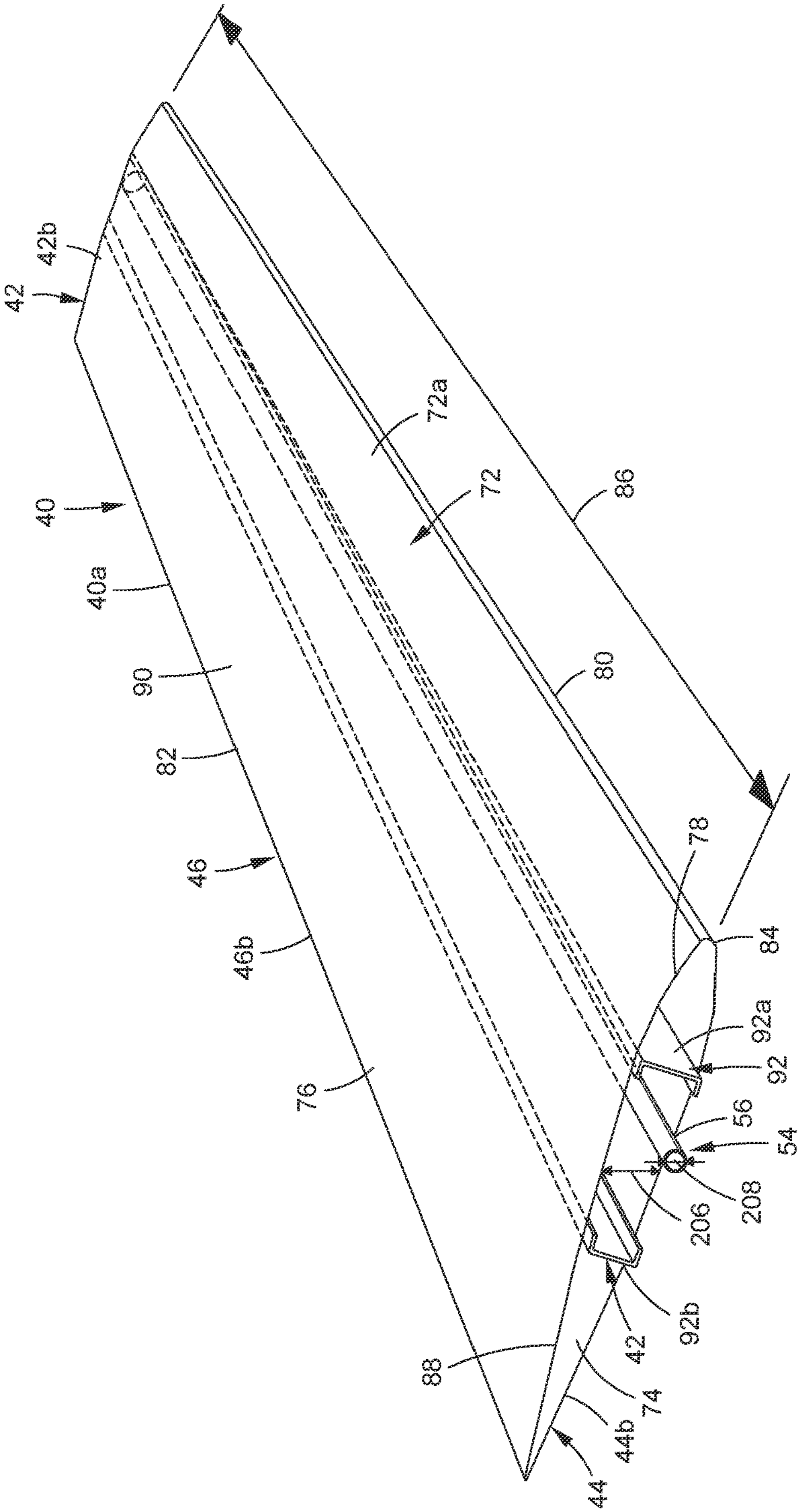
FIG. 3C is an illustration of a right side perspective view of another version of a strut with one strut tension member positioned between two spars.

Now referring to FIGS. 3A-3C, FIG. 3A is an illustration of a right side perspective view of a version of a strut 40, such as a first strut 40*a*, with one strut tension member 54, such as in the form of a cable 56, positioned within the strut structure 72, such as the first strut structure 72*a*. FIG. 3B is an illustration of a right side perspective view of another version of a strut 40, such as the first strut 40*a*, with two strut tension members 54, such as in the form of cables 56, positioned within the strut structure 72, such as the first strut structure 72*a*. FIG. 3C is an illustration of a right side perspective view of another version of a strut 40, such as the first strut 40*a*, with one strut tension member 54 positioned within the strut structure 72, such as the first strut structure 72*a*, and with the one strut tension member 54 positioned between two spars 92, such as a first spar 92*a* and a second spar 92*b*.

As shown in FIGS. 3A-3C, the strut 40 has the outboard end 42, the inboard end 44 opposite the outboard end 42, and the elongate body 46 formed between the inboard end 44 and the outboard end 42. As further shown in FIGS. 3A-3C, the strut structure 72 has the outboard end 42*b*, the inboard end 44*b* opposite the outboard end 42*b*, and the elongate body 46*b* formed between the inboard end 44*b* and the outboard end 42*b*. As further shown in FIGS. 3A-3C, the strut 40 comprises the strut tension member(s) 54 axially positioned within the interior 74 of the strut structure 72, and extending outwardly from the inboard end 44*b* of the strut structure 72 and extending into the interior 74 of the strut structure 72 and extending the length 86 of the strut structure 72. Each strut tension member 54 has a diameter 208 (see FIGS. 3A-3C). As further shown in FIGS. 3A-3C, the strut structure 72 has the outboard end 42*b*, the inboard end 44*b* opposite the outboard end 42*b*, and the elongate body 46*b* formed between the inboard end 44*b* and the outboard end 42*b*.

As further shown in FIGS. 3A-3C, the strut structure 72 comprises the airfoil section 78 having the structural leading edge 80 and the structural trailing edge 82, the outer mold line 84, the length 86, the airfoil shape cross section 88, and a thickness 206. The thickness 206 of the strut structure 72 of the strut 40 is greater than the diameter 208 of the strut tension member(s) 54. As further shown in FIGS. 3A-3C, the strut structure 72 comprises the strut skin 90, such as panels, on the exterior 76 of the strut structure 72. As shown in FIG. 3C, the two spars 92, such as the first spar 92*a* and the second spar 92*b*, are positioned in the interior 74 of the strut structure 72, and spaced along the length 86 of the strut structure 72.

Now referring to FIG. 4A, FIG. 4A is an illustration of a front perspective view of an exemplary vehicle 10, such as an aircraft 10*b*, having wings 14, such as a first wing 14*a* and a second wing 14*b*. As further shown in FIG. 4A, the aircraft 10*b* has a nose 197 and a tail 198. As shown in FIG. 4A, each wing 14 has the topside 17 and the underside 18 and comprises a strut-braced wing 14*c* having a version of a strut assembly 12 coupled, or attached, to the wing 14 and the fuselage 16. Each strut assembly 12 comprises the strut 40 (see FIG. 4A) in the form of the strut tension member 54 (see FIG. 4D) within the strut structure 72 (see FIG. 4A), where the strut tension member 54 extends into an interior 20*a* of the fuselage 16 of the aircraft 10*b*. FIG. 4A shows two struts 40, such as a first strut 40*a* and a second strut 40*b*, having strut structures 72, such as a first strut structure 72*a* and a second strut structure 72*b*. FIG. 4A shows the outboard end 42 and the elongate body 46 of each strut 40, and shows the outboard end 42*b*, the inboard end 44*b*, and the elongate body 46*b* of each strut structure 72.

Now referring to FIG. 4B, FIG. 4B is an illustration of a front perspective view of a close-up of circle 4B of FIG. 4A, showing the strut assembly 12 with the strut 40, such as the first strut 40*a*, in the form of the strut tension member 54 axially positioned within the interior 74 of the strut structure 72, such as the first strut structure 72*a*, and extending into the interior 20*a* of the fuselage 16. FIG. 4B shows the inboard end 44*b*, the interior 74, the exterior 76, the structural leading edge 80, and the structural trailing edge 82 of the strut structure 72.

FIG. 4B further shows the fuselage structures 22, such as the center fitting 24 and the bulkheads 26. As shown in FIG. 4B, the bulkheads 26 include the forward bulkhead 26*a* and the aft bulkhead 26*b* aligned opposite to each other with the center fitting 24 coupled, or attached, to and between the bulkheads 26. As shown in FIG. 4B, each bulkhead 26, such as the forward bulkhead 26*a* and the aft bulkhead 26*b*, has a body structure 210, such as in the form of a generally U-shaped body structure, where the body structure 210 has a forward side 212, or front side, an aft side 214, or back side, a first end 215, a second end 216 (see FIG. 5C) opposite the first end 215, and support portions 218 formed along the forward side 212 and the aft side 214. As shown in FIG. 4B, the center fitting 24 is coupled, or attached, to and between the aft side 214 of the forward bulkhead 26*a* and the forward side 212 of the aft bulkhead 26*b*. The first ends 215 of the forward bulkhead 26*a* and the aft bulkhead 26*b* are coupled, or attached, to first interior side surfaces 220*a* (see FIG. 5D) of the fuselage 16, via one or more attachment elements 152 (see FIG. 5D), such as bolts 152*a* (see FIG. 5D), screws, or other suitable attachment elements. The second ends 216 of the forward bulkhead 26*a* and the aft bulkhead 26*b* are coupled, or attached, to second interior side surfaces 220*b* (see FIG. 5D) of the fuselage 16, via one or more attachment elements 152 (see FIG. 5D), such as bolts 152*a* (see FIG. 5D), screws, or other suitable attachment elements.

FIG. 4B further shows the tensioner member 60, such as the spring member 60*a*, of the strut assembly 12. In one version, as shown in FIG. 4B, the spring member 60*a* comprises a mechanical spring 112 in the form of a tension spring 125, for example, a coil spring 124.

Now referring to FIG. 4C, FIG. 4C is an illustration of a front perspective view of the strut assembly 12, the center fitting 24, and the bulkheads 26, such as the forward bulkhead 26*a* and the aft bulkhead 26*b*, of FIG. 4B, with a portion of the forward bulkhead 26*a* removed to show additional features of the tensioner member 60, such as the spring member 60*a*, and the center fitting 24. As shown in FIG. 4C, the fuselage structure 22, such as the center fitting 24, comprises a body structure 222, such as in the form of a generally I-beam shaped body structure, where the body structure 222 has a forward end 224, or front end, an aft end 225, or back end, a first side 226, and a second side 228. The forward end 224 (see FIG. 4C) of the body structure 222 (see FIG. 4C) of the center fitting 24 (see FIG. 4C) is coupled, or attached, to a first portion 214*a* (see FIG. 5D) on the aft side 214 (see FIG. 5D) of the forward bulkhead 26*a* (see FIGS.

4C, 5D). As shown in FIG. 4C, the aft end 225 of the body structure 222 of the center fitting 24 is coupled, or attached, to a first portion 212*a* (see also FIG. 5D) on the forward side 212 (see also FIG. 5D) of the aft bulkhead 26*b*.

As further shown in FIG. 4C, the first side 226 of the body structure 222 has an attachment point 230 for attachment to the second end 108*b* of the tensioner member 60, such as the spring member 60*a*, of the strut assembly 12. As shown in FIG. 5D, the second side 228 of the body structure 222 of the center fitting 24 also has an attachment point 230 for attachment to the second end 108*b* of the tensioner member 60, such as the spring member 60*a*, of the strut assembly 12, such as the second strut assembly 12*b*.

Now referring to FIG. 4D, FIG. 4D is an illustration of a front perspective view of the strut assembly 12, the center fitting 24, and the aft bulkhead 26*b* of FIG. 4C, with the forward bulkhead 26*a* removed to show further features of the strut assembly 12. As shown in FIG. 4D, the strut tension member 54 is axially positioned within the interior 74 of the strut structure 72 and extends into the interior 20*a* of the fuselage 16 (see also FIG. 4A), and extends through the first fitting element 142, is fixedly attached to the second fitting element 164 (see FIG. 5A), and the inboard end 44*a* of the strut tension member 54 is coupled, or attached, to the first end 108*a* of the tensioner member 60, such as the spring member 60*a*. As further shown in FIG. 4C, the second end 108*b* of the tensioner member 60, such as the spring member 60*a*, is coupled, or attached, to the attachment point 230 on the first side 226 of the body structure 222. FIG. 4D shows the extendable body 110 of the tensioner member 60, such as the spring member 60*a*, extended between the center fitting 24 and the inboard end 44*a* of the strut tension member 54.

As further shown in FIG. 4D, the first fitting element 142 has the first end 144, the second end 145, and the body 146 formed between the first end 144 and the second end 145. As shown in FIG. 4D, the body 146 is comprised of the load spanning beam 147, for example, an I-beam portion 147*a* (see FIG. 5D), and the cylindrical portion 148 inserted, or formed, through the load spanning beam 147. The load spanning beam 147 of the body 146 has the first side 149*a* (see FIG. 4D), such as the forward side, and the second side 149*b* (see FIG. 4D), such as the aft side. One or more rib elements 150 (see FIG. 4D) are coupled between the exterior of the cylindrical portion 148 and the interiors of the first side 149*a* and the second side 149*b* and are fixedly attached to each other.

The exterior of the first side 149*a* (see FIG. 4D) of the load spanning beam 147 (see FIG. 4D) is configured for coupling, or attachment, to a second portion 214*b* (see FIG. 5D) of the aft side 214 (see FIG. 5D) of the forward bulkhead 26*a* (see FIGS. 4D, 5D), via attachment elements 152 (see FIGS. 5A, 5D), such as bolts 152*a* (see FIGS. 5A, 5D), inserted through openings 232 (see FIGS. 5A, 5D) in the second portion 214*b*. As further shown in FIG. 4D, the exterior of the second side 149*b* of the load spanning beam 147 is coupled, or attached, to a second portion 212*b* of the forward side 212 of the aft bulkhead 26*b*, via attachment elements 152, such as bolts 152*a*, inserted through openings 232 (see FIGS. 5A, 5D) in the second portion 212*b*. As further shown in FIG. 4D, the cylindrical portion 148 of the body 146 of the first fitting element 142 has the through opening 154 receiving the first portion 155*a* (see FIGS. 5B, 5D) of the strut 40, such as the strut tension member 54, extending through the first fitting element 142.

Figure 4G:
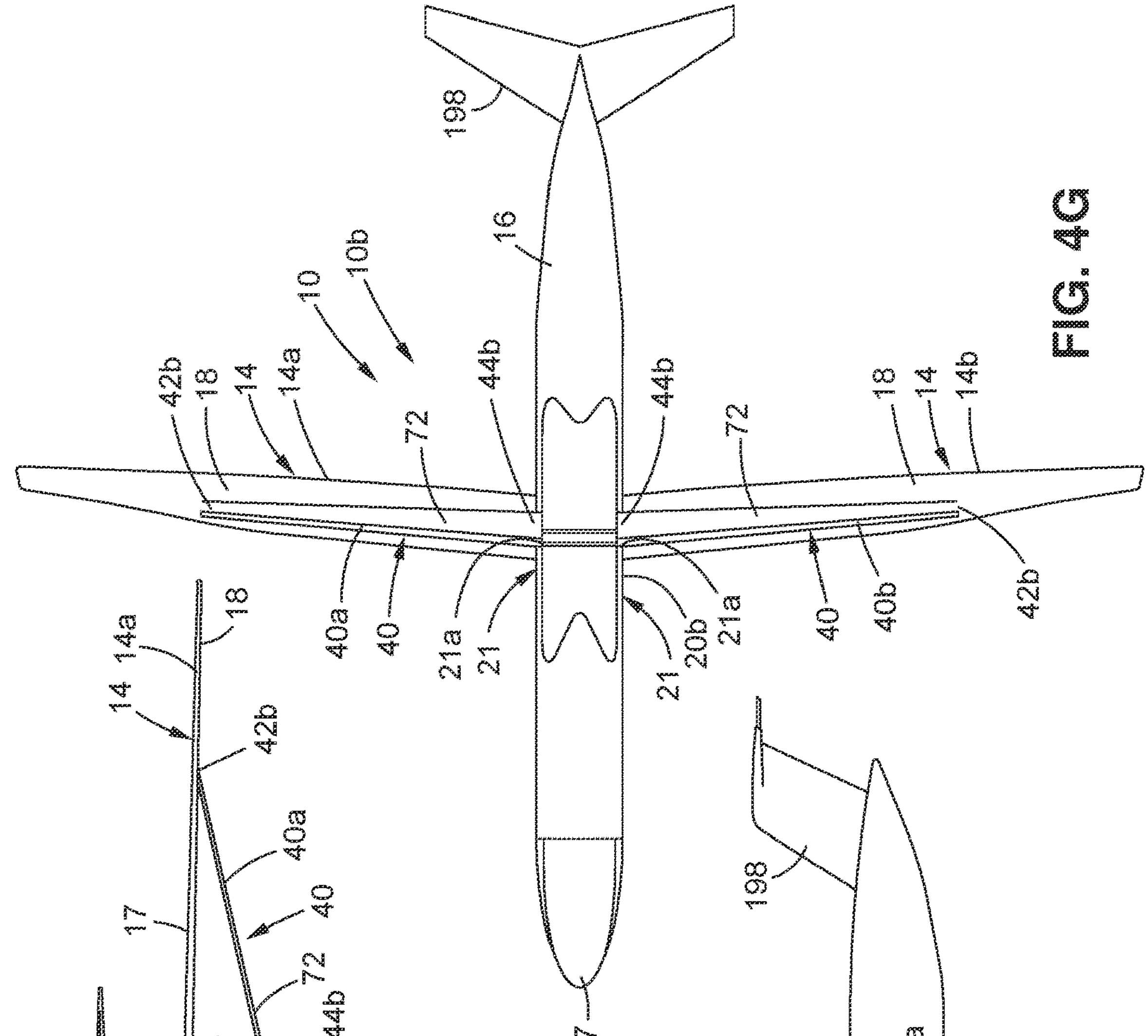
FIG. 4G is an illustration of a bottom view of the aircraft of FIG. 4A.
Figure 4E:
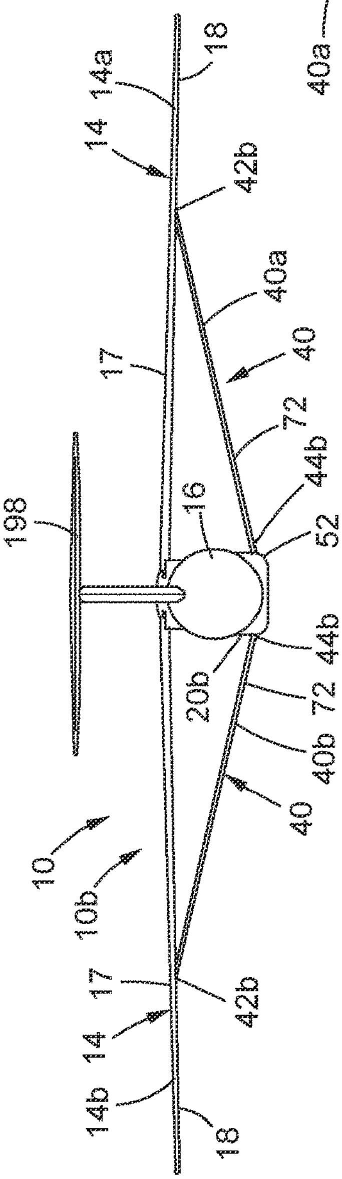
FIG. 4E is an illustration of a front view of the aircraft of FIG. 4A.

Now referring to FIG. 4E, FIG. 4E is an illustration of a front view of the vehicle 10, such as the aircraft 10*b*, of FIG. 4A. FIG. 4E shows the wings 14, such as the first wing 14*a* and the second wing 14*b* attached to the fuselage 16, shows the topside 17 and underside 18 of the wings 14, shows the tail 198, and shows the struts 40, such as the first strut 40*a* and the second strut 40*b*. As shown in FIG. 4E, each strut 40 has the strut structure 72 with the outboard end 42*b* coupled, or attached, to the underside 18 of the wing 14, and the inboard end 44*b*, coupled, or attached, to the exterior 20*b* of the fuselage 16. FIG. 4E further shows the fuselage strut fairing 52.

Figure 4F:
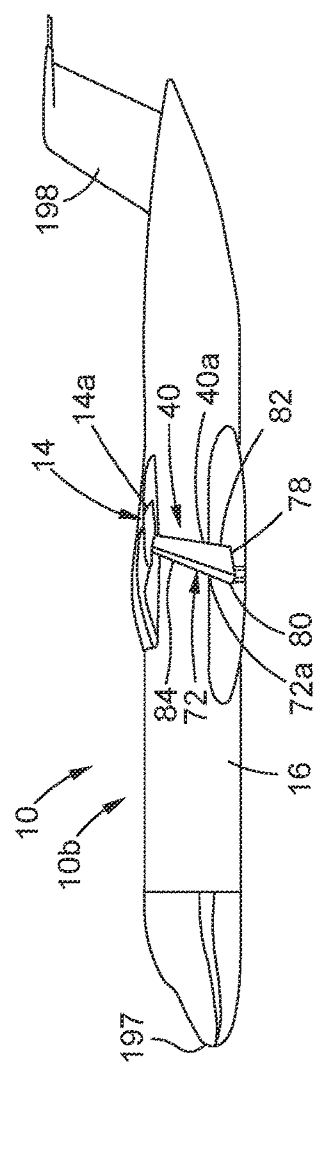
FIG. 4F is an illustration of a left side view of the aircraft of FIG. 4A.

Now referring to FIG. 4F, FIG. 4F is an illustration of a left side view of the vehicle 10, such as the aircraft 10*b*, of FIG. 4A. FIG. 4F shows the strut 40, such as the first strut 40*a*, with the strut structure 72, such as the first strut structure 72*a*, coupled, or attached, between the first wing 14*a* and the fuselage 16. FIG. 4F further shows the strut structure 72, such as the first strut structure 72*a*, comprising the airfoil section 78 having the structural leading edge 80, the structural trailing edge 82, and the outer mold line 84. FIG. 4F further shows the nose 197 and the tail 198 of the aircraft 10*b*.

Now referring to FIG. 4G, FIG. 4G is an illustration of a bottom view of the vehicle 10, such as the aircraft 10*b*, of FIG. 4A. FIG. 4G shows the wings 14, such as the first wing 14*a* and the second wing 14*b*, with the struts 40, such as the first strut 40*a* and the second strut 40*b*, respectively. As shown in FIG. 4G, each strut 40 has the strut structure 72 with the outboard end 42*b* coupled, or attached, to the underside 18 of the wing 14, and the inboard end 44*b*, coupled, or attached to the exterior 20*b* of the fuselage 16. FIG. 4G further shows the nose 197 and the tail 198 of the aircraft 10*b*.

Now referring to FIGS. 5A-5F, FIG. 5A is an illustration of a top view of a version of exemplary strut assemblies 12 in an interior 20*a* of a fuselage 16 of a vehicle 10, such as an aircraft 10*b*, when the aircraft 10*b* is in flight, for example, in the 2.5 g up-bending of wing flight condition 32 (see also FIG. 1), and where the strut assemblies 12 have compression springs 126. FIG. 5B is an illustration of a front view of a strut assembly 12 of FIG. 5A, when the vehicle 10, such as the aircraft 10*b*, is in flight in the 2.5 g up-bending of wing flight condition 32, and where the strut assembly 12 has the compression spring 126. FIG. 5C is an illustration of a right side perspective view of a strut assembly 12 of FIG. 5A, when the vehicle 10, such as the aircraft 10*b*, is in flight in the 2.5 g up-bending of wing flight condition 32, and where the strut assembly 12 has the compression spring 126. FIG. 5D is an illustration of a top view of another version of exemplary strut assemblies 12 in an interior 20*a* of a fuselage 16 of the vehicle 10, such as the aircraft 10*b*, when the aircraft 10*b* is in flight in the 2.5 g up-bending of wing flight condition 32, and where the strut assemblies 12 have tension springs 125. FIG. 5E is an illustration of a front view of the strut assemblies 12 of FIG. 5D, when the vehicle 10, such as the aircraft 10*b*, is in flight in the 2.5 g up-bending of wing flight condition 32, and where the strut assemblies 12 have tension springs 125. FIG. 5F is an illustration of a right side perspective view of the strut assembly 12 of FIG. 5D, when the vehicle 10, such as the aircraft 10*b*, is in flight in the 2.5 g up-bending of wing flight condition 32, and where the strut assembly 12 has the tension spring 125.

The strut assemblies 12 comprise the first strut assembly 12*a* (see FIGS. 5A-5F) and the second strut assembly 12*b* (see FIGS. 5A, 5D, 5E). As shown in FIGS. 5A-5F, the first strut assembly 12*a* is positioned in a left portion 16*a* of the fuselage 16, and as further shown in FIGS. 5A, 5D, 5E, the second strut assembly 12*b* is positioned in a right portion 16*b* of the fuselage 16.

FIGS. 5A-5C show a version of the strut assembly 12 comprising tensioner members 60, such as the spring members 60*a*, for example, compression springs 126, each disposed between the first fitting element 142 and the second fitting element 164, and having no center fitting 24 (see FIG. 5D) to which the tensioner members 60, such as the spring members 60*a*, for example, compression springs 126, are attached. In this version of the strut assembly 12 shown in FIGS. 5A-5C, the tensioner members 60, such as the spring members 60*a*, for example, compression springs 126, are used to keep the strut tension member 54 fully tensioned. This version eliminates the use of a center fitting 24 (see FIG. 5D), or attachment, for attaching the tensioner members 60, such as the spring members 60*a*, to the center fitting 24, thus reducing part count and overall weight of the vehicle 10, such as the aircraft 10*a*, 10*b*. In this version, each tensioner member 60, such as the spring member 60*a*, for example, the compression spring 126, is axially pressed between the first fitting element 142 (see FIG. 5A) and the second fitting element 164 (see FIG. 5A).

FIGS. 5D-5F show another version of the strut assembly 12 comprising tensioner members 60, such as the spring members 60*a*, for example, tension springs 125, attached to the center fitting 24, and disposed between the center fitting 24 and the second fitting element 164. As shown in FIGS. 5D-5E, the first strut assembly 12*a* is positioned to the left of the first side 226 of the center fitting 24, and the second strut assembly 12*b* is positioned in a right portion 16*b* of the fuselage 16 to the right of the second side 228 of the center fitting 24. The strut assemblies 12 are positioned between the bulkheads 26 (see FIGS. 5A-5F), such as the forward bulkhead 26*a* (see FIGS. 5A, 5D) and the aft bulkhead 26*b* (see FIGS. 5A-5F).

As shown in FIGS. 5A, 5C, 5D, 5F, each strut assembly 12 comprises the strut 40 in the form of the strut tension member 54 within the strut structure 72. As shown in FIGS. 5C, 5F, the strut structure 72 comprises an airfoil section 78 with an outer mold line 84 and an airfoil shape cross section 88. FIGS. 5C, 5F show the strut skin 90 on the exterior 76 of the strut structure 72, and show spars 92 and ribs 94 in the interior 74 of the strut structure 72.

FIGS. 5A-5F show the strut tension members 54 each having the elongate body 46*a* and each strut tension member 54 comprises a rod 58 (see FIGS. 5A-5C, 5E-5F). In one version, as shown in FIGS. 5A-5B, the inboard end 44*a* is coupled, or attached, to the second fitting element 164. In another version, as shown in FIGS. 5D-5E, the inboard end 44*a* of the strut tension member 54 is coupled, or attached, to the tensioner member 60, such as the spring member 60*a*, and the second end 108*b* of the tensioner member 60, such as the spring member 60*a*, is coupled, or attached, to the center fitting 24. Each tensioner member 60, such as each spring member 60*a*, of each strut assembly 12 has the first end 108*a* (see FIGS. 5A, 5B, 5D, 5E), the second end 108*b* (see FIGS. 5A, 5B, 5D, 5E) opposite the first end 108*a*, and the extendable body 110 (see FIGS. 5A, 5B, 5E) formed between the first end 108*a* and the second end 108*b*. As shown in FIG. 5A, the first end 108*a* of each spring member 60*a*, such as the compression spring 126, is in contact with the first fitting element 142, and the second end 108*b* of each spring member 60*a*, such as the compression spring 126, is in contact with the second fitting element 164. As shown in FIG. 5D, the second end 108*b* of each spring member 60*a*, such as the tension spring 125, is coupled, or attached, to the fuselage structure 22, such as the center fitting 24, at the attachment point 230. As shown in FIG. 5A, the spring members 60*a* comprise mechanical springs 112 in the form of compression springs 126. As shown in FIG. 5E, the spring members 60*a* comprise mechanical springs 112 in the form of tension spring 125, for example, coil springs 124.

As shown in FIGS. 5A-5F, each strut assembly 12 further comprises the first fitting element 142, such as the side-of-body fitting 142*a* (see FIGS. 5A, 5E). The first fitting element 142 has the first end 144 (see FIGS. 5A, 5E), the second end 145 (see FIGS. 5A, 5E), and the body 146 (see FIGS. 5A, 5E) formed between the first end 144 and the second end 145. The body 146 is comprised of the load spanning beam 147 (see FIGS. 5B, 5C, 5D, 5F), for example, the I-beam portion 147*a* (see FIGS. 5B, 5C, 5D, 5F), and the cylindrical portion 148 (see FIGS. 5B, 5C, 5D, 5F) inserted, or formed, through and fixedly attached to the I-beam portion 147*a*, and rib elements 150 (see FIGS. 5C, 5F). As shown in FIGS. 5A, 5D, the exterior of the first side 149*a* (see also FIGS. 5C, 5F) of the I-beam portion 147*a* is coupled, or attached, to the second portion 214*b* of the aft side 214 of the forward bulkhead 26*a*, via attachment elements 152, such as bolts 152*a*, inserted through openings 232 in the second portion 214*b*. As further shown in FIGS. 5A, 5D, the exterior of the second side 149*b* of the I-beam portion 147*a* is coupled, or attached, to the second portion 212*b* of the forward side 212 of the aft bulkhead 26*b*, via attachment elements 152, such as bolts 152*a*, inserted through openings 232 in the second portion 212*b*. FIGS. 5C, 5F show the aft bulkhead 26*b* with the forward side 212, the aft side 214, the first end 215, the second end 216, and the support portions 218. FIG. 5F further shows the first portion 212*a* of the forward side 212 for connection of the aft end 225 of the center fitting 24, and shows the second portion 212*b* of the forward side 212 for connection of the second side 149*b* of the I-beam portion 147*a* of the first fitting element 142. As shown in FIGS. 5C, 5F, the cylindrical portion 148 of the body 146 of the first fitting element 142 has the through opening 154 and the bearing surface 156 at the second end 145 of the first fitting element 142. The bearing surface 156 functions as a stop element 160 (see FIGS. 5C, 5F).

As shown in FIGS. 5A, 5B, 5D, 5E, each strut assembly 12 further comprises the bushing element 180, such as in the form of a tube member 184, disposed within the through opening 154 (see FIGS. 5C, 5F) of the first fitting element 142, such that the exterior surface of the bushing element 180 is in contact against the interior surface of the through opening 154 of the first fitting element 142. Each bushing element 180 has the opening 182 (see FIGS. 5A, 5B, 5D, 5E) receiving the first portion 155*a* (see FIGS. 5B, 5D, 5E) of the strut tension member 54, where the first portion 155*a* extends through both the opening 182 of the bushing element 180 and the through opening 154 of the first fitting element 142.

As shown in FIGS. 5A-5F, each strut assembly 12 further comprises the second fitting element 164 axially aligned with the first fitting element 142, along the elongate body 46*a* of the strut tension member 54. As shown in FIGS. 5C, 5F, the second fitting element 164 is in the form of a tube element 175, and has the first end 165, the second end 166, and the body 168 formed between the first end 165 and the second end 166. Each second fitting element 164 has the through opening 172 (see FIGS. 5C, 5F) receiving the second portion 155*b* (see FIGS. 5A, 5B, 5D, 5E) of the strut tension member 54 extending through the second fitting element 164.

Each second fitting element 164 further has the bearing surface 174 (see FIGS. 5B, 5C, 5F) at the first end 165 (see FIGS. 5C, 5F) of the second fitting element 164. The bearing surface 174 faces outboard and opposite the bearing surface 156 of the first fitting element 142. As shown in FIG. 5B, in the 2.5 g up-bending of wing flight condition 32 (see FIG. 1), the bearing surface 174 of the second fitting element 164 bears directly against the second end 108*b* of the spring member 60*a*, such as the compression spring 126, and the bearing surface 156 of the first fitting element 142 bears directly against the first end 108*a* of the spring member 60*a*, such as the compression spring 126. As shown in FIGS. 5E, 5F, in the 2.5 g up-bending of wing flight condition 32 (see FIG. 1), the bearing surface 174 of the second fitting element 164 bears directly against the bearing surface 156 of the first fitting element 142, and a no gap distance 234*a* (see FIGS. 5D, 5E) with no gap 235 (see FIG. 8E) is shown between the bearing surface 174 of the second fitting element 164 and the bearing surface 156 of the first fitting element 142.

When the vehicle 10, such as the aircraft 10*b*, is in flight, the 2.5 g up-bending of wing flight condition 32 causes tension 136 (see FIG. 1) in the struts 40, such as the strut tension members 54, and in one version, as shown in FIGS. 5E, 5F, the bearing surface 174 of the second fitting element 164 bears against, or contacts, the bearing surface 156 of the first fitting element 142. When the aircraft 10*b* is in flight, the up-bending of the wings 14 causes tension 136 (see FIG. 1) in the struts 40, such as the strut tension members 54. The struts 40, such as the strut tension members 54, undergo tension 136, extend the spring members 60*a*, respectively, and in one version, as shown in FIGS. 5D-5F, the second fitting element 164 bears against the first fitting element 142. In one version, as shown in FIG. 5D, the load path 38 (see FIG. 1) of the load goes from the strut 40, such as the strut tension member 54, within the interior 20*a* of the fuselage 16, to the second fitting element 164, to the first fitting element 142, to the forward and aft bulkheads 26*a*, 26*b*, back to the first fitting element 142 on the opposite side of the fuselage 16 of the aircraft 10*a*, thus, back to the second fitting element 164 on the opposite side, and back to the strut tension member 54, within the interior 20*a* of the fuselage 16. In another version, as shown in FIG. 5A, the load path 38 (see FIG. 1) for the tension load 134 (see FIG. 1) for the 2.5 g up-bending of wing flight condition 32, is from the wing 14 (see FIG. 9A), such as the first wing 14*a* (see FIG. 9A), on the left side of the aircraft 10*b* (see FIG. 9A), to the strut tension member 54 fixedly attached to the second fitting element 164, within the interior 20*a* of the fuselage, to the second fitting element 164, to the first fitting element 142, to the forward and aft bulkheads 26*a*, 26*b* on the left portion 16*a* of the fuselage 16, such as the fuselage carry-through bulkheads, through to the forward and aft bulkheads 26*a*, 26*b* on the right portion 16*b* of the fuselage 16, back to the first fitting element 142, on the opposite side, or right side, of the fuselage 16 of the aircraft 10*b*, back to the second fitting element 164, back to the strut tension member 54, and back to the wing 14, such as the second wing 14*b* (see FIG. 9A), on the right side of the aircraft 10*b* (see FIG. 9A).

As shown in FIGS. 5A, 5E, the strut structure 72 has a land 236 within the interior 74 of the strut structure 72, near the inboard end 44*b* of the strut structure 72 and the exterior 20*b* (see FIG. 2A) of the fuselage 16 at the sides 21 (see FIG. 5D) of the fuselage 16. The land 236 is present so that the strut structure 72 may bear up against the side 21, such as the side portion 21*a* (see FIG. 5D), and avoid damage to the strut structure 72, if a decrease in the length 86 (see FIGS. 3A-3C) of the strut structure 72 is greater than calculated for the aircraft 10*b*, for example, if the aircraft 10*b* encounters greater than the minus 1 g pushover flight condition 36, such that the spring member 60*a* does not have enough travel to take up the deflection.

Figure 6A:
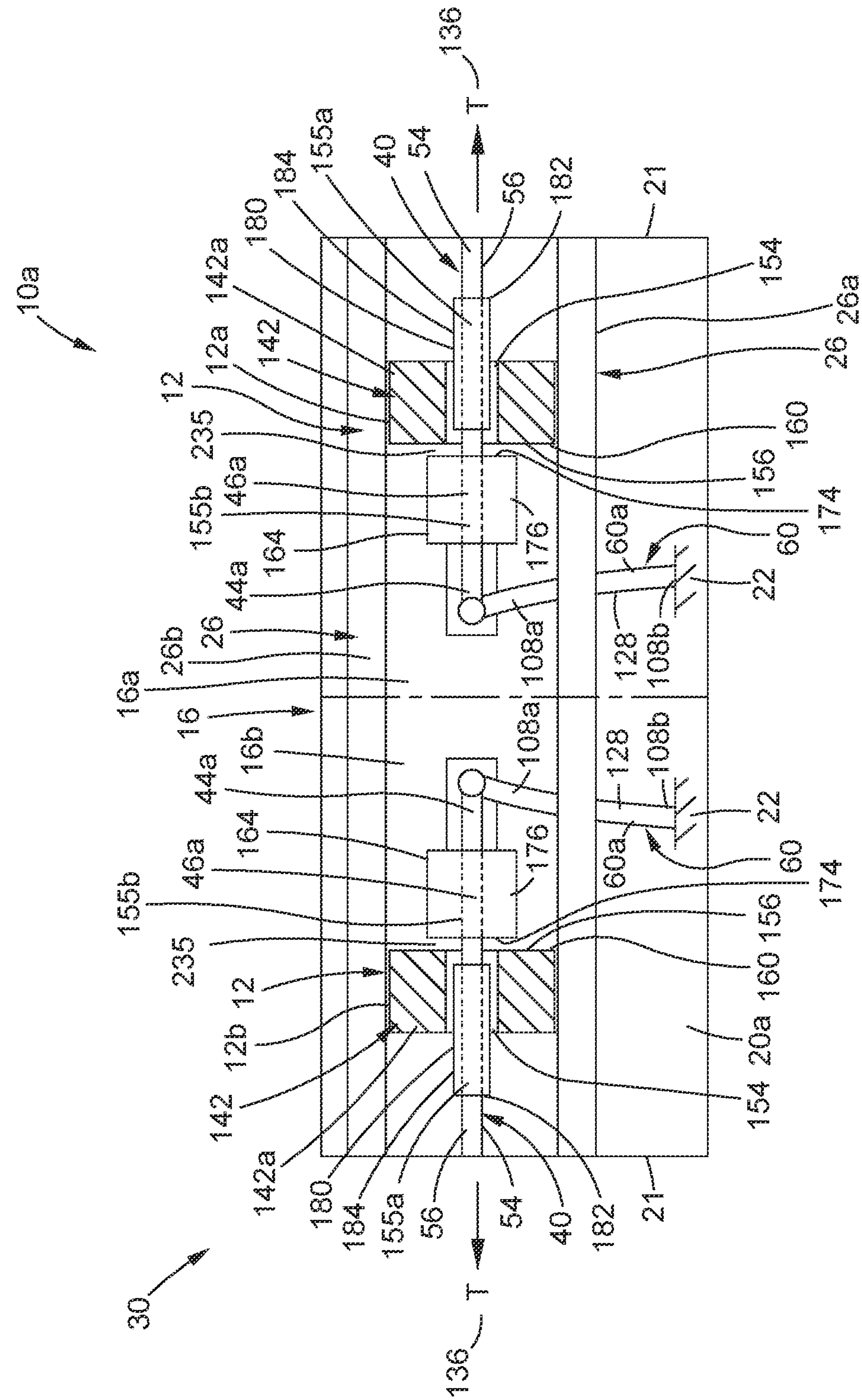
FIG. 6A is an illustration of a front view of a schematic diagram of a version of strut assemblies in a 1 g on ground condition, where each strut assembly has one tensioner member in the form of a cantilever spring.
Figure 6B:
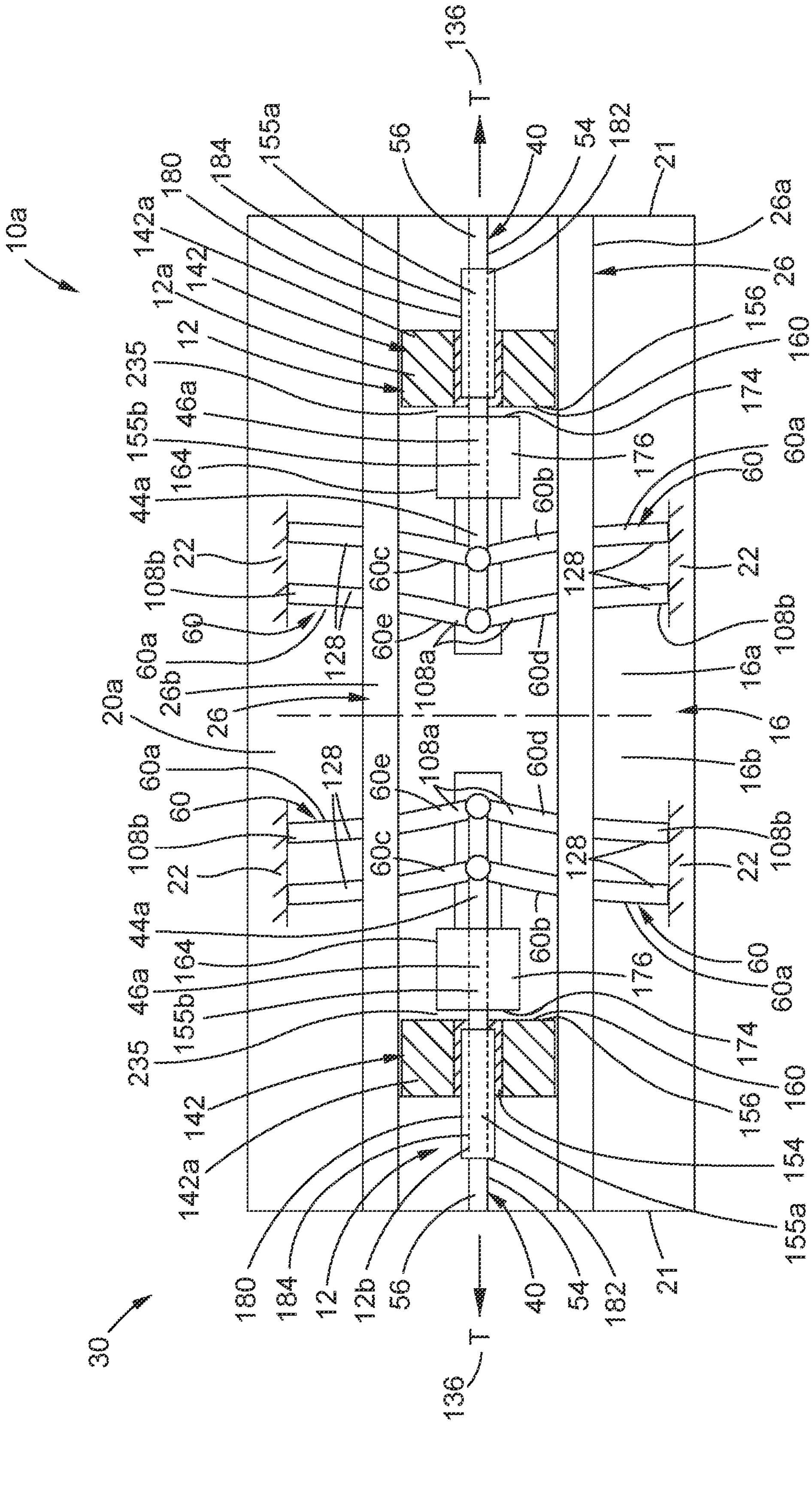
FIG. 6B is an illustration of a front view of a schematic diagram of another version of strut assemblies in the 1 g on ground condition, where each strut assembly has four tensioner members in the form of cantilever springs.

Now referring to FIGS. 6A-6B, FIG. 6A is an illustration of a front view of a schematic diagram of a version of strut assemblies 12 in an interior 20*a* of a fuselage 16 of an aircraft 10*a*, such as when the aircraft 10*a* is on ground in a 1 g on ground condition 30 (see FIG. 1), and where each strut assembly 12 has one (1) tensioner member 60, such as one (1) spring member 60*a*, for example, in the form of a cantilever spring 128. FIG. 6B is an illustration of a front view of a schematic diagram of a version of strut assemblies 12 in the interior 20*a* of the fuselage 16 of the aircraft 10*a* of FIG. 6A, such as when the aircraft 10*a* is on ground in the 1 g on ground condition 30, and where each strut assembly 12 has four (4) tensioner members 60, such as four (4) spring members 60*a*, for example, in the form of cantilever springs 128.

As shown in FIGS. 6A-6B, the strut assemblies 12 comprise the first strut assembly 12*a* and the second strut assembly 12*b*, where the first strut assembly 12*a* is positioned in the left portion 16*a* of the fuselage 16, and the second strut assembly 12*b* is positioned in the right portion 16*b* of the fuselage 16. As shown in FIGS. 6A-6B, each strut assembly 12 comprises the strut 40 in the form of the strut tension member 54. Each strut tension member 54 comprises a cable 56 (see FIGS. 6A-6B). Alternatively, each strut tension member 54 may comprise a rod 58 (see FIG. 1), a cord 59 (see FIG. 1), or another solid member that may have a circular shape cross section 64*a* (see FIG. 1) or a non-circular shape cross section. FIGS. 6A-6B further show the bulkheads 26, or carry-through structures, including the forward bulkhead 26*a* and the aft bulkhead 26*b*, that span across the interior 20*a* of the fuselage 16 between each side 21, or side-of-body, of the fuselage 16.

FIG. 6A shows the strut tension members 54 each having the elongate body 46*a* and the inboard end 44*a* coupled, or attached, to one tensioner member 60, such as one spring member 60*a*, for example, one cantilever spring 128, of the strut assembly 12. As shown in FIG. 6A, each strut assembly 12 has one tensioner member 60, such as one spring member 60*a*, for example, one cantilever spring 128.

FIG. 6B shows the strut tension members 54 each having the elongate body 46*a* and the inboard end 44*a* coupled, or attached, to four tensioner members 60, such as four spring members 60*a*, for example, four cantilever springs 128, of the strut assembly 12. As shown in FIG. 6B, each strut assembly 12 has four tensioner member 60, such as four spring members 60*a*, for example, four cantilever springs 128. As shown in FIG. 6B, the four spring members 60*a* in each of the left portion 16*a* and the right portion 16*b* of the fuselage 16 comprise a first spring member 60*b*, such as a forward spring member, a second spring member 60*c*, such as an aft spring member, a third spring member 60*d*, such as a forward spring member, and a fourth spring member 60*e*, such as an aft spring member. As shown in FIG. 6B, first spring member 60*b* and the third spring member 60*d*, such as the forward spring members, are positioned forward of the second spring member 60*c* and the fourth spring member 60*e*, such as the aft spring members, and the aft spring members are positioned aft of the forward spring members. Multiple spring members 60*a*, such as the four spring members 60*a*, in FIG. 6B, provide redundancy and fail-safety, and if there is an issue with any one of the four spring members 60*a*, the remaining three spring members 60*a* provide for safe functioning.

As shown in FIGS. 6A-6B, each tensioner member 60, such as each spring member 60*a*, comprises a cantilever spring 128 having the first end 108*a* coupled, or attached, to the inboard end 44*a* of the strut tension member 54, and the second end 108*b* coupled, or attached, to a fuselage structure 22. As shown in FIGS. 6A-6B, each strut assembly 12 further comprises the first fitting element 142, such as the side-of-body fitting 142*a* (see FIGS. 6A-6B), having the through opening 154 and the bearing surface 156. The bearing surface 156 functions as the stop element 160 (see FIGS. 6A-6B). As shown in FIGS. 6A-6B, each strut assembly 12 further comprises the bushing element 180, such as a tube member 184, partially disposed within the through opening 154 of the first fitting element 142, such that part of the exterior surface of the bushing element 180 is in contact against the interior surface of the through opening 154 of the first fitting element 142. Each bushing element 180 has the opening 182 (see FIGS. 6A-6B) receiving the first portion 155*a* of the strut 40, such as the strut tension member 54, where the first portion 155*a* extends through both the opening 182 of the bushing element 180 and the through opening 154 of the first fitting element 142.

As shown in FIGS. 6A-6B, each strut assembly 12 further comprises the second fitting element 164 axially aligned with the first fitting element 142 along the elongate body 46*a* of the strut tension member 54. As shown in FIGS. 6A-6B, each second fitting element 164 is in the form of a block 176, and receives the second portion 155*b* of the strut 40, such as the strut tension member 54, extending through the second fitting element 164. Each second fitting element 164 further has the bearing surface 174 (see FIGS. 6A-6B). The bearing surface 174 faces outboard and opposite the bearing surface 156 of the first fitting element 142.

As shown in FIGS. 6A-6B, in the 1 g on ground condition 30, there is a gap 235 between the bearing surface 174 of the second fitting element 164 and the bearing surface 156 of the first fitting element 142. When the aircraft 10*a*, is on the ground in the 1 g on ground condition 30, the one or more tensioner members 60, such as the one or more spring members 60*a*, apply a tension (T) 136 (see FIGS. 6A-6B), such as a modest amount of tension 136, on the strut tension member 54 to prevent or to minimize excessing drooping of the strut 40.

Figure 6C:
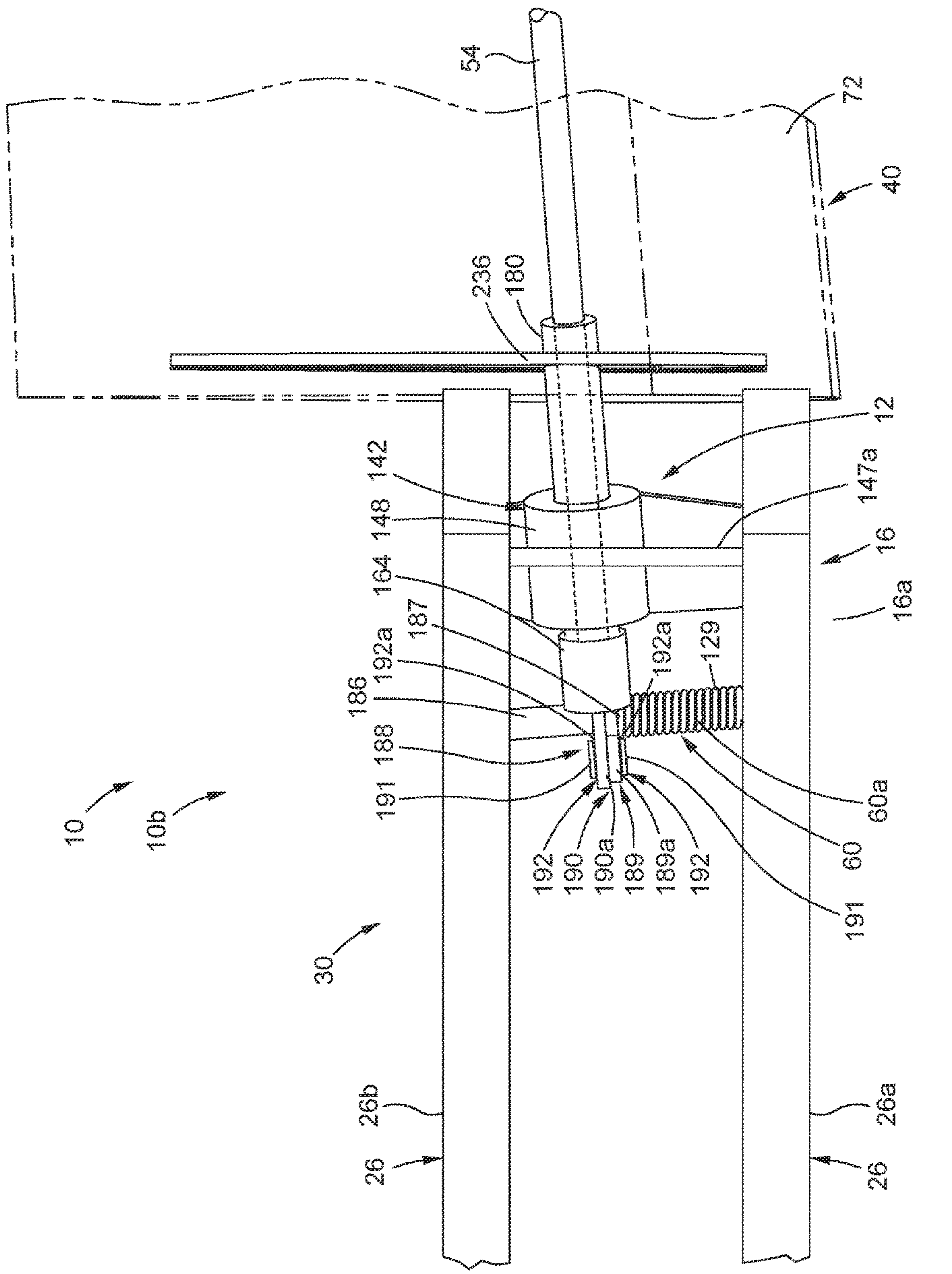
FIG. 6C is an illustration of an enlarged top view of another version of a strut assembly in the 1 g on ground condition, where the strut assembly has one tensioner member in the form of a torsion spring.
Figure 6D:
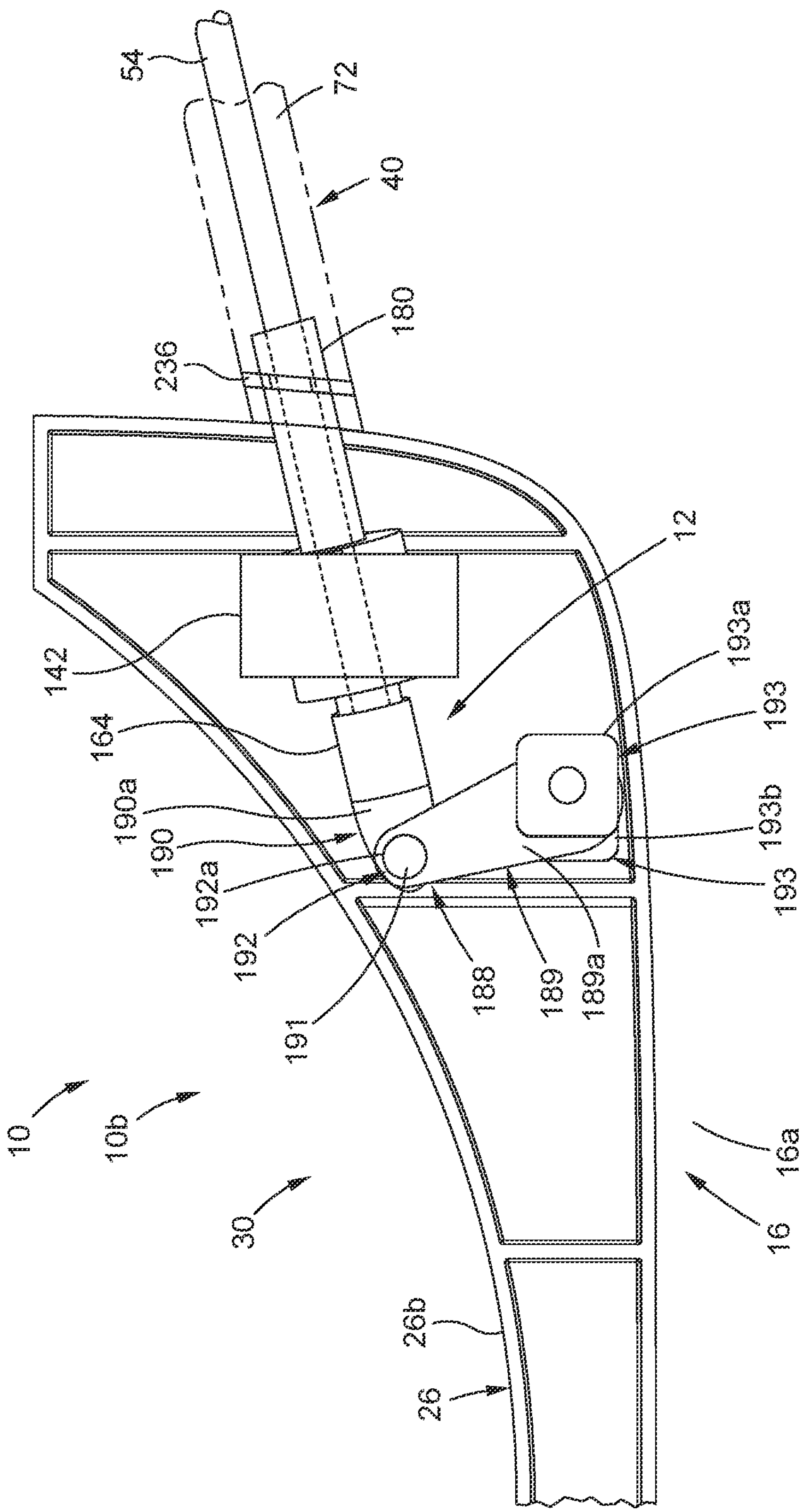
FIG. 6D is an illustration of an enlarged front view of the strut assembly of FIG. 6C in the 1 g on ground condition.

Now referring to FIGS. 6C-6D, FIG. 6C is an illustration of an enlarged top view of another version of a strut assembly 12 for the vehicle 10, such as the aircraft 10*b*, in the 1 g on ground condition 30, where the strut assembly 12 has one tensioner member 60, such as one spring member 60*a*, for example, in the form of a torsion spring 129, within the fuselage 16, such as the left portion 16*a* of the fuselage. FIG. 6D is an illustration of an enlarged front view of the strut assembly 12 of FIG. 6C, for the vehicle 10, such as the aircraft 10*b*, in the 1 g on ground condition 30.

In this version, as shown in FIG. 6C, the tensioner member 60, such as the spring member 60*a*, for example, the torsion spring 129, is coupled, or attached, to a shaft 186, or a spindle, which is attached between the bulkheads 26 (see also FIG. 6D), such as the forward bulkhead 26*a* and the aft bulkhead 26*b* (see also FIG. 6D). The shaft 186 runs along a forward-aft axis between the forward bulkhead 26*a* and the aft bulkhead 26*b*. The shaft 186 is inserted through a through opening 187 (see FIG. 6C) of the torsion spring 129.

As shown in FIGS. 6C, 6D, a bell crank lever 188 is attached to the shaft 186 and to the second fitting element 164. The bell crank lever 188 comprises a first arm 189 (see FIGS. 6C, 6D), such as a rotatable lever arm 189*a* (see FIGS. 6C, 6D), pivotably coupled to a second arm 190 (see FIGS. 6C, 6D), such as a fixed arm 190*a* (see FIGS. 6C, 6D), via a pivot pin 191 (see FIGS. 6C, 6D). The first arm 189, such as the rotatable lever arm 189*a*, has an arm opening 192 (see FIGS. 6C, 6D), such as a pivot pin opening 192*a* (see FIGS. 6C, 6D), through which the pivot pin 191 is inserted. The second arm 190, such as the fixed arm 190*a*, has an arm opening 192 (see FIG. 6C), such as a pivot pin opening 192*a* (see FIG. 6C), through which the pivot pin 191 is also inserted. Thus, the pivot pin 191 is inserted through both pivot pin openings 192*a* to couple, or connect, the first arm 189 to the second arm 190. As shown in FIG. 6C, the shaft 186 is attached to the bulkheads 26 via attachment brackets 193. The first end of the shaft 186 is attached to the attachment bracket 193 (see FIG. 6D), such as a first attachment bracket 193*a* (see FIG. 6D), and the first attachment bracket 193*a* is configured for attachment to, and attaches to, the forward bulkhead 26*a* (see FIG. 6C). The second end of the shaft 186 is attached to the attachment bracket 193, such as a second attachment bracket 193*b* (see FIG. 6D), and the second attachment bracket 193*b* is attached to the aft bulkhead 26*b* (see FIG. 6D).

In this version, as shown in FIGS. 6C, 6D, there is one torsion spring 129 (see FIG. 6C) coupled to the shaft 186 (see FIG. 6C) and positioned between the aft bulkhead 26*a* and the bell crank lever 188, and installed in such a way as to have torque in the 1 g on ground condition 30, as well as the minus 1 g pushover flight condition 36 (see FIGS. 1, 9A), and the torsion spring 129 applies a tension load 134 (see FIG. 1) to the strut tension member 54. This torque is sufficient to pull the strut tension member 54, and the strut 40 connected to it, in the inboard direction 204 (see FIG. 2B), such that the drooping of the strut 40 is minimized. In the 2.5 g up-bending of wing flight condition 32, the up-bending of the wing 14 (see FIG. 2A) causes tension 136 (see FIG. 1) in the strut 40 (see FIGS. 1, 9B, 9E), including the strut tension member 54 (see FIGS. 9B, 9E), which overwhelms the tension 136 induced by the torsion spring 129, so that the configuration moves into the strut tension configuration.

When the strut tension member 54 (see FIGS. 6C, 6D) attached to the second fitting element 164 moves in and out of the first fitting element 142 and in and out of the fuselage 16, the rotatable lever arm 189*a* (see FIG. 6D) is configured to rotate about the pivot pin 191 (see FIG. 6D) and about the shaft 186 (see FIG. 6C), and the torsion spring 129 twists.

FIGS. 6C, 6D further show the strut 40 with the strut tension member 54 within the strut structure 72, the bushing element 180, and the land 236. FIG. 6C further shows the first fitting element 142 with the I-beam portion 147*a* and the cylindrical portion 148.

Figure 6E:
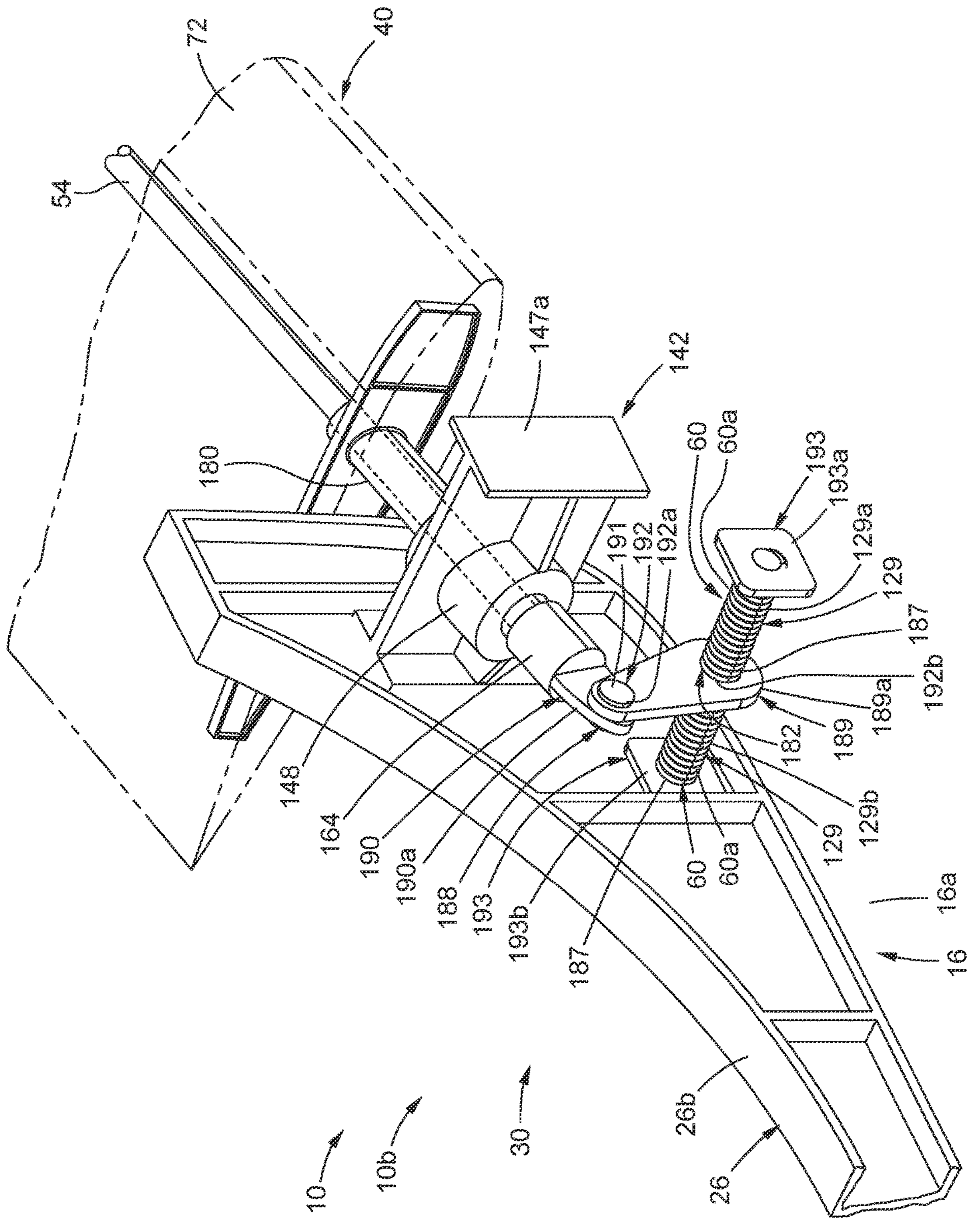
FIG. 6E is an illustration of an enlarged front perspective view of another version of a strut assembly in the 1 g on ground condition, where the strut assembly has two tensioner members in the form of two torsion springs.
Figure 6F:
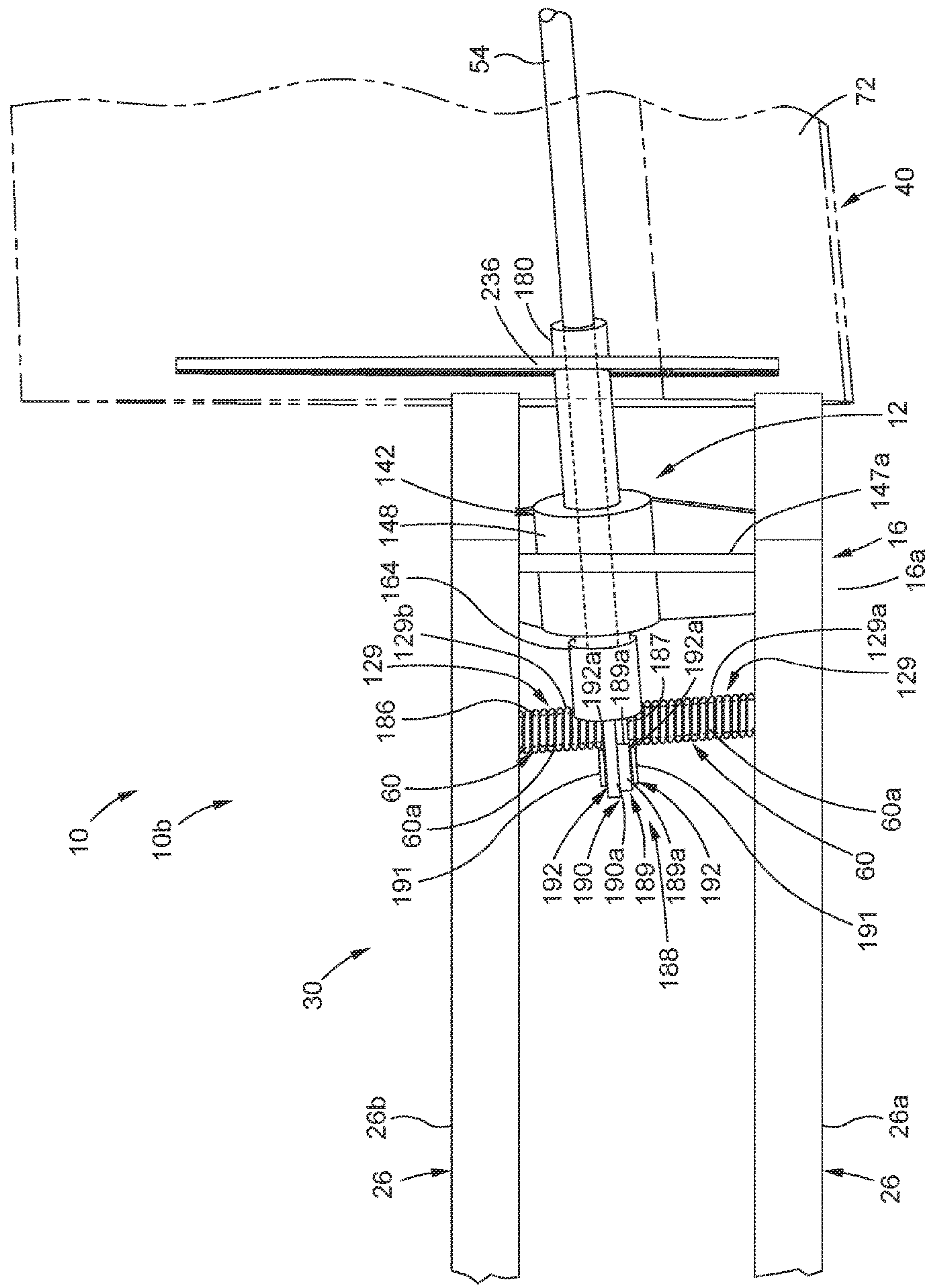
FIG. 6F is an illustration of an enlarged top view of the strut assembly of FIG. 6E in the 1 g on ground condition.

Now referring to FIGS. 6E-6F, FIG. 6E is an illustration of an enlarged front perspective view of another version of a strut assembly 12 for the vehicle 10, such as the aircraft 10*b*, in the 1 g on ground condition 30, where the strut assembly 12 has two tensioner members 60, such as two spring members 60*a*, for example, in the form of two torsion springs 129, within the fuselage 16, such as the left portion 16*a* of the fuselage. FIG. 6F is an illustration of an enlarged top view of the strut assembly 12 of FIG. 6E, for the vehicle 10, such as the aircraft 10*b*, in the 1 g on ground condition 30.

In this version, as shown in FIGS. 6E, 6F, the tensioner members 60, such as the spring members 60*a*, for example, the torsion springs 129, comprise a first torsion spring 129*a* coupled, or attached, to the shaft 186 (see FIG. 6F), or spindle, and positioned, or compressed, between the bulkhead 26, such as the forward bulkhead 26*a* (see FIG. 6F), and the bell crank lever 188, and comprises a second torsion spring 129*b* coupled, or attached, to the shaft 186, or a spindle, and positioned, or compressed, between the aft bulkhead 26*b* and the bell crank lever 188. More than one torsion springs 129 provide for redundancy in the strut assembly 12.

As shown in FIG. 6F, the shaft 186, or spindle, is attached between the bulkheads 26, such as the forward bulkhead 26*a* and the aft bulkhead 26*b*, and the shaft 186 runs along a forward-aft axis between the forward bulkhead 26*a* and the aft bulkhead 26*b*. The shaft 186 is inserted through the through openings 187 (see FIGS. 6E, 6F) of the torsion springs 129, such as the first torsion spring 129*a* and the second torsion spring 129*b*.

As shown in FIGS. 6E, 6F, the bell crank lever 188 is attached to the shaft 186 and to the second fitting element 164. FIGS. 6E, 6F show the bell crank lever 188 with the first arm 189, such as the rotatable lever arm 189*a*, pivotably coupled to the second arm 190, such as the fixed arm 190*a*, via the pivot pin 191. As shown in FIGS. 6E, 6F, the first arm 189, such as the rotatable lever arm 189*a*, has the arm opening 192, such as the pivot pin opening 192*a*, through which the pivot pin 191 is inserted. As shown in FIG. 6F, the second arm 190, such as the fixed arm 190*a*, has the arm opening 192, such as the pivot pin opening 192*a*, through which the pivot pin 191 is also inserted. Thus, the pivot pin 191 is inserted through both pivot pin openings 192*a* to couple, or connect, the first arm 189 to the second arm 190. As shown in FIG. 6E, the first arm 189, such as the rotatable lever arm 189*a*, has another arm opening 192, such as a shaft opening 192*b*, through which the shaft 186 (see FIG. 6F) is inserted. The first arm 189, such as the rotatable lever arm 189*a*, of the version in FIGS. 6C, 6D, also has the shaft opening 192*b* through which the shaft 186 is inserted.

The shaft 186 (see FIG. 6F) is attached to the bulkheads 26 via attachment brackets 193 (see FIG. 6E). The first end of the shaft 186 is attached to the attachment bracket 193, such as the first attachment bracket 193*a* (see FIG. 6E), and the first attachment bracket 193*a* is configured for attachment to, and attaches to, the forward bulkhead 26*a* (see FIG. 6F). The second end of the shaft 186 is attached to the attachment bracket 193, such as the second attachment bracket 193*b* (see FIG. 6E), and the second attachment bracket 193*b* is attached to the aft bulkhead 26*b* (see FIGS. 6E, 6F).

In this version, as shown in FIGS. 6E, 6F, there are two torsion springs 129 coupled to the shaft 186 and positioned between the bulkheads 26, and installed in such a way as to have torque in the 1 g on ground condition 30, as well as the minus 1 g pushover flight condition 36 (see FIGS. 1, 9A), and the torsion springs 129 apply the tension load 134 (see FIG. 1) to the strut tension member 54. This torque is sufficient to pull the strut tension member 54, and the strut 40 connected to it, in the inboard direction 204 (see FIG. 2B), such that the drooping of the strut 40 is minimized. In the 2.5 g up-bending of wing flight condition 32, the up-bending of the wing 14 (see FIG. 2A) causes tension 136 (see FIG. 1) in the strut 40 (see FIGS. 1, 9B, 9E), including the strut tension member 54 (see FIGS. 9B, 9E), which overwhelms the tension 136 induced by the torsion springs 129, so that the configuration moves into the strut tension configuration.

When the strut tension member 54 (see FIGS. 6E, 6F) attached to the second fitting element 164 moves in and out of the first fitting element 142 and in and out of the fuselage 16, the rotatable lever arm 189*a* (see FIG. 6E) is configured to rotate about the pivot pin 191 (see FIG. 6E) and about the shaft 186 (see FIG. 6F), and the torsion springs 129 twist.

FIGS. 6E, 6F further show the strut 40 with the strut tension member 54 within the strut structure 72, the bushing element 180, and the land 236 (see FIG. 6F). FIGS. 6E, 6F further show the first fitting element 142 with the I-beam portion 147*a* and the cylindrical portion 148.

Figure 7C:
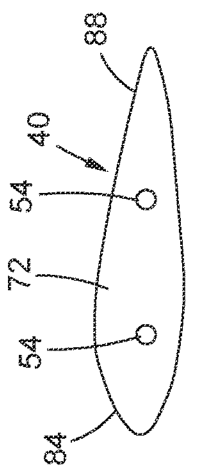
FIG. 7C is an illustration of a cross section view of another exemplary version of a strut with two strut tension members within a strut structure.
Figure 7A:
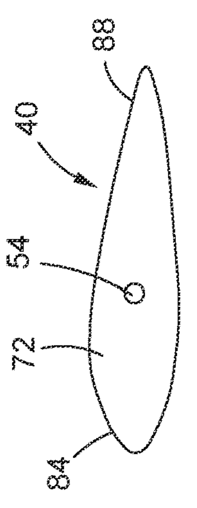
FIG. 7A is an illustration of a cross section view of an exemplary version of a strut with one strut tension member within a strut structure.

Now referring to FIGS. 7A-7D, FIG. 7A is an illustration of a cross section view of an exemplary version of a strut 40 with one strut tension member 54 within a strut structure 72, and FIG. 7B is an illustration of a top view of an exemplary version of two strut assemblies 12 each with the strut 40 of FIG. 7A, in an interior 20*a* of a fuselage 16 of an aircraft 10*b*, where the two strut assemblies 12 comprise the first strut assembly 12*a* and the second strut assembly 12*b*. FIG. 7C is an illustration of a cross section view of another exemplary version of a strut 40 with two strut tension members 54 within a strut structure 72.

FIG. 7D is an illustration of a schematic diagram of a combination comprising FIGS. 7D-1 and 7D-2. FIG. 7D-1 is an illustration of a top view of a right portion 16*b* of a fuselage 16 with another exemplary version of two strut assemblies 12, each with the strut 40 of FIG. 7C, in an interior 20*a* of a fuselage 16 of an aircraft 10*b*, and FIG. 7D-2 is an illustration of a top view of a left portion 16*a* of the fuselage 16 with another exemplary version of two strut assemblies 12, each with the strut of FIG. 7C, in an interior 20*a* of the fuselage 16 of the aircraft 10*b*.

The four strut assemblies 12 of FIGS. 7D-1 and 7D-2 comprise the first strut assembly 12*a* (see FIG. 7D-2), the second strut assembly 12*b* (see FIG. 7D-1), a third strut assembly 12*c* (see FIG. 7D-2), and a fourth strut assembly 12*d* (see FIG. 7D-1). Having two strut tension members 54, in the strut structures 72, such as the first strut structure 72*a* (see FIG. 7D-2) and the second strut structure 72*b* (see FIG. 7D-1), and in both the left portion 16*a* (see FIG. 7D-2) and the right portion 16*b* (see FIG. 7D-1) of the fuselage 16, provides for structural redundancy and restrains the strut tension members 54 for a pitching moment. When the strut 40 is fixedly attached to the fuselage 16 to prevent rotation due to airflow and resistance to airflow, it must be reacted by a moment about the axis of the strut 40 between the strut 40 and the fuselage 16. Having two points of connection with the strut tension members 54, the moment can be reacted by a couple between the strut tension members 54, with opposing vertical loads on the forward and aft strut tension members 54 (see FIGS. 7D-1 and 7D-2).

As shown in FIGS. 7A, 7C, the strut structure 72 of the strut 40 has the airfoil shape cross section 88 and the outer mold line 84 of the strut structure 72. As shown in FIG. 7A, the strut 40 has one strut tension member 54 within the strut structure 72. In another version, as shown in FIG. 7C, the strut 40 has two strut tension member 54 within the strut structure 72.

As shown in FIG. 7B, the first strut assembly 12*a* is positioned in the left portion 16*a* of the fuselage 16 to the left of the first side 226 of the center fitting 24, and the second strut assembly 12*b* is positioned in the right portion 16*b* of the fuselage 16 to the right of the second side 228 of the center fitting 24. FIGS. 7D-1 and 7D-2 show four (4) strut assemblies 12, including the first strut assembly 12*a* (see FIG. 7D-2), the second strut assembly 12*b* (see FIG. 7D-1), the third strut assembly 12*c* (see FIG. 7D-2), and the fourth strut assembly 12*d* (see FIG. 7D-1). As shown in FIG. 7D-2, the first strut assembly 12*a* and the third strut assembly 12*c* are positioned in the left portion 16*a* of the fuselage 16 to the left of the first side 226 of the center fitting 24. As shown in FIG. 7D-1, and the second strut assembly 12*b* and the fourth strut assembly 12*d* are positioned in the right portion 16*b* of the fuselage 16 to the right of the second side 228 of the center fitting 24.

As shown in FIG. 7B, there are two bulkheads 26, including the forward bulkhead 26*a* and the aft bulkhead 26*b* in the interior 20*a* of the fuselage 16, and the strut assemblies 12 are positioned between the forward bulkhead 26*a* and the aft bulkhead 26*b*. As shown in FIGS. 7D-1, 7D-2, there are three bulkheads 26, including the forward bulkhead 26*a*, the aft bulkhead 26*b*, and a center bulkhead 26*c* between the forward bulkhead 26*a* and the aft bulkhead 26*b*, in the interior 20*a* of the fuselage 16. As shown in FIGS. 7D-1, 7D-2, the strut assemblies 12 are positioned between the forward bulkhead 26*a* and the aft bulkhead 26*b*, and in particular, the first strut assembly 12*a* and the second strut assembly 12*b* are positioned between the forward bulkhead 26*a* and the center bulkhead 26*c*, and the third strut assembly 12*c* and the fourth strut assembly 12*d* are positioned between the center bulkhead 26*c* and the aft bulkhead 26*b*. FIGS. 7B, 7D-1, 7D-2, further show the center fitting 24 between the left portion 16*a* and the right portion 16*b* of the fuselage 16, and dividing or separating the left portion 16*a* from the right portion 16*b*. FIGS. 7B, 7D-1, 7D-2, further show a longitudinal axis 237 of the aircraft 10*b* through the center fitting 24.

FIGS. 7B, 7D-2 show the strut 40, such as a first strut 40*a*, with the strut tension member 54, such as a first strut tension member 54*a*, within the interior 74 of the strut structure 72, such as the first strut structure 72*a*, and extending into the interior 20*a* of the left portion 16*a* of the fuselage 16. FIGS. 7B, 7D-1 further show the strut 40, such as a second strut 40*b*, with the strut tension member 54, such as a second strut tension member 54*b*, within the interior 74 of the strut structure 72, such as the second strut structure 72*b* extending into the interior 20*a* of the right portion 16*b* of the fuselage 16. FIG. 7D-2 further shows a strut 40, such as a third strut 40*c*, with a strut tension member 54, such as a third strut tension member 54*c*, within the interior 74 of the first strut structure 72*a*, and extending into the interior 20*a* of the left portion 16*a* of the fuselage 16. FIG. 7D-1 further shows a strut 40, such as a fourth strut 40*d*, with a strut tension member 54, such as a fourth strut tension member 54*d*, within the interior 74 of the second strut structure 72*b*, and extending into the interior 20*a* of the right portion 16*b* of the fuselage 16. FIGS. 7D-1 and 7D-2 show two strut tension members 54 per strut structure 72 in each of the left portion 16*a* (see FIG. 7D-2) and the right portion 16*b* (see FIG. 7D-1) of the fuselage 16. However, more than two strut tension members 54 per strut structure 72 may be used in each of the left portion 16*a* and the right portion 16*b* of the fuselage 16.

As shown in FIGS. 7B, 7D-1, 7D-2, each strut tension member 54 has the elongate body 46*a* and the inboard end 44*a* coupled, or attached, to the tensioner member 60, such as the spring member 60*a*, of the strut assembly 12. As shown in FIGS. 7B, 7D-1, 7D-2, each strut tension member 54 comprises a rod 58, and each spring member 60*a* comprises a coil spring 124, for example, a tension spring 125, with the extendable body 110, the first end 108*a* attached to the inboard end 44*a* of the strut tension member 54, and the second end 108*b* attached to a fuselage structure 22, such as an internal rib 238, for example, a first internal rib 238*a* (see FIGS. 7B, 7D-2), a second internal rib 238*b* (see FIGS. 7B, 7D-1), a third internal rib 238*c* (see FIG. 7D-2), and a fourth internal rib 238*d* (see FIG. 7D-1).

As shown in FIGS. 7B, 7D-1, 7D-2, each strut assembly 12 further comprises the first fitting element 142, such as the side-of-body fitting 142*a*, each with the through opening 154, the bearing surface 156, the load spanning beam 147, such as the I-beam portion 147*a*, and the cylindrical portion 148. As shown in FIG. 7B, the I-beam portions 147*a* are attached to the forward bulkhead 26*a* and the aft bulkhead 26*b*, via attachment elements 152, such as bolts 152*a*. As shown in FIGS. 7D-1, 7D-2, forward I-beam portions 147*b* are attached to the forward bulkhead 26*a* and the center bulkhead 26*c*, via attachment elements 152, such as bolts 152*a*, and aft I-beam portions 147*c* are attached to the center bulkhead 26*c* and the aft bulkhead 26*b*, via attachment elements 152, such as bolts 152*a*.

As shown in FIGS. 7B, 7D-1, 7D-2, each strut assembly 12 further comprises the bushing element 180 disposed within the through opening 154 of the first fitting element 142, and the second fitting element 164 axially aligned with the first fitting element 142, where the second fitting element 164 has the through opening 172 and the bearing surface 174.

Now referring to FIG. 8A, FIG. 8A is an illustration of a front view of a schematic diagram of a vehicle 10, such as an aircraft 10*b*, in a ground position 241 on the ground 240 in the 1 g on ground condition 30. As shown in FIG. 8A, the aircraft 10*b* comprises the fuselage 16, the wings 14, such as the first wing 14*a* and the second wing 14*b*, coupled to the fuselage 16, and extending from the fuselage 16 opposite each other, and struts 40, such as the first strut 40*a* and the second strut 40*b*, comprising strut tension members 54. The aircraft 10*b* further comprises landing gear 242 attached to the fuselage 16, the landing gear 242 having wheels 244 on the ground 240. FIG. 8A further shows a vertical axis 245 through a center 246 of the fuselage 16. FIG. 8A further shows each strut 40, such as the strut tension member 54, having the outboard end 42, such as outboard end 42*a*, attached to the underside 18 of the wing 14. As shown in FIG. 8A, the wings 14 are in a first position 248*a* and the struts 40 are in a first position 250*a*.

Now referring to FIGS. 8B-8C, FIG. 8B is an illustration of an enlarged front view of a version of a strut assembly 12, such as a first strut assembly 12*a*, positioned in the left portion 16*a* of the interior 20*a* of the fuselage 16 of an aircraft 10*b*, when the aircraft 10*b* is on the ground 240 (see FIG. 8A) in the 1 g on ground condition 30, and where the strut assembly 12 has the tensioner member 60, such as the spring member 60*a*, for example, a compression spring 126, positioned between the first fitting element 142 and the second fitting element 164. FIG. 8C is an illustration of an enlarged top view of the strut assembly 12, such as the first strut assembly 12*a*, of FIG. 8B, when the aircraft 10*b* is on the ground 240 (see FIG. 8A) in the 1 g on ground condition 30, and where the strut assembly 12 has the tensioner member 60, such as the spring member 60*a*, for example, the compression spring 126, positioned between the first fitting element 142 and the second fitting element 164. The tensioner member 60, such as the spring member 60*a*, for example, the compression spring 126, may float between the first fitting element 142 and the second fitting element 164, or the tensioner member 60, such as the spring member 60*a*, for example, the compression spring 126, may be attached to one of the first fitting element 142 or the second fitting element 164, or may be attached to both of the first fitting element 142 and the second fitting element 164.

As shown in FIGS. 8B-8C, the strut assembly 12 includes the strut 40 comprising the strut tension member 54, such as in the form of a rod 58, within the strut structure 72, and the strut tension member 54 extends from the interior 74 (see FIG. 8C) of the strut structure 72, through the opening 50 (see FIG. 8C) in the side 21 (see FIG. 8C), such as the side-of-body, of the fuselage 16, and into the left portion 16*a* of the interior 20*a* of the fuselage 16 of the aircraft 10*b*. The strut assembly 12 is positioned between the bulkheads 26 (see FIGS. 8B-8C), such as the forward bulkhead 26*a* (see FIG. 8C) and the aft bulkhead 26*b* (see FIGS. 8B-8C). As shown in FIG. 8C, the strut structure 72 comprises the airfoil section 78 with the outer mold line 84 and the airfoil shape cross section 88. FIG. 8C shows the strut skin 90 on the exterior 76 of the strut structure 72. As shown in FIGS. 8B-8C, the strut structure 72 has a land 236 within the interior 74 (see FIG. 8C) of the strut structure 72 near the inboard end 44*b* of the strut structure 72 and the side 21 of the fuselage 16.

FIGS. 8B-8C show the strut tension member 54 having the elongate body 46*a* extending through the tensioner member 60, such as the spring member 60*a*, in the form of the compression spring 126, and the inboard end 44*a* of the strut tension member 54 attached to the second fitting element 164. As shown in FIGS. 8B-8C, the strut assembly 12 further comprises the first fitting element 142, such as the side-of-body fitting 142*a*. FIG. 8B shows the first fitting element 142 with the first end 144, the second end 145 in contact with the first end 108*a* of the tensioner member 60, such as the compression spring 126, and the body 146 comprised of the load spanning beam 147, for example, the I-beam portion 147*a*, and the cylindrical portion 148 inserted, or formed, through the I-beam portion 147*a*. As shown in FIG. 8C, the exterior of the first side 149*a* of the I-beam portion 147*a* is attached to the forward bulkhead 26*a*, and the exterior of the second side 149*b* of the I-beam portion 147*a* is attached to the aft bulkhead 26*b*. As shown in FIG. 8B, the cylindrical portion 148 of the body 146 of the first fitting element 142 has the through opening 154 and the bearing surface 156 at the second end 145 of the first fitting element 142. The bearing surface 156 functions as a stop element 160 (see FIG. 8B).

As shown in FIGS. 8B-8C, each strut assembly 12 further comprises the bushing element 180 partially disposed within the through opening 154 (see FIG. 8B) of the first fitting element 142, such that part of the exterior surface of the bushing element 180 is in contact against the interior surface of the through opening 154 of the first fitting element 142. The bushing element 180 has the opening 182 (see FIG. 8B) receiving the first portion 155*a* (see FIG. 8B) of the strut 40, such as the strut tension member 54, where the first portion 155*a* extends through both the opening 182 of the bushing element 180 and the through opening 154 of the first fitting element 142.

As shown in FIGS. 8B-8C, the strut assembly 12 further comprises the second fitting element 164. The second fitting element 164 comprises the first end 165 (see FIG. 8C) in contact with the second end 108*b* of the tensioner member 60, such as the compression spring 126, the second end 166 (see FIG. 8C), and the body 168 (see FIG. 8C). The second fitting element 164 has the through opening 172 (see also FIG. 8B) receiving the second portion 155*b* (see FIG. 8B) of the strut 40, such as the strut tension member 54, extending through the second fitting element 164. The second fitting element 164 has the bearing surface 174 (see FIG. 8C) at the first end 165 of the second fitting element 164. The bearing surface 174 faces outboard and opposite the bearing surface 156 of the first fitting element 142. As shown in FIGS. 8B-8C, the bearing surface 174 of the second fitting element 164 bears against the second end 108*b* of the tensioner member 60, such as the spring member 60*a*, for example, the compression spring 126, and the bearing surface 156 of the first fitting element 142 bears against the first end 108*a* of the tensioner member 60, such as the spring member 60*a*, for example, the compression spring 126.

When the aircraft 10*b* is on the ground 240 (see FIG. 8A) in the ground position 241 (see FIG. 8A), and in the 1 g on ground condition 30, the strut 40, such as the strut tension member 54, for example, the rod 58, experiences a decrease in length, and the tensioner member 60, such as the spring member 60*a*, applies a tension 136 (see FIG. 1), such as a modest amount of tension 136, on the strut tension member 54, to prevent or to minimize excessing drooping of the strut 40, such as the strut tension member 54, for example, the rod 58. With regard to the magnitude of the tension load 134 (see FIG. 1), compared to the tension load capacity of the strut tension member 54, the tension load 134 applied by the tensioner member 60, such as the spring member 60*a*, is modest, i.e., approximately 10% of the strut tension member capacity or less. The tensioner member 60, such as the spring member 60*a*, does not apply excessive tension to the wing 14, which would cause significant bending stresses. The load path 38 for the tension load 134 for the 1 g on ground condition 30, as shown in FIGS. 8B-8C, is from the wing 14 (see FIG. 8A), such as the first wing 14*a*, on the left side of the aircraft 10*b* (see FIG. 8A), to the strut tension member 54, such as the rod 58, to the second fitting element 164, to the tensioner member 60, such as the spring member 60*a*, for example, the compression spring 126, to the first fitting element 142, to the forward and aft bulkheads 26*a*, 26*b* on the left portion 16*a* (see FIGS. 8B-8C) of the fuselage 16, through to the forward and aft bulkheads 26*a*, 26*b* on the right portion 16*b* (see FIG. 5A) of the fuselage 16, back to the first fitting element 142 on the opposite side, or right side, of the fuselage 16 of the aircraft 10*b*, back to the tensioner member 60, such as the spring member 60*a*, for example, the compression spring 126, on the opposite side, back to the second fitting element 164 on the opposite side, back to the strut tension member 54, for example, the rod 58, on the opposite side, and back to the wing 14, such as the second wing 14*b* (see FIG. 8A), on the right side of the aircraft 10*b* (see FIG. 8A). The loads are small to prevent excessive droop in the strut 40. The gap 235 is provided so that the small loads are independent of the rest of the fuselage structures 22. There is a relatively small amount of tension for the 1 g on ground condition 30.

Now referring to FIG. 8D, FIG. 8D is an illustration of an enlarged front view of the strut assembly 12, such as the first strut assembly 12*a*, of FIG. 8B, when the aircraft 10*b* is on the ground in the 1 g on ground condition 30, and where the strut assembly 12 has an outer sheath 272, or sleeve, coupled to the tensioner member 60, such as the spring member 60*a*, for example, the compression spring 126, and/or coupled to the second fitting element 164. The outer sheath 272, or sleeve, is designed to prevent out-of-plane coil slippage of the tensioner member 60, such as the spring member 60*a*, for example, the compression spring 126, such as when the tensioner member 60, such as the spring member 60*a*, such as the compression spring 126, is fully compressed. The outer sheath 272, or sleeve, is also designed to function as a shock absorber when the tensioner member 60, such as the spring member 60*a*, for example, the compression spring 126, compresses.

As shown in FIG. 8D, the outer sheath 272 has a first end 274*a*, a second end 274*b*, and a body 276 formed between the first end 274*a* and the second end 274*b*. As further shown in FIG. 8D, the body 276 of the outer sheath 272 is in the form of a cylindrical body 276*a*. However, in other versions, the body 276 may have another suitable geometric shape. The outer sheath 272 may be made of a metal material, such as steel, stainless steel, aluminum, titanium, a metal alloy containing steel, stainless steel, aluminum, or titanium, or another suitably strong metal material, or the outer sheath 272 may be made of a ceramic material, a polymer material, or another suitably strong type of material. As shown in FIG. 8D, the outer sheath 272 has an opening 278 at the first end 274*a* for receiving all, or part, of the tensioner member 60, such as the spring member 60*a*, for example, the compression spring 126, and for receiving all, or the entirety, of the second fitting element 164. FIG. 8D shows a spaced portion 279 between the second fitting element 164 and the second end 274*b* in the interior of the outer sheath 272. However, the spaced portion 279 may be smaller or larger in size. As shown in FIGS. 8B, 8D, in the 1 g on ground condition 30, the spring member 60*a*, for example, the compression spring 126, is in a spring position 280, such as an intermediate compressed position 280*a*. As further shown in FIG. 8D, in the 1 g on ground condition 30, there is a gap 282 with a gap distance 284*a* between the first end 274*a* of the outer sheath 272 and the bearing surface 156 of the first fitting element 142, and the first end 274*a* of the outer sheath 272 is not in contact with the bearing surface 156 of the first fitting element 142.

FIG. 8D further shows the strut 40 comprising the strut tension member 54 within the strut structure 72, and the strut tension member 54 extending into the left portion 16*a* of the interior 20*a* of the fuselage 16 of the aircraft 10*b*. FIG. 8D further shows the bulkhead 26, such as the aft bulkhead 26*b*, the first fitting element 142 with the bearing surface 156, the bushing element 180, and the second fitting element 164 with the bearing surface 174.

Now referring to FIGS. 8E-8F, FIG. 8E is an illustration of an enlarged front view of another version of the strut assembly 12, such as the first strut assembly 12*a*, positioned in the left portion 16*a* of the interior 20*a* of the fuselage 16 of an aircraft 10*b*, when the aircraft 10*b* is on the ground 240 (see FIG. 8A) in the 1 g on ground condition 30, and where the strut assembly 12 has a tension spring 125. FIG. 8F is an illustration of an enlarged top view of the strut assembly 12, such as the first strut assembly 12*a*, of FIG. 8E, when the aircraft 10*b* is on the ground 240 in the 1 g on ground condition 30, and where the strut assembly 12 has the tension spring 125.

As shown in FIGS. 8E-8F, the strut assembly 12 includes the strut 40 comprising the strut tension member 54, such as in the form of a rod 58, within the strut structure 72, and the strut tension member 54 extends from the interior 74 (see FIG. 8F) of the strut structure 72, through the opening 50 (see FIG. 8F) in the side 21 (see FIG. 8F), such as the side-of-body, of the fuselage 16, and into the left portion 16*a* of the interior 20*a* of the fuselage 16 of the aircraft 10*b*. The strut assembly 12 is positioned between the bulkheads 26 (see FIGS. 8E-8F), such as the forward bulkhead 26*a* (see FIG. 8F) and the aft bulkhead 26*b* (see FIGS. 8E-8F). As shown in FIG. 8F, the strut structure 72 comprises the airfoil section 78 with the outer mold line 84 and the airfoil shape cross section 88. FIG. 8F shows the strut skin 90 on the exterior 76 of the strut structure 72. As shown in FIGS. 8E-8F, the strut structure 72 has the land 236 within the interior 74 (see FIG. 8F) of the strut structure 72 near the inboard end 44*b* of the strut structure 72 and the side 21 of the fuselage 16.

FIGS. 8E-8F show the strut tension member 54 having the elongate body 46*a* and the inboard end 44*a* attached to the tensioner member 60, such as the spring member 60*a*, in the form of a coil spring 124, for example, the tension spring 125. As shown in FIGS. 8E-8F, the strut assembly 12 further comprises the first fitting element 142, such as the side-of-body fitting 142*a*. FIG. 8E shows the first fitting element 142 with the first end 144, the second end 145, and the body 146 comprised of the load spanning beam 147, for example, the I-beam portion 147*a*, and the cylindrical portion 148 inserted, or formed, through the I-beam portion 147*a*. As shown in FIG. 8F, the exterior of the first side 149*a* of the I-beam portion 147*a* is attached to the forward bulkhead 26*a*, and the exterior of the second side 149*b* of the I-beam portion 147*a* is attached to the aft bulkhead 26*b*. As shown in FIG. 8E, the cylindrical portion 148 of the body 146 of the first fitting element 142 has the through opening 154 and the bearing surface 156 at the second end 145 of the first fitting element 142. The bearing surface 156 functions as a stop element 160 (see FIG. 8E).

As shown in FIGS. 8E-8F, each strut assembly 12 further comprises the bushing element 180 partially disposed within the through opening 154 of the first fitting element 142, such that part of the exterior surface of the bushing element 180 is in contact against the interior surface of the through opening 154 of the first fitting element 142. The bushing element 180 has the opening 182 (see FIG. 8E) receiving the first portion 155*a* (see FIG. 8E) of the strut 40, such as the strut tension member 54, where the first portion 155*a* extends through both the opening 182 of the bushing element 180 and the through opening 154 of the first fitting element 142.

As shown in FIGS. 8E-8F, the strut assembly 12 further comprises the second fitting element 164. The second fitting element 164 comprises the first end 165 (see FIG. 8F), the second end 166 (see FIG. 8F), and the body 168 (see FIG. 8F). The second fitting element 164 has the through opening 172 (see also FIG. 8E) receiving the second portion 155*b* (see FIG. 8E) of the strut 40, such as the strut tension member 54, extending through the second fitting element 164. The second fitting element 164 has the bearing surface 174 (see FIG. 8F) at the first end 165 of the second fitting element 164. The bearing surface 174 faces outboard and opposite the bearing surface 156 of the first fitting element 142.

As shown in FIGS. 8E-8F, in the 1 g on ground condition 30, there is a gap 235 with a gap distance 234*b* between the bearing surface 174 of the second fitting element 164 and the bearing surface 156 of the first fitting element 142, and the bearing surface 174 of the second fitting element 164 is not in contact with the bearing surface 156 of the first fitting element 142. When the aircraft 10*b* is on the ground 240 (see FIG. 8A) in the ground position 241 (see FIG. 8A), and in the 1 g on ground condition 30, the strut 40, such as the strut tension member 54, for example, the rod 58 experiences a decrease in length, and the tensioner member 60, such as the spring member 60*a*, applies a tension 136 (see FIG. 1), such as a modest amount of tension 136, on the strut tension member 54, to prevent or to minimize excessing drooping of the strut 40, such as the strut tension member 54, for example, the rod 58. With regard to the magnitude of the tension load 134 (see FIG. 1), compared to the tension load capacity of the strut tension member 54, the tension load 134 applied by the tensioner member 60, such as the spring member 60*a*, is modest, i.e., approximately 10% of the strut tension member capacity or less. The tensioner member 60, such as the spring member 60*a*, does not apply excessive tension to the wing 14, which would cause significant bending stresses. The load path 38 for the 1 g on ground condition 30 shown in FIGS. 8E-8F is from the fuselage structure 22 (see FIGS. 1, 5A), such as the center fitting 24 (see FIGS. 1, 5A), to the strut tension member 54, for example, the rod 58, and directly to the wing 14. The loads are small to prevent excessive droop in the strut 40. The gap 235 is provided so that the small loads are independent of the rest of the fuselage structures 22. There is a relatively small amount of tension for the 1 g on ground condition 30.

Figures 9A, 9B, 9C:
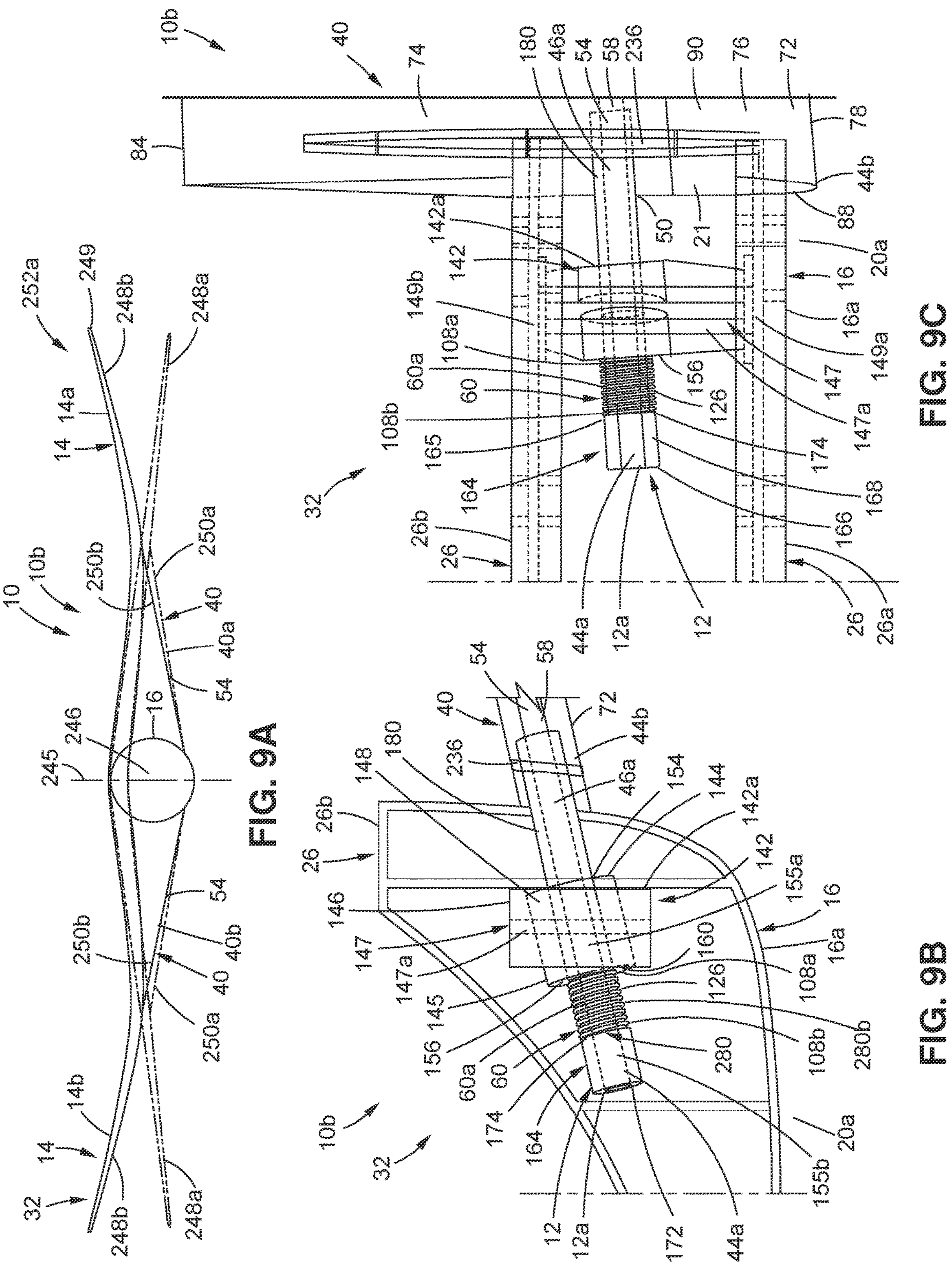
FIG. 9A is an illustration of a front view of a schematic diagram of the aircraft of FIG. 8A in flight in a 2.5 g up-bending of wing flight condition.
FIG. 9B is an illustration of an enlarged front view of a version of a strut assembly of FIG. 8B, when the aircraft is in flight in the 2.5 g up-bending of wing flight condition, and where the strut assembly has a compression spring.
FIG. 9C is an illustration of an enlarged top view of the strut assembly of FIG. 9B, when the aircraft is in flight in the 2.5 g up-bending of wing flight condition, and where the strut assembly has a compression spring.

Now referring to FIG. 9A, FIG. 9A is an illustration of a front view of a schematic diagram of the vehicle 10, such as the aircraft 10*b* of FIG. 8A, in a flight position 252*a* in flight in the 2.5 g up-bending of wing flight condition 32. As shown in FIG. 9A, the aircraft 10*b* comprises the fuselage 16, the wings 14, such as the first wing 14*a* and the second wing 14*b*, and the struts 40, such as the first strut 40*a* and the second strut 40*b*, comprising strut tension members 54. FIG. 9A further shows the vertical axis 245 through the center 246 of the fuselage 16. As shown in FIG. 9A, the wings 14 have moved upwardly from the first position 248*a* to a second position 248*b*, such as an up-bending position 249, and the struts 40 have moved slightly upwardly from the first position 250*a* to a second position 250*b*. When the aircraft 10*b* is in flight, the up-bending of the wings 14 in the up-bending position 249 causes tension 136 (see FIG. 1) in the struts 40, respectively. For the 2.5 g up-bending of wing flight condition 32, there is typically a large amount of tension, as compared to the relatively small amount of tension for the 1 g on ground condition 30 and the minus 1 g pushover flight condition 36 (see FIG. 1).

Now referring to FIGS. 9B-9C, FIG. 9B is an illustration of an enlarged front view of a version of a strut assembly 12, such as a first strut assembly 12*a*, of FIG. 8B, positioned in the left portion 16*a* of the interior 20*a* of the fuselage 16 of an aircraft 10*b*, when the aircraft 10*b* is in flight in the 2.5 g up-bending of wing flight condition 32, and where the strut assembly 12 has the tensioner member 60, such as the spring member 60*a*, for example, the compression spring 126 positioned between the first fitting element 142 and the second fitting element 164. FIG. 9C is an illustration of an enlarged top view of the strut assembly 12, such as the first strut assembly 12*a*, of FIG. 9B, when the aircraft 10*b* is in flight in the 2.5 g up-bending of wing flight condition 32, and where the strut assembly 12 has the tensioner member 60, such as the spring member 60*a*, for example, the compression spring 126 positioned between the first fitting element 142 and the second fitting element 164.

As shown in FIGS. 9B-9C, the strut assembly 12 includes the strut 40 comprising the strut tension member 54, such as in the form of the rod 58, within the strut structure 72, and the strut tension member 54 extends from the interior 74 (see FIG. 9C) of the strut structure 72, through the opening 50 (see FIG. 9C) in the side 21 (see FIG. 9C), such as the side-of-body, of the fuselage 16, and into the left portion 16*a* of the interior 20*a* of the fuselage 16 of the aircraft 10*b*. The strut assembly 12 is positioned between the bulkheads 26 (see FIGS. 9B-9C), such as the forward bulkhead 26*a* (see FIG. 9C) and the aft bulkhead 26*b* (see FIGS. 9B-9C). As shown in FIG. 9C, the strut structure 72 comprises the airfoil section 78 with the outer mold line 84 and the airfoil shape cross section 88. FIG. 9C shows the strut skin 90 on the exterior 76 of the strut structure 72. As shown in FIGS. 9B-9C, the strut structure 72 has the land 236 within the interior 74 (see FIG. 9C) of the strut structure 72 near the inboard end 44*b* of the strut structure 72 and the side 21 of the fuselage 16.

FIGS. 9B-9C show the strut tension member 54 having the elongate body 46*a* extending through the tensioner member 60, such as the spring member 60*a*, in the form of the compression spring 126, and the inboard end 44*a* of the strut tension member 54 attached to the second fitting element 164. As shown in FIGS. 9B-9C, the strut assembly 12 further comprises the first fitting element 142, such as the side-of-body fitting 142*a*. FIG. 9B shows the first fitting element 142 with the first end 144, the second end 145 in contact with the first end 108*a* of the tensioner member 60, such as the compression spring 126, and the body 146 comprised of the load spanning beam 147, for example, the I-beam portion 147*a*, and the cylindrical portion 148 inserted, or formed, through the I-beam portion 147*a*. As shown in FIG. 9C, the exterior of the first side 149*a* of the I-beam portion 147*a* is attached to the forward bulkhead 26*a*, and the exterior of the second side 149*b* of the I-beam portion 147*a* is attached to the aft bulkhead 26*b*. As shown in FIG. 9B, the cylindrical portion 148 of the body 146 of the first fitting element 142 has the through opening 154 and the bearing surface 156 at the second end 145 of the first fitting element 142. The bearing surface 156 functions as a stop element 160 (see FIG. 9B).

As shown in FIGS. 9B-9C, each strut assembly 12 further comprises the bushing element 180 partially disposed within the through opening 154 (see FIG. 9B) of the first fitting element 142, such that part of the exterior surface of the bushing element 180 is in contact against the interior surface of the through opening 154 of the first fitting element 142. Each bushing element 180 has the opening 182 (see FIG. 9B) receiving the first portion 155*a* of the strut 40, such as the strut tension member 54, where the first portion 155*a* extends through both the opening 182 of the bushing element 180 and the through opening 154 of the first fitting element 142.

As shown in FIGS. 9B-9C, the strut assembly 12 further comprises the second fitting element 164. The second fitting element 164 has the first end 165 (see FIG. 9C) in contact with the second end 108*b* of the tensioner member 60, such as the compression spring 126, the second end 166 (see FIG. 9C), and the body 168 (see FIG. 9C). The second fitting element 164 has the through opening 172 (see also FIG. 9B) receiving the second portion 155*b* (see FIG. 9B) of the strut 40, such as the strut tension member 54, extending through and fixedly attached to the second fitting element 164. The second fitting element 164 has the bearing surface 174 (see FIG. 9C) at the first end 165 of the second fitting element 164. The bearing surface 174 faces outboard and opposite the bearing surface 156 of the first fitting element 142. As shown in FIGS. 9B-9C, the bearing surface 174 of the second fitting element 164 bears against the second end 108*b* of the tensioner member 60, such as the spring member 60*a*, for example, the compression spring 126, and the bearing surface 156 of the first fitting element 142 bears against the first end 108*a* of the tensioner member 60, such as the spring member 60*a*, for example, the compression spring 126. The tensioner member 60, such as the spring member 60*a*, for example, the compression spring 126, presses axially against both the first fitting element 142 and the second fitting element 164, with a small amount of load, approximately 10% of the total load, going through the strut 40, including the strut tension member 54.

The 2.5 g up-bending of wing flight condition 32 causes tension 136 (see FIG. 1) in the strut 40, such as the strut tension member 54, for example, the rod 58, and the bearing surface 174 of the second fitting element 164 bears against, or contacts, the second end 108*b* of the tensioner member 60, such as the spring member 60*a*, for example, the compression spring 126, and the bearing surface 156 of the first fitting element 142 bears against, or contacts, the first end 108*a* of the tensioner member 60, such as the spring member 60*a*, for example, the compression spring 126. The strut 40, such as the strut tension member 54, for example, the rod 58, has sufficient tension to overwhelm the spring member 60*a*, and goes into tension 136.

When the aircraft 10*b* is in flight, the up-bending of the wing 14 (see FIG. 9A) causes tension 136 (see FIG. 1) in the strut 40, such as the strut tension member 54, for example, the rod 58. For up-bending of wing flight conditions, the tension 136 in the strut 40, such as the strut tension member 54, for example, the rod 58, is approximately proportional to the vertical acceleration 34 (see FIG. 1) of the aircraft 10*b*. The up-bending position 249 (see FIG. 9A) of the wings 14 (see FIG. 9A) is a normal in-flight condition, where the strut 40, such as the strut tension member 54, for example, the rod 58, is typically in tension 136. The tension load 134 (see FIG. 1) in the strut 40, such as the strut tension member 54, for example, the rod 58, passes through the bulkheads 26. The load path 38 for the tension load 134 for the 2.5 g up-bending of wing flight condition 32, as shown in FIGS. 9B-9C, is from the wing 14 (see FIG. 9A), such as the first wing 14*a*, on the left side of the aircraft 10*b* (see FIG. 9A), to the strut tension member 54, such as the rod 58, to the second fitting element 164, to the first fitting element 142, such as the side-of-body fitting 142*a*, to the forward and aft bulkheads 26*a*, 26*b* on the left portion 16*a* (see FIGS. 9B-9C) of the fuselage 16, through to the forward and aft bulkheads 26*a*, 26*b* on the right portion 16*b* (see FIG. 5A) of the fuselage 16, back to the first fitting element 142, such as the side-of-body fitting 142*a*, on the opposite side, or right side, of the fuselage 16 of the aircraft 10*b*, back to the second fitting element 164, back to the strut tension member 54, such as the rod 58, and back to the wing 14, such as the second wing 14*b* (see FIG. 9A), on the right side of the aircraft 10*b* (see FIG. 9A). Some of the strut load will still pass through the tensioner member 60, such as the spring member 60*a*, for example, the compression spring 126, on the opposite side of the fuselage 16 of the aircraft 10*b*. Depending on the stiffness of the tensioner member 60, such as the spring member 60*a*, for example, the compression spring 126, this load may be perhaps ten percent (10%) or less of the strut load during the 2.5 g up-bending of wing flight condition 32. For the 2.5 g up-bending of wing flight condition 32, such as shown in FIGS. 9B-9C, ninety percent (90%) of the load goes through the load path 38 that includes the compression springs 126. For the 2.5 g up-bending of wing flight condition 32, where there is a large amount of tension 136 in the strut tension member 54, the load path 38 between the second fitting element 164 and the first fitting element 142 is redundant. About ninety percent (90%) of the tension load 134 (see FIG. 1) goes directly from the second fitting element 164 to the first fitting element 142, and about ten percent (10%) of the tension load 134 goes through the tensioner member 60, such as the spring member 60*a*, for example, the compression spring 126 (see FIGS. 9B-9C) that is between them.

Figure 9D:
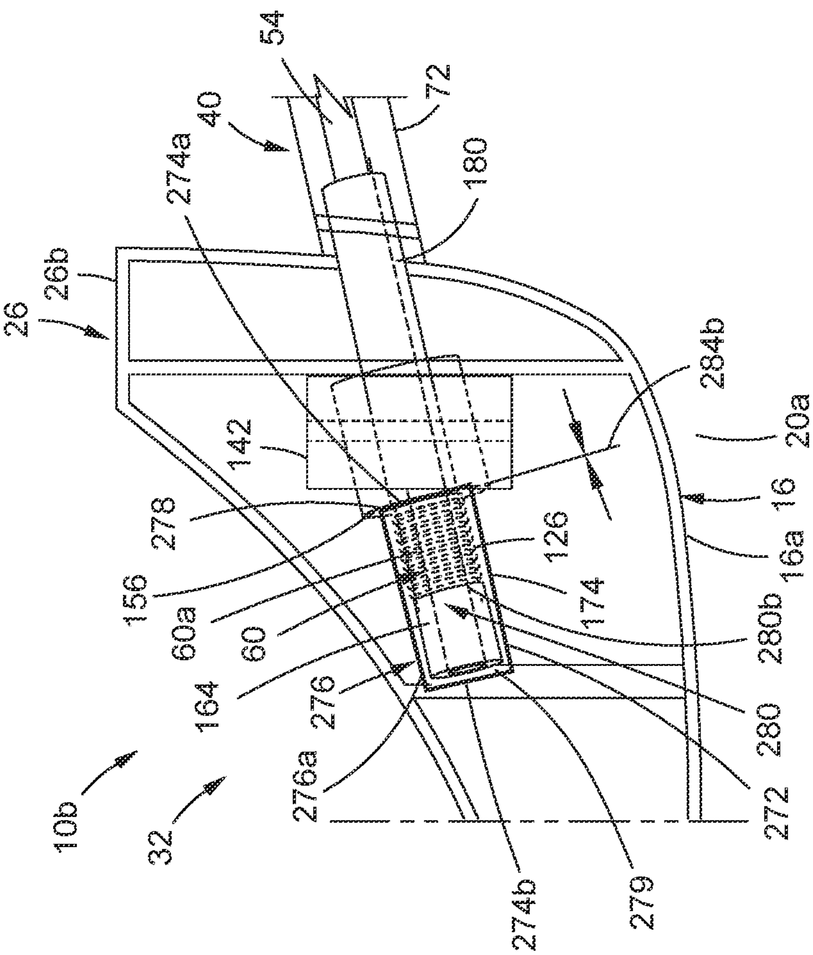
FIG. 9D is an illustration of an enlarged front view of the strut assembly of FIG. 9B, when the aircraft is in flight in the 2.5 g up-bending of wing flight condition, and where the strut assembly has an outer sheath.

Now referring to FIG. 9D, FIG. 9D is an illustration of an enlarged front view of the strut assembly 12, such as the first strut assembly 12*a*, of FIG. 9B, when the aircraft 10*b* is in flight in the 2.5 g up-bending of wing flight condition 32, and where the strut assembly 12 has the outer sheath 272 coupled to the tensioner member 60, such as the spring member 60*a*, for example, the compression spring 126, and/or coupled to the second fitting element 164.

Now referring to FIG. 9D, FIG. 9D is an illustration of an enlarged front view of the strut assembly 12, such as the first strut assembly 12*a*, of FIG. 9B, when the aircraft 10*b* is in flight in the 2.5 g up-bending of wing flight condition 32, and where the strut assembly 12 has the outer sheath 272, or sleeve, coupled to the tensioner member 60, such as the spring member 60*a*, for example, the compression spring 126, and/or coupled to the second fitting element 164.

As shown in FIG. 9D, the outer sheath 272 has the first end 274*a*, the second end 274*b*, and the body 276, such as in the form of the cylindrical body 276*a*, formed between the first end 274*a* and the second end 274*b*. As shown in FIG. 9D, the outer sheath 272 has the opening 278 at the first end 274*a* for receiving all, or part, of the tensioner member 60, such as the spring member 60*a*, for example, the compression spring 126, and for receiving all, or the entirety, of the second fitting element 164. FIG. 9D shows the spaced portion 279 between the second fitting element 164 and the second end 274*b* in the interior of the outer sheath 272. However, the spaced portion 279 may be smaller or larger in size. As shown in FIGS. 9B, 9D, in the 2.5 g up-bending of wing flight condition 32, the spring member 60*a*, for example, the compression spring 126, is in the spring position 280, such as a fully compressed position 280*b*. As further shown in FIG. 9D, in the in flight in the 2.5 g up-bending of wing flight condition 32, there is no gap 282 (see FIG. 8D) with a no gap distance 284*b* between the first end 274*a* of the outer sheath 272 and the bearing surface 156 of the first fitting element 142, and the first end 274*a* of the outer sheath 272 is in contact with, and bears against, the bearing surface 156 of the first fitting element 142.

FIG. 9D further shows the strut 40 comprising the strut tension member 54 within the strut structure 72, and the strut tension member 54 extending into the left portion 16*a* of the interior 20*a* of the fuselage 16 of the aircraft 10*b*. FIG. 9D further shows the bulkhead 26, such as the aft bulkhead 26*b*, the first fitting element 142 with the bearing surface 156, the bushing element 180, and the second fitting element 164 with the bearing surface 174.

Figure 9F:
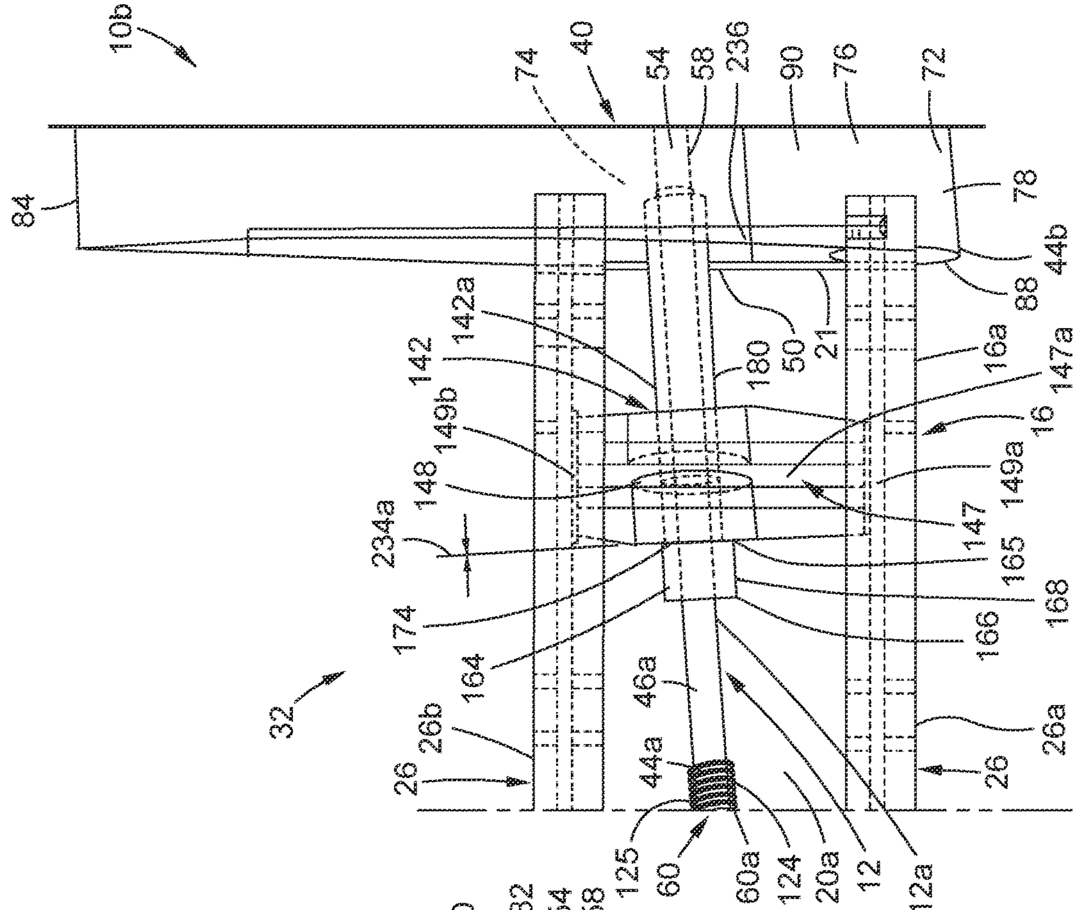
FIG. 9F is an illustration of an enlarged top view of the strut assembly of FIG. 9E, when the aircraft is in flight in the 2.5 g up-bending of wing flight condition, and where the strut assembly has a tension spring.
Figure 9E:
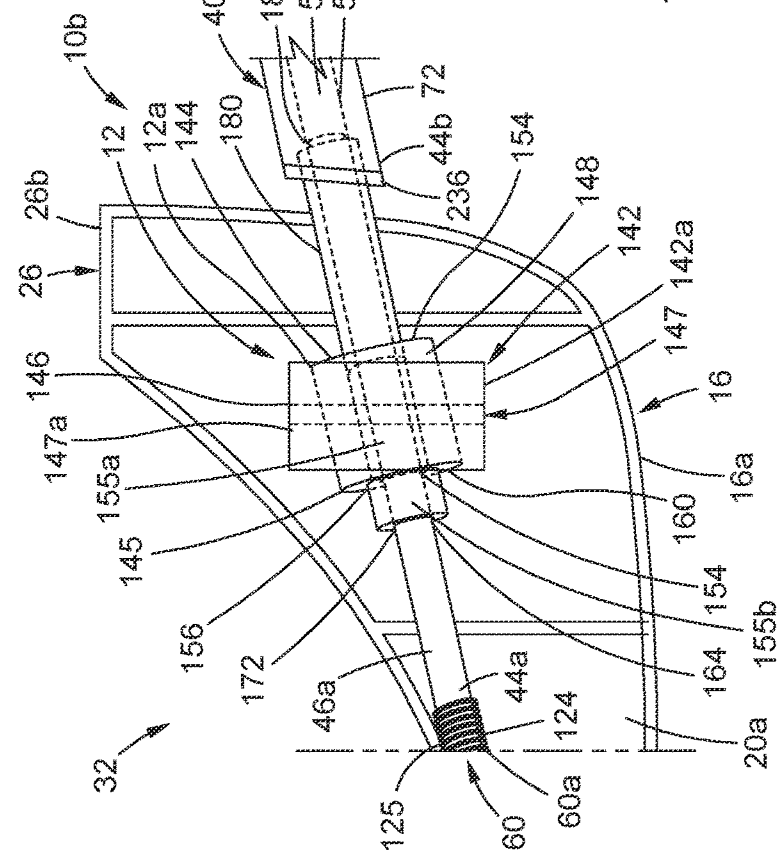
FIG. 9E is an illustration of an enlarged front view of a version of a strut assembly of FIG. 8E, when the aircraft is in flight in the 2.5 g up-bending of wing flight condition, and where the strut assembly has a tension spring.

Now referring to FIGS. 9E-9F, FIG. 9E is an illustration of an enlarged front view of another version of a strut assembly 12, such as a first strut assembly 12*a*, positioned in the left portion 16*a* of the interior 20*a* of the fuselage 16 of an aircraft 10*b*, when the aircraft 10*b* is in flight in the 2.5 g up-bending of wing flight condition 32, and where the strut assembly 12 has the tension spring 125. FIG. 9F is an illustration of an enlarged top view of the strut assembly 12, such as the first strut assembly 12*a*, of FIG. 9E, when the aircraft 10*b* is in flight in the 2.5 g up-bending of wing flight condition 32, and where the strut assembly 12 has the tension spring 125.

As shown in FIGS. 9E-9F, the strut assembly 12 includes the strut 40 comprising the strut tension member 54, such as in the form of the rod 58, within the strut structure 72, and the strut tension member 54 extends from the interior 74 (see FIG. 9F) of the strut structure 72, through the opening 50 (see FIG. 9F) in the side 21 (see FIG. 9F), such as the side-of-body, of the fuselage 16, and into the left portion 16*a* of the interior 20*a* of the fuselage 16 of the aircraft 10*b*. The strut assembly 12 is positioned between the bulkheads 26 (see FIGS. 9E-9F), such as the forward bulkhead 26*a* (see FIG. 9F) and the aft bulkhead 26*b* (see FIGS. 9E-9F). As shown in FIG. 9E, the strut structure 72 comprises the airfoil section 78 with the outer mold line 84 and the airfoil shape cross section 88. FIG. 9F shows the strut skin 90 on the exterior 76 of the strut structure 72. As shown in FIGS. 9E-9F, the strut structure 72 has a land 236 within the interior 74 (see FIG. 9F) of the strut structure 72 near the inboard end 44*b* of the strut structure 72 and the side 21 of the fuselage 16.

FIGS. 9E-9F show the strut tension member 54 having the elongate body 46*a* and the inboard end 44*a* attached to the tensioner member 60, such as the spring member 60*a*, in the form of a coil spring 124, for example, the tension spring 125. As shown in FIGS. 9E-9F, the strut assembly 12 further comprises the first fitting element 142, such as the side-of-body fitting 142*a*. FIG. 9E shows the first fitting element 142 with the first end 144, the second end 145, and the body 146 comprised of the load spanning beam 147, for example, the I-beam portion 147*a* and the cylindrical portion 148 inserted, or formed, through the I-beam portion 147*a*. As shown in FIG. 9F, the exterior of the first side 149*a* of the I-beam portion 147*a* is attached to the forward bulkhead 26*a*, and the exterior of the second side 149*b* of the I-beam portion 147*a* is attached to the aft bulkhead 26*b*. As shown in FIG. 9E, the cylindrical portion 148 of the body 146 of the first fitting element 142 has the through opening 154 and the bearing surface 156 at the second end 145 of the first fitting element 142. The bearing surface 156 functions as a stop element 160 (see FIG. 9E).

As shown in FIGS. 9E-9F, each strut assembly 12 further comprises the bushing element 180 partially disposed within the through opening 154 of the first fitting element 142, such that part of the exterior surface of the bushing element 180 is in contact against the interior surface of the through opening 154 of the first fitting element 142. Each bushing element 180 has the opening 182 (see FIG. 9E) receiving the first portion 155*a* (see FIG. 9E) of the strut 40, such as the strut tension member 54, where the first portion 155*a* extends through both the opening 182 of the bushing element 180 and the through opening 154 of the first fitting element 142.

As shown in FIGS. 9E-9F, the strut assembly 12 further comprises the second fitting element 164. The second fitting element 164 has the first end 165 (see FIG. 9F), the second end 166 (see FIG. 9F), and the body 168 (see FIG. 9F). The second fitting element 164 has the through opening 172 (see also FIG. 9E) receiving the second portion 155*b* (see FIG. 9E) of the strut 40, such as the strut tension member 54, extending through and fixedly attached to the second fitting element 164. The second fitting element 164 has the bearing surface 174 (see FIG. 9F) at the first end 165 of the second fitting element 164. The bearing surface 174 faces outboard and opposite the bearing surface 156 of the first fitting element 142.

As shown in FIG. 9F, in the 2.5 g up-bending of wing flight condition 32, there is a no gap distance 234*a* between the bearing surface 174 of the second fitting element 164 and the bearing surface 156 of the first fitting element 142. The 2.5 g up-bending of wing flight condition 32 causes tension 136 (see FIG. 1) in the strut 40, such as the strut tension member 54, for example, the rod 58, and the bearing surface 174 of the second fitting element 164 bears against, or contacts, the bearing surface 156 of the first fitting element 142. The strut 40, such as the strut tension member 54, for example, the rod 58, has sufficient tension to overwhelm the spring member 60*a*, and the second fitting element 164 bears against the first fitting element 142.

When the aircraft 10*b* is in flight, the up-bending of the wing 14 (see FIG. 9A) causes tension 136 (see FIG. 1) in the strut 40, such as the strut tension member 54, for example, the rod 58. For up-bending of wing flight conditions, the tension 136 in the strut 40, such as the strut tension member 54, for example, the rod 58, is approximately proportional to the vertical acceleration 34 (see FIG. 1) of the aircraft 10*b*. The up-bending position 249 (see FIG. 9A) of the wings 14 (see FIG. 9A) is a normal in-flight condition, where the strut 40, such as the strut tension member 54, for example, the rod 58, is typically in tension 136. The tension load 134 (see FIG. 1) in the strut 40, such as the strut tension member 54, for example, the rod 58, passes through the bulkheads 26. The load path 38 for the tension load 134 for the 2.5 g up-bending of wing flight condition 32, such as shown in FIGS. 9E-9F, is from the inboard end 44*a* of the strut tension member 54, such as the rod 58, within the interior 20*a* of the fuselage 16, to the second fitting element 164, to the first fitting element 142, such as the side-of-body fitting 142*a*, to the forward and aft bulkheads 26*a*, 26*b*, back to the first fitting element 142 on the opposite side of the fuselage 16 of the aircraft 10*b*, such as the side-of-body fitting 142*a*, back to the second fitting element 164, and back to the inboard end 44*a* of the strut tension member 54, such as the rod 58, within the interior 20*a* of the fuselage 16. The strut assembly 12 is approximately mid-way between the forward bulkhead 26*a* and the aft bulkhead 26*b*, and each of the forward bulkhead 26*a* and the aft bulkhead 26*b* will receive approximately one-half of the strut load. Some of the strut load will still pass through the tensioner member 60, such as the spring member 60*a*, for example, the tension spring 125, on the opposite side of the fuselage 16 of the aircraft 10*b*. Depending on the stiffness of the tensioner member 60, such as the spring member 60*a*, for example, the tension spring 125, this load may be perhaps ten percent (10%) or less of the strut load during the 2.5 g up-bending of wing flight condition 32.

Figure 10A:
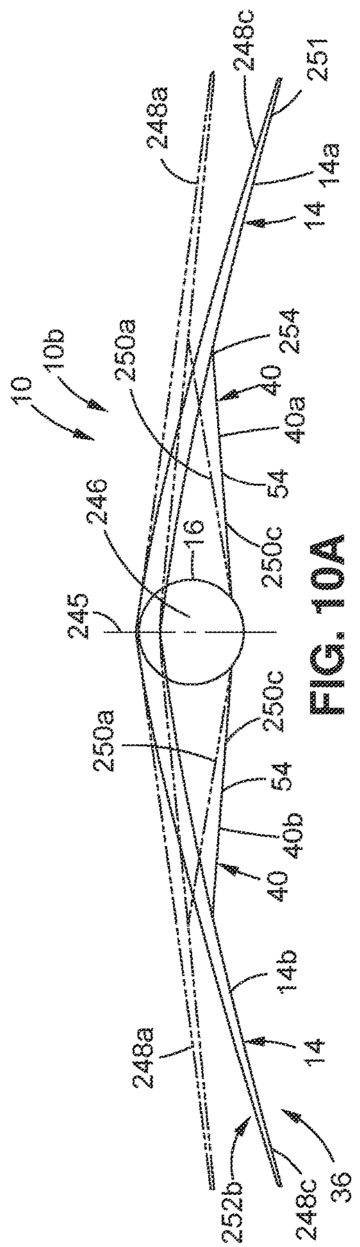
FIG. 10A is an illustration of an enlarged front view of a schematic diagram of the aircraft of FIG. 8A in flight in a minus 1 g pushover flight condition.

Now referring to FIG. 10A, FIG. 10A is an illustration of a front view of a schematic diagram of the vehicle 10, such as the aircraft 10*b* of FIG. 8A, in a flight position 252*b* in flight in the minus 1 g pushover flight condition 36. As shown in FIG. 10A, the aircraft 10*b* comprises the fuselage 16, the wings 14, such as the first wing 14*a* and the second wing 14*b*, and the struts 40, such as the first strut 40*a* and the second strut 40*b*, comprising strut tension members 54. FIG. 10A further shows the vertical axis 245 through the center 246 of the fuselage 16. As shown in FIG. 10A, the wings 14 have moved downwardly from the first position 248*a* to a third position 248*c*, such as a down-bending position 251, and the struts 40 have moved slightly downwardly from the first position 250*a* to a third position 250*c*.

Figure 10C:
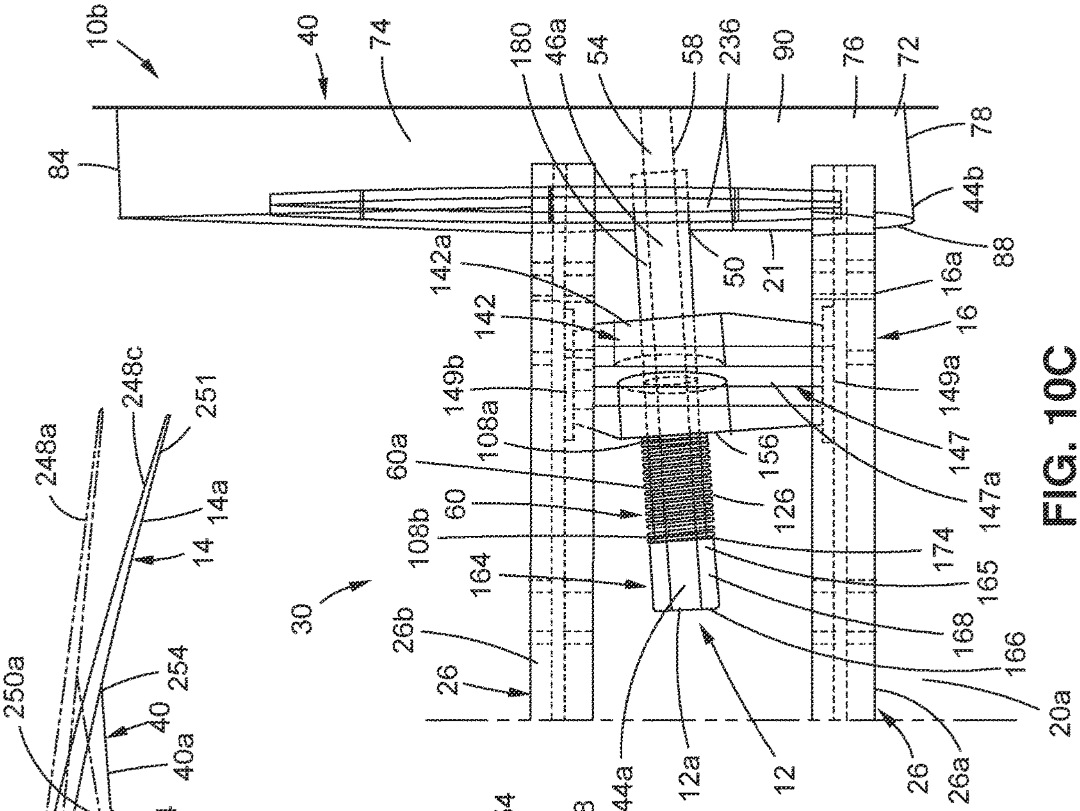
FIG. 10C is an illustration of a top view of the strut assembly of FIG. 10B, when the aircraft is in flight in the minus 1 g pushover flight condition, and where the strut assembly has a compression spring.
Figure 10B:
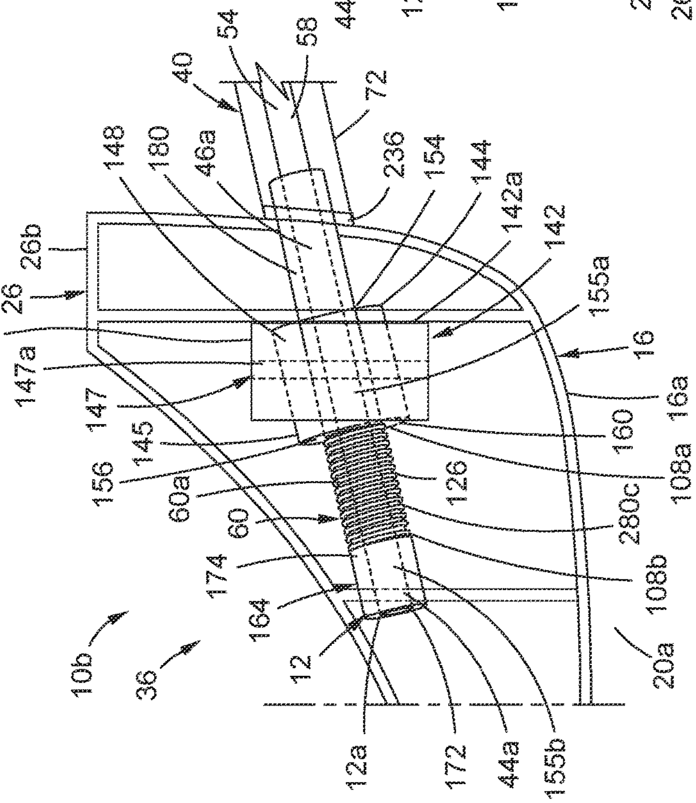
FIG. 10B is an illustration of an enlarged front view of a version of a strut assembly of FIG. 8B, when the aircraft is in flight in the minus 1 g pushover flight condition, and where the strut assembly has a compression spring.

Now referring to FIGS. 10B-10C, FIG. 10B is an illustration of an enlarged front view of a version of the strut assembly 12, such as the first strut assembly 12*a*, positioned in the left portion 16*a* of the interior 20*a* of the fuselage 16 of an aircraft 10*b*, when the aircraft 10*b* is in flight in the minus 1 g pushover flight condition 36, and where the strut assembly 12 has the compression spring 126 positioned between the first fitting element 142 and the second fitting element 164. FIG. 10C is an illustration of an enlarged top view of the strut assembly 12, such as the first strut assembly 12*a*, of FIG. 10B, when the aircraft 10*b* is in flight in the minus 1 g pushover flight condition 36, and where the strut assembly 12 has the compression spring 126 positioned between the first fitting element 142 and the second fitting element 164.

There is similarity between the minus 1 g pushover flight condition 36 and the 1 g on ground condition 30. Since the wing 14 tends to bend down more for the minus 1 g pushover flight condition 36, as compared to the 1 g on ground condition 30, the gap 235 in FIGS. 10B-10C is slightly larger than the gap 235 in FIGS. 8B-8C.

As shown in FIGS. 10B-10C, the strut assembly 12 includes the strut 40 comprising the strut tension member 54, such as in the form of the rod 58, within the strut structure 72, and the strut tension member 54 extends from the interior 74 (see FIG. 10C) of the strut structure 72, through the opening 50 (see FIG. 10C) in the side 21 (see FIG. 10C), such as the side-of-body, of the fuselage 16, and into the left portion 16*a* of the interior 20*a* of the fuselage 16 of the aircraft 10*b*. The strut assembly 12 is positioned between the bulkheads 26 (see FIGS. 10B-10C), such as the forward bulkhead 26*a* (see FIG. 10C) and the aft bulkhead 26*b* (see FIGS. 10B-10C). As shown in FIG. 10C, the strut structure 72 comprises the airfoil section 78 with the outer mold line 84 and the airfoil shape cross section 88. FIG. 10C shows the strut skin 90 on the exterior 76 of the strut structure 72. As shown in FIGS. 10B-10C, the strut structure 72 has the land 236 within the interior 74 (see FIG. 8C) of the strut structure 72 near the inboard end 44*b* of the strut structure 72 and the side 21 of the fuselage 16.

FIGS. 10B-10C show the strut tension member 54 having the elongate body 46*a* extending through the tensioner member 60, such as the spring member 60*a*, in the form of the compression spring 126, and the inboard end 44*a* of the strut tension member 54 attached to the second fitting element 164. As shown in FIGS. 10B-10C, the strut assembly 12 further comprises the first fitting element 142, such as the side-of-body fitting 142*a*. FIG. 10B shows the first fitting element 142 with the first end 144, the second end 145 in contact with the first end 108*a* of the tensioner member 60, such as the compression spring 126, and the body 146 comprised of the load spanning beam 147, for example, the I-beam portion 147*a* and the cylindrical portion 148 inserted, or formed, through the I-beam portion 147*a*. As shown in FIG. 10C, the exterior of the first side 149*a* of the I-beam portion 147*a* is attached to the forward bulkhead 26*a*, and the exterior of the second side 149*b* of the I-beam portion 147*a* is attached to the aft bulkhead 26*b*. As shown in FIG. 10B, the cylindrical portion 148 of the body 146 of the first fitting element 142 has the through opening 154 and the bearing surface 156 at the second end 145 of the first fitting element 142. The bearing surface 156 functions as a stop element 160 (see FIG. 10B).

As shown in FIGS. 10B-10C, each strut assembly 12 further comprises the bushing element 180 partially disposed within the through opening 154 of the first fitting element 142, such that part of the exterior surface of the bushing element 180 is in contact against the interior surface of the through opening 154 of the first fitting element 142. The bushing element 180 has the opening 182 (see FIG. 10B) receiving the first portion 155*a* (see FIG. 10B) of the strut 40, such as the strut tension member 54, where the first portion 155*a* extends through both the opening 182 of the bushing element 180 and the through opening 154 of the first fitting element 142.

As shown in FIGS. 10B-10C, the strut assembly 12 further comprises the second fitting element 164. The second fitting element 164 has the first end 165 (see FIG. 10C) in contact with the second end 108*b* of the tensioner member 60, such as the compression spring 126, the second end 166 (see FIG. 10C), and the body 168 (see FIG. 10C). The second fitting element 164 has the through opening 172 (see also FIG. 10B) receiving the second portion 155*b* (see FIG. 10B) of the strut 40, such as the strut tension member 54, extending through the second fitting element 164. The second fitting element 164 has the bearing surface 174 (see FIG. 10C) at the first end 165 of the second fitting element 164. The bearing surface 174 faces outboard and opposite the bearing surface 156 of the first fitting element 142. As shown in FIGS. 10B-10C, the bearing surface 174 of the second fitting element 164 bears against the second end 108*b* of the tensioner member 60, such as the spring member 60*a*, for example, the compression spring 126, and the bearing surface 156 of the first fitting element 142 bears against the first end 108*a* of the tensioner member 60, such as the spring member 60*a*, for example, the compression spring 126.

As shown in FIGS. 10B-10C, when the aircraft 10*b* is in flight in the minus 1 g pushover flight condition 36, such as when the wing 14 is bending down in the down-bending position 251 (see FIG. 10A), the tension 136 (see FIG. 1) in the strut 40, such as the strut tension member 54, for example, the rod 58, from flight loads would be negative if the strut 40, such as the strut tension member 54, for example, the rod 58, could take compression, and since it cannot take tension 136, the strut load would be zero. However, the tensioner member 60, such as the spring member 60*a*, imparts a small amount of load, so that the strut load is not zero. The behavior of the aircraft 10*b* in the minus 1 g pushover flight condition 36 is similar to the 1 g on ground condition 30 but the deflection in the minus 1 g pushover flight condition 36 is greater than the deflection in the 1 g on ground condition 30. With regard to the magnitude of the tension load 134 (see FIG. 1) in the minus 1 g pushover flight condition 36, the tension load 134 is small or modest, to prevent drooping of the strut 40, such as the strut tension member 54, for example, the rod 58, and the tensioner member 60, such as the spring member 60*a*, does not apply excessive tension to the wing 14, which would cause bending stresses. When there is not compression in the minus 1 g pushover flight condition 36, the tensioner member 60, such as the spring member 60*a*, pulls on the strut 40, such as the strut tension member 54, for example, the rod 58, and keeps it taut. The strut 40, such as the strut tension member 54, for example, the rod 58, is taut enough so that it does not flap or oscillate excessively. The load path 38 for the tension load 134 for the minus 1 g pushover flight condition 36, as shown in FIGS. 10B-10C, is from the wing 14 (see FIG. 10A), such as the first wing 14*a*, on the left side of the aircraft 10*b* (see FIG. 10A), to the strut tension member 54, such as the rod 58, to the second fitting element 164, to the tensioner member 60, such as the spring member 60*a*, for example, the compression spring 126, to the first fitting element 142, to the forward and aft bulkheads 26*a*, 26*b* on the left portion 16*a* (see FIGS. 10B-10C) of the fuselage 16, through to the forward and aft bulkheads 26*a*, 26*b* on the right portion 16*b* (see FIG. 5A) of the fuselage 16, back to the first fitting element 142 on the opposite side, or right side, of the fuselage 16 of the aircraft 10*b*, back to the tensioner member 60, such as the spring member 60*a*, for example, the compression spring 126, on the opposite side, back to the second fitting element 164 on the opposite side, back to the strut tension member 54, for example, the rod 58, on the opposite side, and back to the wing 14, such as the second wing 14*b* (see FIG. 10A), on the right side of the aircraft 10*b* (see FIG. 10A).

Figure 10D:
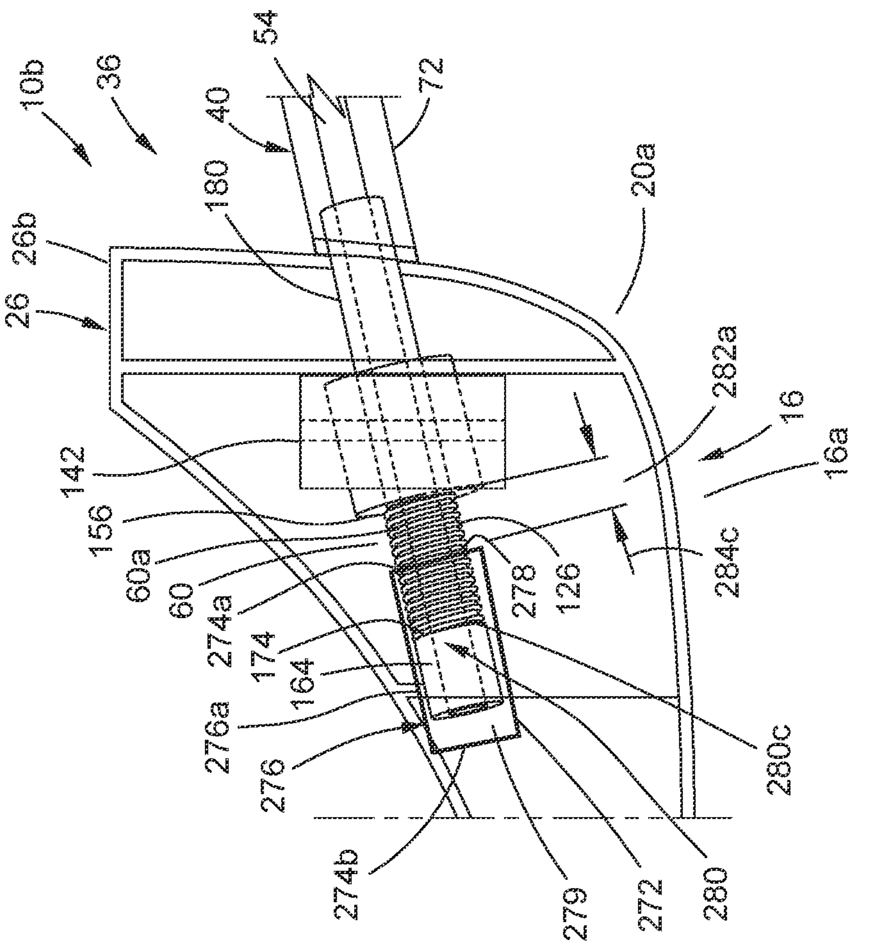
FIG. 10D is an illustration of an enlarged front view of the strut assembly of FIG. 10B, when the aircraft is in flight in the minus 1 g pushover flight condition, and where the strut assembly has an outer sheath.

Now referring to FIG. 10D, FIG. 10D is an illustration of an enlarged front view of the strut assembly 12, such as the first strut assembly 12*a*, of FIG. 10B, when the aircraft is in flight in the minus 1 g pushover flight condition 36, and where the strut assembly 12 has the outer sheath 272 coupled to the tensioner member 60, such as the spring member 60*a*, for example, the compression spring 126, and/or coupled to the second fitting element 164.

As shown in FIG. 10D, the outer sheath 272 has the first end 274*a*, the second end 274*b*, and the body 276, such as in the form of the cylindrical body 276*a*, formed between the first end 274*a* and the second end 274*b*. As shown in FIG. 10D, the outer sheath 272 has the opening 278 at the first end 274*a* for receiving all, or part, of the tensioner member 60, such as the spring member 60*a*, for example, the compression spring 126, and for receiving all, or the entirety, of the second fitting element 164. FIG. 10D shows the spaced portion 279 between the second fitting element 164 and the second end 274*b* in the interior of the outer sheath 272. However, the spaced portion 279 may be smaller or larger in size. As shown in FIGS. 10B, 10D, in the in flight in the minus 1 g pushover flight condition 36, the spring member 60*a*, for example, the compression spring 126, is in the spring position 280, such as a fully expanded position 280*c*. As further shown in FIG. 10D, in the in flight in the minus 1 g pushover flight condition 36, there is a gap 282*a* with a gap distance 284*c* between the first end 274*a* of the outer sheath 272 and the bearing surface 156 of the first fitting element 142, and the first end 274*a* of the outer sheath 272 is not in contact with the bearing surface 156 of the first fitting element 142. As shown in FIG. 10D, in the in flight in the minus 1 g pushover flight condition 36, the gap 282*a* opens between the first fitting element 142 and the outer sheath 272 surrounding the second fitting element 164, and the only load path 38 is through the tensioner member 60, such as the spring member 60*a*, for example, the compression spring 126, but it is a much smaller tension load 134, enough to prevent droop in the strut 40. Although the load paths 38 for the in flight in the minus 1 g pushover flight condition 36 and the 1 g on ground condition 30 are the same, the gap distance 284*c* in the in flight in the minus 1 g pushover flight condition 36, as shown in FIG. 10D, is greater than the gap distance 284*a* in the 1 g on ground condition 30, as shown in FIG. 8D.

FIG. 10D further shows the strut 40 comprising the strut tension member 54 within the strut structure 72, and the strut tension member 54 extending into the left portion 16*a* of the interior 20*a* of the fuselage 16 of the aircraft 10*b*. FIG. 10D further shows the bulkhead 26, such as the aft bulkhead 26*b*, the first fitting element 142 with the bearing surface 156, the bushing element 180, and the second fitting element 164 with the bearing surface 174.

Figure 10F:
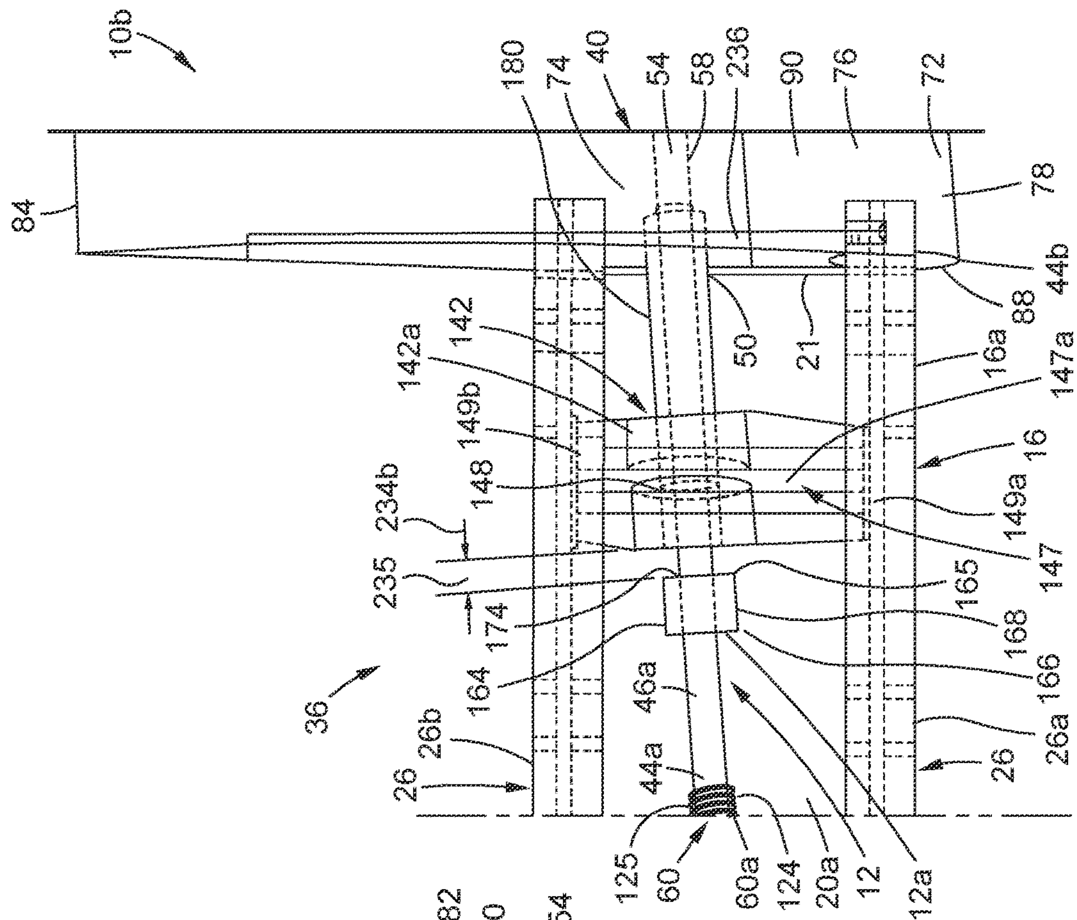
FIG. 10F is an illustration of a top view of the strut assembly of FIG. 10E, when the aircraft is in flight in the minus 1 g pushover flight condition, and where the strut assembly has a tension spring.
Figure 10E:
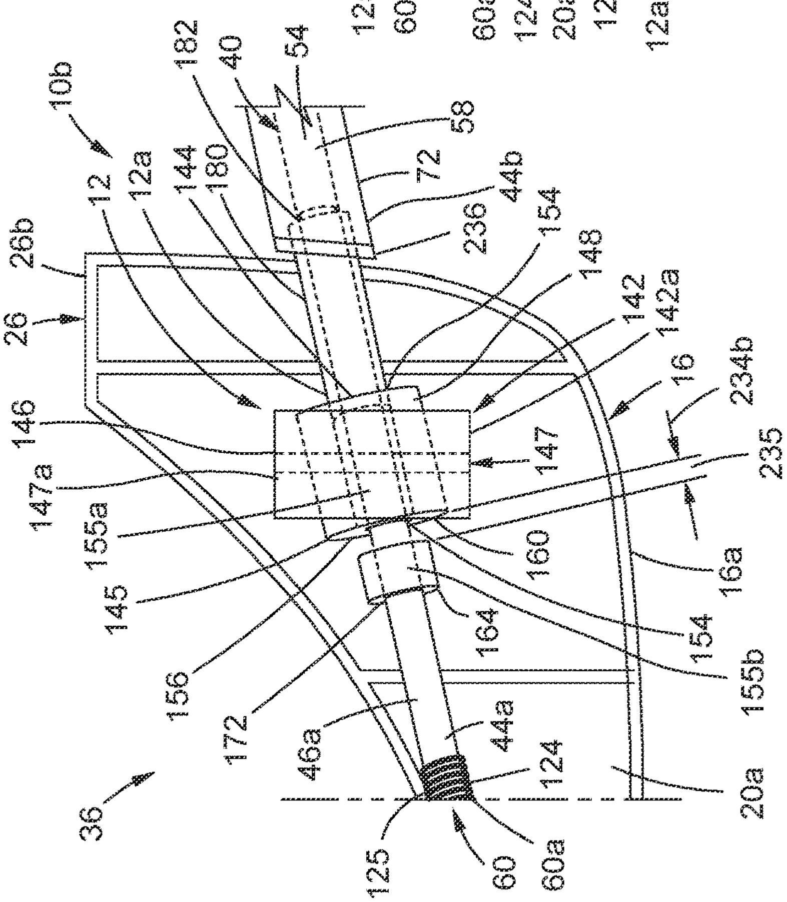
FIG. 10E is an illustration of an enlarged front view of a version of a strut assembly of FIG. 8E, when the aircraft is in flight in the minus 1 g pushover flight condition, and where the strut assembly has a tension spring.

Now referring to FIGS. 10E-10F, FIG. 10E is an illustration of an enlarged front view of another version of the strut assembly 12, such as the first strut assembly 12*a*, positioned in the left portion 16*a* of the interior 20*a* of the fuselage 16 of the aircraft 10*b*, when the aircraft 10*b* is in flight in the minus 1 g pushover flight condition 36, and where the strut assembly 12 has the tension spring 125. FIG. 10F is an illustration of an enlarged top view of the strut assembly 12, such as the first strut assembly 12*a*, of FIG. 10E, when the aircraft 10*b* is in flight in the minus 1 g pushover flight condition 36, and where the strut assembly 12 has the tension spring 125.

As shown in FIGS. 10E-10F, the strut assembly 12 includes the strut 40 comprising the strut tension member 54, such as in the form of the rod 58, within the strut structure 72, and the strut tension member 54 extends from the interior 74 (see FIG. 10F) of the strut structure 72, through the opening 50 (see FIG. 10F) in the side 21 (see FIG. 10F), such as the side-of-body, of the fuselage 16, and into the left portion 16*a* of the interior 20*a* of the fuselage 16 of the aircraft 10*b*. The strut assembly 12 is positioned between the bulkheads 26 (see FIGS. 10E-10F), such as the forward bulkhead 26*a* (see FIG. 10F) and the aft bulkhead 26*b* (see FIGS. 10E-10F). As shown in FIG. 10F, the strut structure 72 comprises the airfoil section 78 with the outer mold line 84 and the airfoil shape cross section 88. FIG. 10F shows the strut skin 90 on the exterior 76 of the strut structure 72. As shown in FIGS. 10E-10F, the strut structure 72 has the land 236 within the interior 74 (see FIG. 8F) of the strut structure 72 near the inboard end 44*b* of the strut structure 72 and the side 21 of the fuselage 16.

FIGS. 10E-10F show the strut tension member 54 having the elongate body 46*a* and the inboard end 44*a* attached to the tensioner member 60, such as the spring member 60*a*, in the form of a coil spring 124, for example, the tension spring 125. As shown in FIGS. 10E-10F, the strut assembly 12 further comprises the first fitting element 142, such as the side-of-body fitting 142*a*. FIG. 10E shows the first fitting element 142 with the first end 144, the second end 145, and the body 146 comprised of the load spanning beam 147, for example, the I-beam portion 147*a* and the cylindrical portion 148 inserted, or formed, through the I-beam portion 147*a*. As shown in FIG. 10F, the exterior of the first side 149*a* of the I-beam portion 147*a* is attached to the forward bulkhead 26*a*, and the exterior of the second side 149*b* of the I-beam portion 147*a* is attached to the aft bulkhead 26*b*. As shown in FIG. 10F, the cylindrical portion 148 of the body 146 of the first fitting element 142 has the through opening 154 and the bearing surface 156 at the second end 145 of the first fitting element 142. The bearing surface 156 functions as a stop element 160 (see FIG. 10E).

As shown in FIGS. 10E-10F, each strut assembly 12 further comprises the bushing element 180 partially disposed within the through opening 154 of the first fitting element 142, such that part of the exterior surface of the bushing element 180 is in contact against the interior surface of the through opening 154 of the first fitting element 142. The bushing element 180 has the opening 182 (see FIG. 10E) receiving the first portion 155*a* (see FIG. 10E) of the strut 40, such as the strut tension member 54, where the first portion 155*a* extends through both the opening 182 of the bushing element 180 and the through opening 154 of the first fitting element 142.

As shown in FIGS. 10E-10F, the strut assembly 12 further comprises the second fitting element 164. The second fitting element 164 has the first end 165 (see FIG. 10F), the second end 166 (see FIG. 10F), and the body 168 (see FIG. 10F). The second fitting element 164 has the through opening 172 (see also FIG. 10E) receiving the second portion 155*b* (see FIG. 10E) of the strut 40, such as the strut tension member 54, extending through and fixedly attached to the second fitting element 164. The second fitting element 164 has the bearing surface 174 (see FIG. 10F) at the first end 165 of the second fitting element 164. The bearing surface 174 faces outboard and opposite the bearing surface 156 of the first fitting element 142.

As shown in FIGS. 10E-10F, in the minus 1 g pushover flight condition 36, there is a gap 235 with a gap distance 234*b* between the bearing surface 174 of the second fitting element 164 and the bearing surface 156 of the first fitting element 142. The bearing surface 174 of the second fitting element 164 is not in contact with the bearing surface 156 of the first fitting element 142. When the aircraft 10*b* is in flight in the minus 1 g pushover flight condition 36, such as when the wing 14 is bending down in the down-bending position 251 (see FIG. 10A), the tension 136 (see FIG. 1) in the strut 40, such as the strut tension member 54, for example, the rod 58, from flight loads would be negative if the strut 40, such as the strut tension member 54, for example, the rod 58, experiences a decrease in length, and since it cannot take tension 136, the strut load would be zero. However, the tensioner member 60, such as the spring member 60*a*, imparts a small amount of load, so that the strut load is not zero. The behavior of the aircraft 10*b* in the minus 1 g pushover flight condition 36 is similar to the 1 g on ground condition 30 but the deflection in the minus 1 g pushover flight condition 36 is greater than the deflection in the 1 g on ground condition 30. With regard to the magnitude of the tension load 134 (see FIG. 1) in the minus 1 g pushover flight condition 36, the tension load 134 is small or modest, to prevent drooping of the strut 40, such as the strut tension member 54, for example, the rod 58, and the tensioner member 60, such as the spring member 60*a*, does not apply excessive tension to the wing 14, which would cause significant bending stresses. When there is not compression in the minus 1 g pushover flight condition 36, the tensioner member 60, such as the spring member 60*a*, pulls on the strut 40, such as the strut tension member 54, for example, the rod 58, and keeps it taut. The strut 40, such as the strut tension member 54, for example, the rod 58, is taut enough so that it does not flap or oscillate excessively. The load path 38 for the minus 1 g pushover flight condition 36 is from the fuselage structure 22 (see FIGS. 1, 5A), such as the center fitting 24 (see FIGS. 1, 5A), to the strut 40, such as the strut tension member 54, for example, the rod 58, and directly to the wing 14 (see FIG. 10A).

Figure 11A:
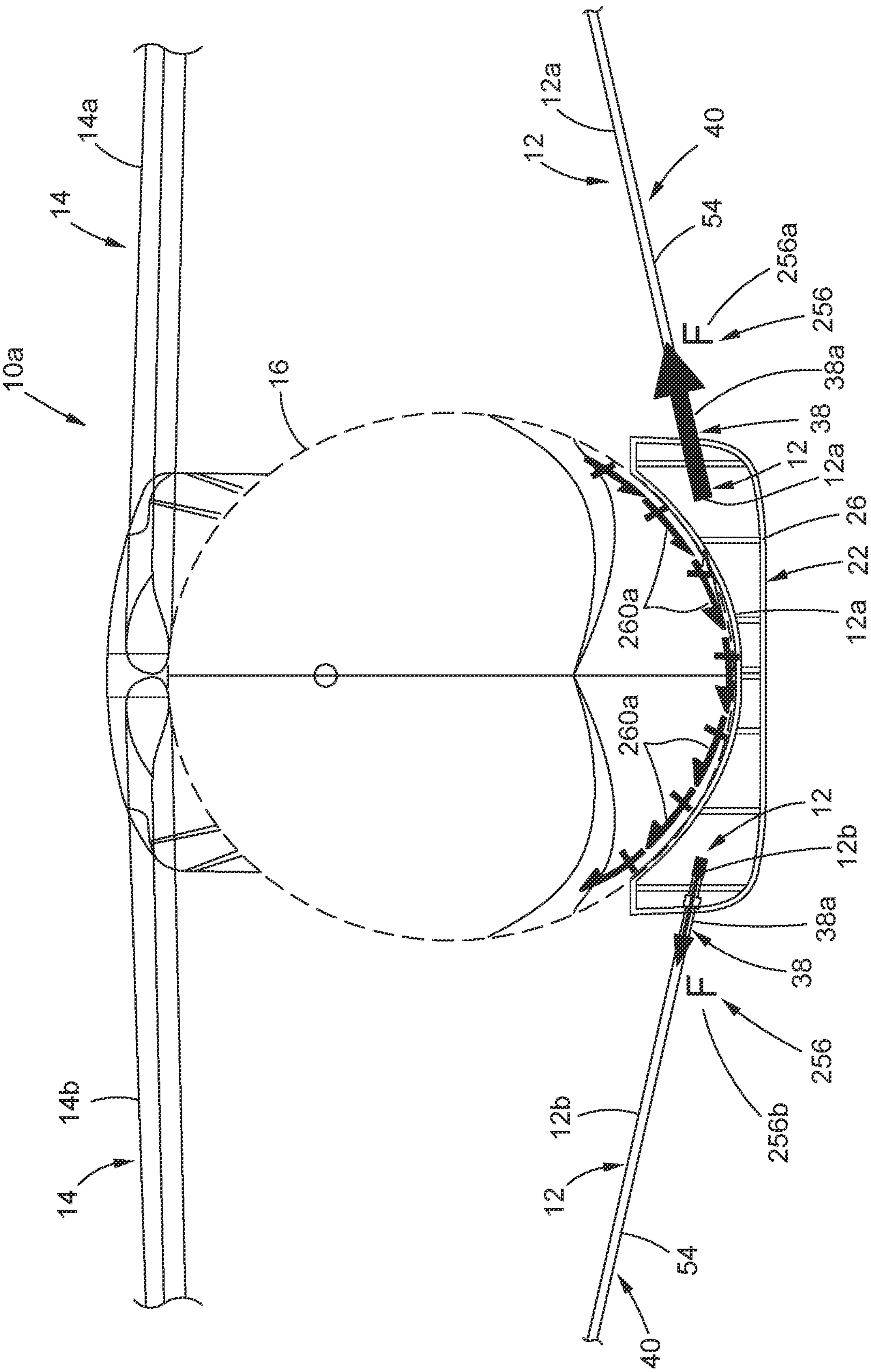
FIG. 11A is an illustration of a partial front view of an aircraft with an exemplary version of strut assemblies of the disclosure, showing asymmetric load paths through the strut assemblies having compression springs.
Figure 11B:
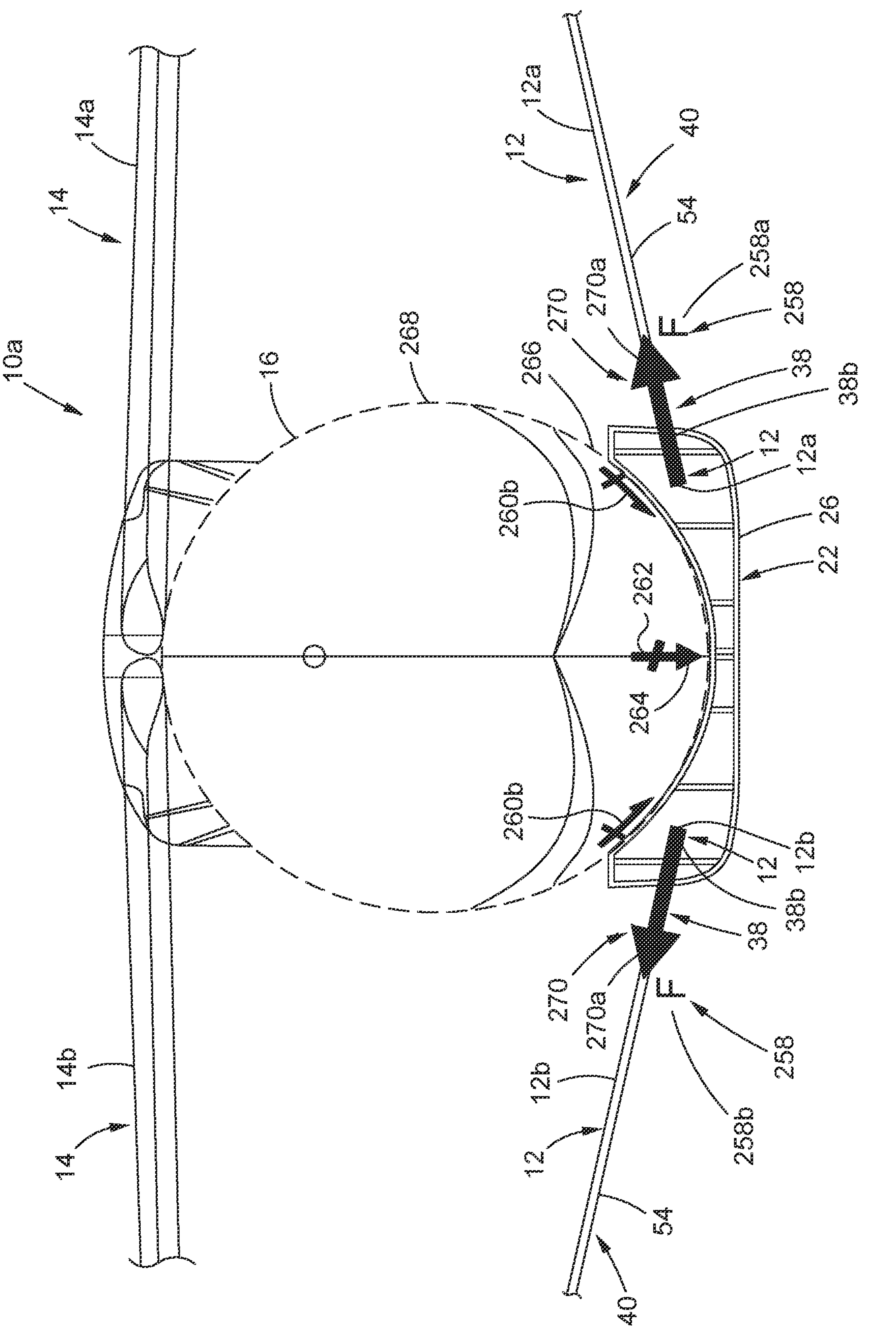
FIG. 11B is an illustration of a partial front view of the aircraft and strut assemblies of FIG. 11A, showing symmetric load paths through the strut assemblies having compression springs.
Figure 11C:
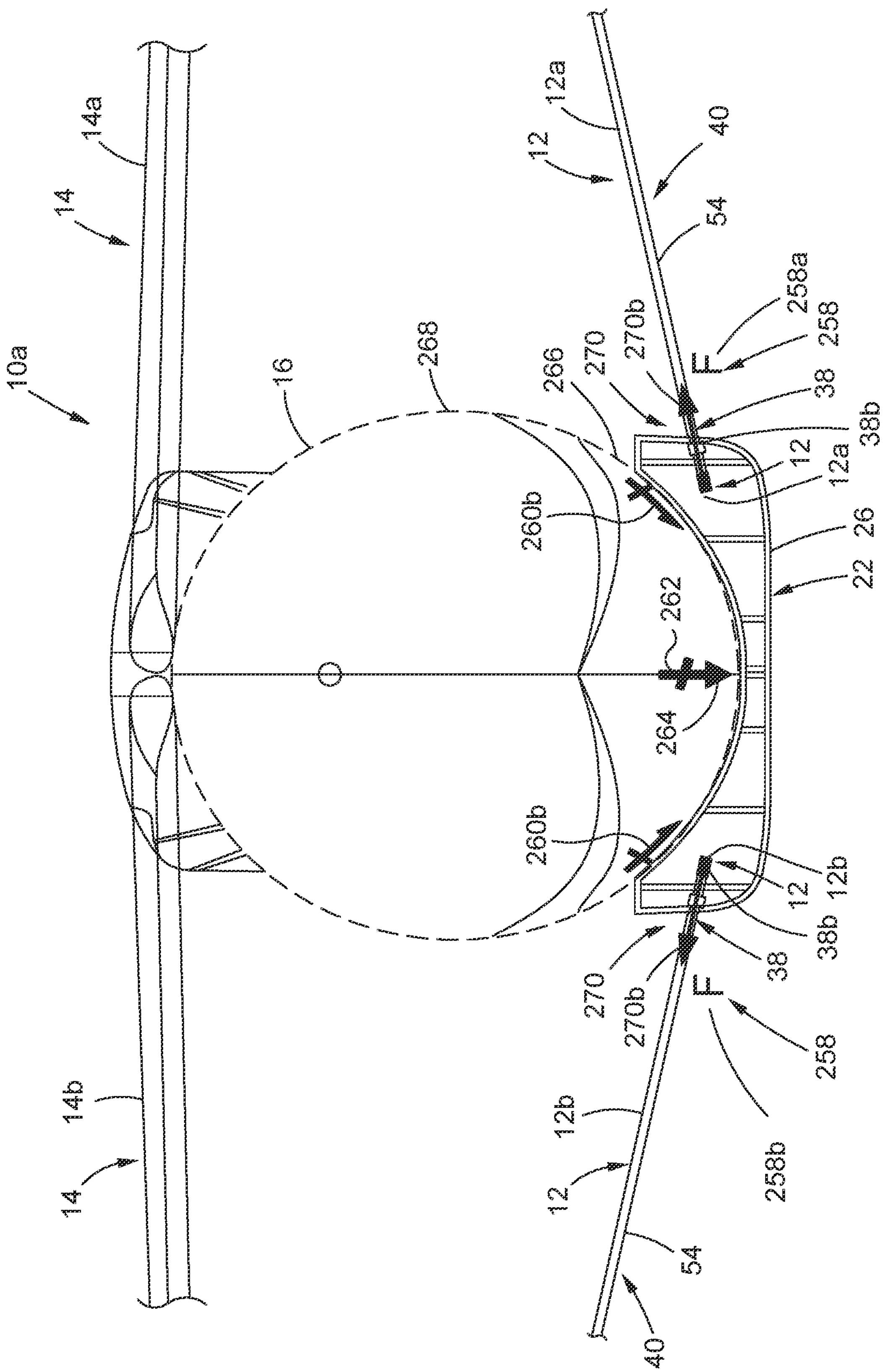
FIG. 11C is an illustration of a partial front view of the aircraft and strut assemblies of FIG. 11B, showing symmetric load paths through the strut assemblies having compression springs.

Now referring to FIGS. 11A-11C, FIG. 11A is an illustration of a partial front view of an aircraft 10*a* with exemplary versions of strut assemblies 12 of the disclosure, showing load paths 38, in the form of asymmetric load paths 38*a*, through the strut assemblies 12. FIG. 11B is an illustration of a partial front view of the aircraft 10*a* and strut assemblies 12 of FIG. 11A, showing load paths 38, in the form of symmetric load paths 38*b*, through the strut assemblies 12. FIG. 11C is an illustration of a partial front view of the aircraft 10*a* and strut assemblies 12 of FIG. 11B, showing load paths 38, in the form of symmetric load paths 38*b*, that are small symmetric load paths 38*c* through the strut assemblies 12 having compression springs 126 (see FIGS. 5A, 8B).

As shown in FIGS. 11A-11C, the aircraft 10*a* comprises the wings 14, such as the first wing 14*a* and the second wing 14*b*, attached to the fuselage 16, and extending from the fuselage 16, and comprises the fuselage structure 22 such as the bulkhead 26. As further shown in FIGS. 11A-11C, the strut assemblies 12 comprising the first strut assembly 12*a* and the second strut assembly 12*b*, each have the strut 40, such as the strut tension member 54.

As shown in FIG. 11A, the load paths 38, such as the asymmetric load paths 38*a*, show asymmetric forces 256, such as a first asymmetric force 256*a* and a second asymmetric force 256*b*, carried in the strut assemblies 12. The first asymmetric force 256*a*, or tension load 134 (see FIG. 1), carried in the first strut assembly 12*a* has a greater amount of tension 136 (see FIG. 1) than the second asymmetric force 256*b*, or tension load 134 (see FIG. 1), carried in the second strut assembly 12*b*. For example, the first asymmetric force 256*a* has a large tension load, and the second asymmetric force 256*b* has a small tension load. FIG. 11A shows reaction arrows 260*a* at the bulkhead 26 in reaction to the asymmetric forces 256.

As shown in FIG. 11B, the load paths 38, such as the symmetric load paths 38*b*, show symmetric forces 258, such as a first symmetric force 258*a* and a second symmetric force 258*b*, carried in the strut assemblies 12. The first symmetric force 258*a*, or tension load 134 (see FIG. 1), carried in the first strut assembly 12*a*, and the second symmetric force 258*b*, or tension load 134 (see FIG. 1), carried in the second strut assembly 12*b*, are approximately the same amount of tension 136 (see FIG. 1). The very large horizontal component of the axial tension in the strut 40, such as the strut tension member 54, balance out. As shown in FIG. 11B, a remaining kick load 262 in a vertical direction 264 is carried by the bulkhead 26 as a simply supported beam supported at a side-of-body location 266. The load is then shear by the bulkhead 26 into a fuselage skin 268 (see FIG. 11B). FIG. 11B further shows reaction arrows 260*b* at the bulkhead 26 in reaction to the symmetric forces 258. As shown in FIG. 11B, the symmetric force 258 is a force 270 comprising a large force 270*a*.

As shown in FIG. 11C, the load paths 38, such as the symmetric load paths 38*b*, show symmetric forces 258, such as a first symmetric force 258*a* and a second symmetric force 258*b*, carried in the strut assemblies 12, and are small symmetric forces 258*c*, as compared to the larger symmetric forces 258 in FIG. 11B. The first symmetric force 258*a*, or tension load 134 (see FIG. 1), carried in the first strut assembly 12*a*, and the second symmetric force 258*b*, or tension load 134 (see FIG. 1), carried in the second strut assembly 12*b*, are approximately the same amount of tension 136 (see FIG. 1). The very large horizontal component of the axial tension in the strut 40, such as the strut tension member 54, balance out. As shown in FIG. 11C, a remaining kick load 262 in a vertical direction 264 is carried by the bulkhead 26 as a simply supported beam supported at a side-of-body location 266. The load is then shear by the bulkhead 26 into a fuselage skin 268 (see FIG. 11C). FIG. 11C further shows reaction arrows 260*b* at the bulkhead 26 in reaction to the symmetric forces 258. As shown in FIG. 11C, the symmetric force 258 is a force 270 comprising a small force 270*b*, as compared to the large force 270*a* in FIG. 11B.

Figure 12A:
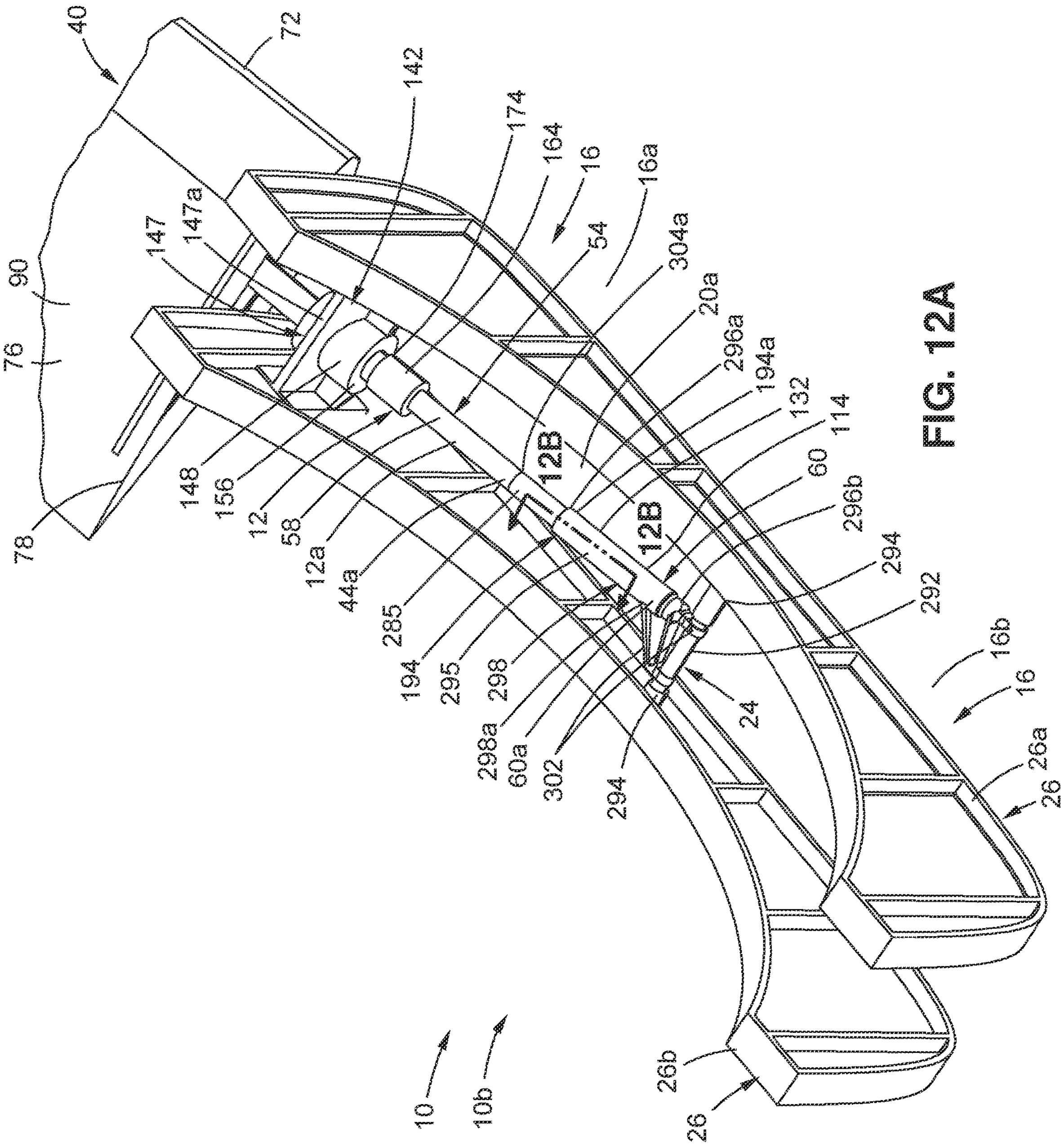
FIG. 12A is an illustration of an enlarged top perspective view of another version of a strut assembly having a hydraulic system.
Figure 12B:
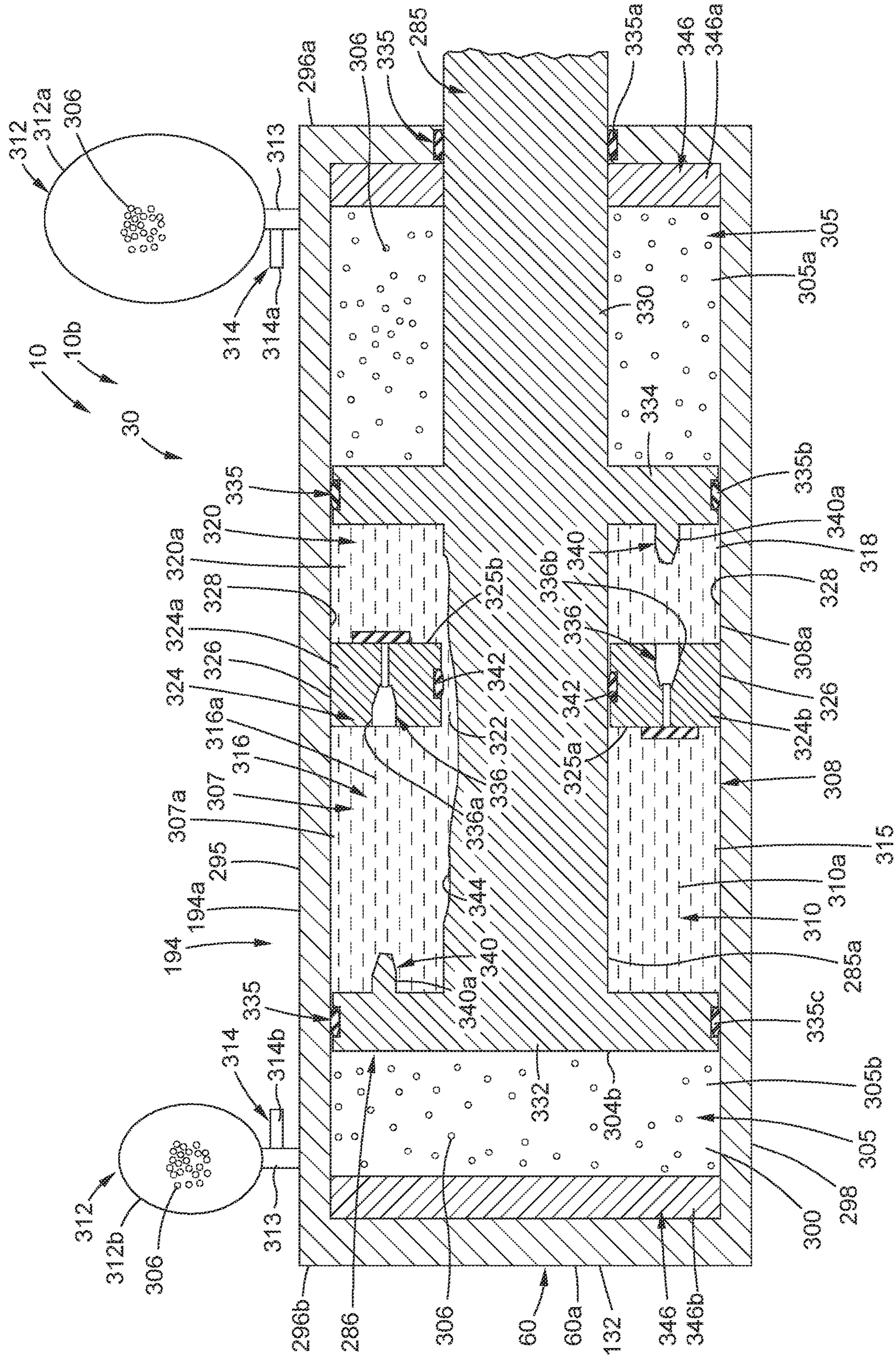
FIG. 12B is an illustration of an enlarged top view of the hydraulic system of FIG. 12A, taken along lines 12B-12B of FIG. 12A, showing the hydraulic system with a piston in a first piston position.
Figure 12C:
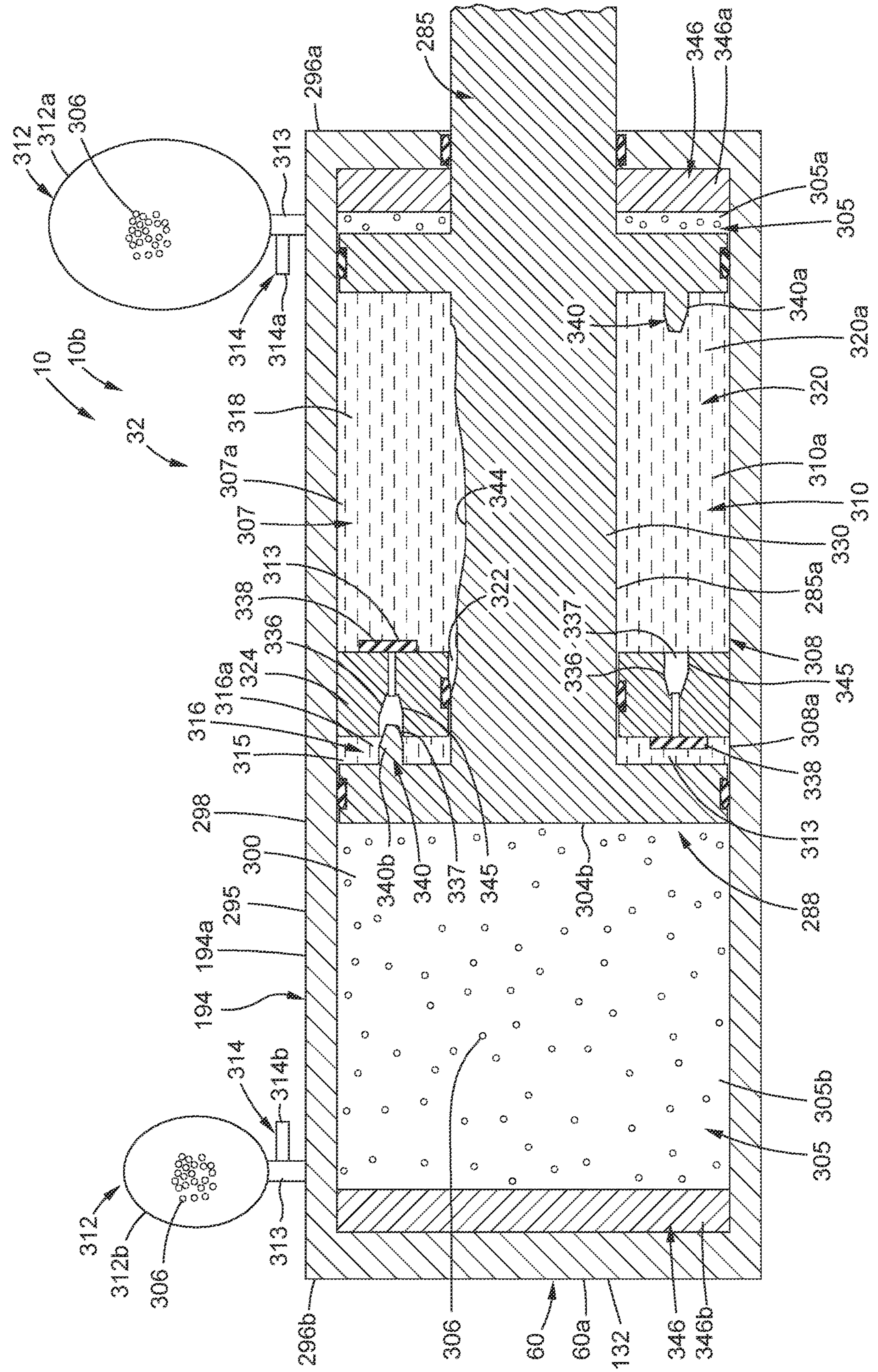
FIG. 12C is an illustration of an enlarged top view of the hydraulic system of FIG. 12A, showing the hydraulic system with the piston in a second piston position.
Figure 12D:
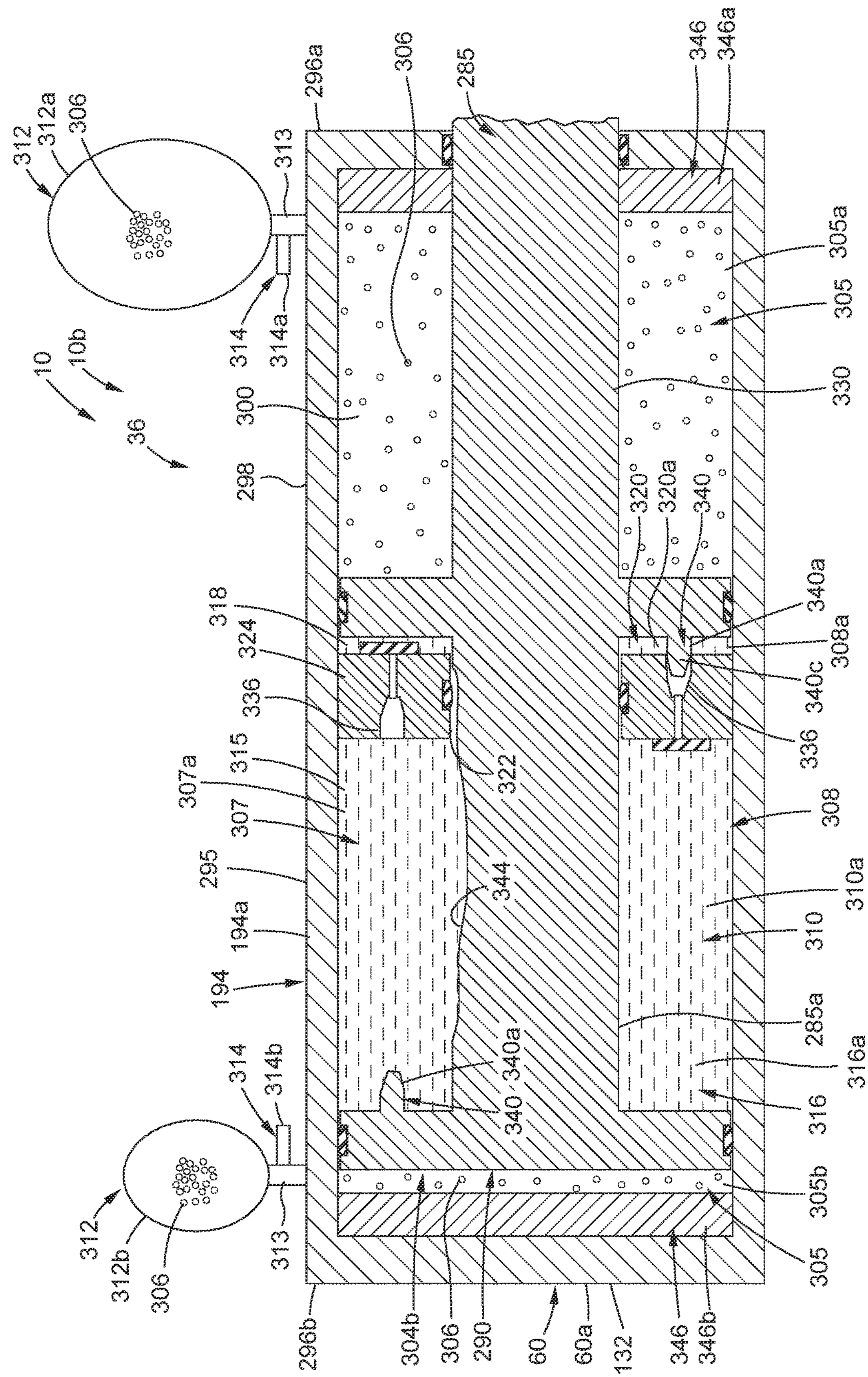
FIG. 12D is an illustration of an enlarged top view of the hydraulic system of FIG. 12A, showing the hydraulic system with the piston in a third piston position.

Now referring to FIGS. 12A-12D, FIGS. 12A-12D show a vehicle 10, such as an aircraft 10*b*, with another version of a strut assembly 12 having a hydraulic system 194, such as a hydraulic spring system 194*a*. The hydraulic system 194 may also be referred to as a hydraulic dampener system. FIG. 12A is an illustration of an enlarged top perspective view of the vehicle 10, such as the aircraft 10*b*, with another version of the strut assembly 12 having the hydraulic system 194, such as the hydraulic spring system 194*a*. FIG. 12B is an illustration of an enlarged top view of the hydraulic system 194 of FIG. 12A, taken along lines 12B-12B, showing the hydraulic system 194 with a piston 285 in a first piston position 286, where the vehicle 10, such as the aircraft 10*b*, is in the 1 g on ground condition 30. Alternatively, the first piston position 286 may comprise an intermediate piston position between the 2.5 g up-bending of wing flight condition 32 of the vehicle 10, such as the aircraft 10*b*, shown in FIG. 12C, and the minus 1 g pushover flight condition 36 of the vehicle 10, such as the aircraft 10*b*, shown in FIG. 12D. FIG. 12C is an illustration of an enlarged top view of the hydraulic system 194 of FIG. 12A, showing the hydraulic system 194 with the piston 285 in a second position 288, where the vehicle 10, such as the aircraft 10*b*, is in the 2.5 g up-bending of wing flight condition 32. FIG. 12D is an illustration of an enlarged top view of the hydraulic system 194 of FIG. 12A, showing the hydraulic system 194 with the piston 285 in a third position 290, where the vehicle 10, such as the aircraft 10*b*, is in the minus 1 g pushover flight condition 36.

As shown in FIG. 12A, the strut assembly 12, such as the first strut assembly 12*a*, has the hydraulic system 194, such as the hydraulic spring system 194*a*, disposed in the interior 20*a* of the fuselage 16, and in particular, the left portion 16*a* of the fuselage 16, of the vehicle 10, such as the aircraft 10*b*. As shown in FIG. 12A, the hydraulic system 194 is positioned axially between the second fitting element 164 and the center fitting 24, such as in the form of a hydraulic mounting pin 292. The first strut assembly 12*a* with the hydraulic system 194 is positioned to the left of the center fitting 24, such as the hydraulic mounting pin 292. As shown in FIG. 12A, the hydraulic mounting pin 292 has ends 294 attached to the bulkheads 26, such as the forward bulkhead 26*a* and the aft bulkhead 26*b*. The center fitting 24, such as the hydraulic mounting pin 292, is positioned in the center, or middle, of the fuselage 16. Although FIG. 12A only shows the first strut assembly 12*a*, another strut assembly 12 with a hydraulic system 194 is configured to be positioned opposite the first strut assembly 12*a*, and in a mirror image to, the first strut assembly 12*a* on the other side of the hydraulic mounting pin 292, at the right portion 16*b* of the fuselage 16. As shown in FIG. 12A, the strut assembly 12 with the hydraulic system 194 is positioned between the bulkheads 26, such as the forward bulkhead 26*a* and the aft bulkhead 26*b*.

As further shown in FIG. 12A, the hydraulic system 194 comprises a tensioner member 60, such as a spring member 60*a*, for example, a hydraulic spring 132 in the form of a cylinder 295, such as a main cylinder, having a first end 296*a* and a second end 296*b*, and an exterior 298 (see also FIGS. 12B-12D) and an interior 300 (see FIGS. 12B-12D). The second end 296*b* of the cylinder 296 and an exterior portion 298*a* (see FIG. 12A) of the cylinder 296 are coupled, or attached, to the hydraulic mounting pin 292, via a mounting arm 302 (see FIG. 12A). The cylinder 295 may be secured to the hydraulic mounting pin 292 via the mounting arm 302, or via another suitable securement structure. Alternatively, the cylinder 295 may be secured directly to the hydraulic mounting pin 292 or other center fitting 24 (see FIG. 1), and the mounting arm 302 is not used. The mounting arm 302 is an optional feature. The piston 285, such as an inner cylinder or secondary cylinder, extends from, and is movable in and out of, the first end 296*a* of the cylinder 295, and a portion 285*a* (see FIGS. 12B-12D) of the piston 285 is positioned within the interior 300 (see FIGS. 12B-12D) of the cylinder 295. The piston 285 has a first end 304*a* (see FIG. 12A) coupled, or attached, to the inboard end 44*a* of the strut tension member 54, such as the rod 58, and a second end 304*b* (see FIGS. 12B-12D) within the interior 300 of the cylinder 295. As shown in FIG. 12A, the strut tension member 54, such as the rod 58, is coupled to, and inserted through, the second fitting element 164, is coupled to, and inserted through, the first fitting element 142, and is coupled to, and inserted through, the strut structure 72 of the strut 40. Although FIG. 12A shows the cylinder 295 attached to the hydraulic mounting pin 292 and the piston 285 attached to the strut tension member 54, in other versions, the cylinder 295 may be attached to another fuselage structure 22 (see FIG. 1), or to the strut tension member 54, or to another structure of the strut assembly 12, and the piston 285 may be attached to another structure of the strut assembly 12, or to the hydraulic mounting pin 292, or to another fuselage structure 22. One end, such as the second end 296*b* (see FIG. 12A), of the hydraulic spring 132, in the form of the cylinder 295, is attached to the fuselage structure 22 (see FIG. 1), such as the center fitting 24 (see FIG. 12A), for example, the hydraulic mounting pin 292 (see FIG. 12A), that does not move. The other end, such as the first end 296*a* (see FIG. 12A), of the hydraulic spring 132, in the form of the cylinder 295, is coupled, or attached, to the piston 285, which, in turn, has the first end 304*a* (see FIG. 12A) coupled, or attached, to the strut tension member 54 (see FIG. 12A) that moves with the strut 40 (see FIG. 12A).

As further shown in FIG. 12A, the strut assembly 12 comprises the strut 40 comprising the strut tension member 54 within the strut structure 72, and the strut structure 72 comprises the airfoil section 78 and has the strut skin 90 on the exterior 76 of the strut structure 72. FIG. 12A shows the first fitting element 142 is comprised of the load spanning beam 147, such as the I-beam portion 147*a*, and the cylindrical portion 148 inserted, or formed, through and fixedly attached to the I-beam portion 147*a*. FIG. 12A further shows the bearing surface 174 of the second fitting element 164 facing outboard and opposite the bearing surface 156 of the first fitting element 142.

FIGS. 12B-12D show the hydraulic system 194, such as the hydraulic spring system 194*a*, comprising the tensioner member 60, such as the spring member 60*a*, for example, the hydraulic spring 132 in the form of the cylinder 295 having the first end 296*a* and the second end 296*b*, and the exterior 298 and the interior 300. FIGS. 12B-12D further show the portion 285*a* of the piston 285, including the first end 296*a* of the piston 285, positioned in the interior 300 of the cylinder 295. FIGS. 12B-12D show a range of motion for the piston 285. FIG. 12B shows the piston 285 in the first piston position 286, where the vehicle 10, such as the aircraft 10*b*, is in the 1 g on ground condition 30. Alternatively, the first piston position 286 may comprise an intermediate piston position between the 2.5 g up-bending of wing flight condition 32 (see FIG. 12C), and the minus 1 g pushover flight condition (see FIG. 12D). FIG. 12C shows the piston 285 in the second position 288, where the vehicle 10, such as the aircraft 10*b*, is in the 2.5 g up-bending of wing flight condition 32, and FIG. 12D shows the piston 285 in the third position 290, where the vehicle 10, such as the aircraft 10*b*, is in the minus 1 g pushover flight condition 36.

As shown in FIGS. 12B-12D, the hydraulic system 194, such as the hydraulic spring system 194*a*, further comprises one or more gas chambers 305 within the interior 300 of the cylinder 295. FIGS. 12A-12D show two gas chambers 305, including a first gas chamber 305*a* near the first end 296*a* of the cylinder 295 and a second gas chamber 305*b* near the second end 296*b* of the cylinder 295. However, the number of gas chambers 305 may be one gas chamber 305 or more than two gas chambers 305. Each gas chamber 305 contains compressed gas 306 (see FIGS. 12B-12D), such as nitrogen gas or another suitable gas. As shown in FIGS. 12B-12D, the two gas chambers 305 are separated from each other with a fluid damper system 307, such as an oil damper system 307*a*, comprising a fluid chamber 308, such as an oil chamber 308*a*, containing a fluid 310, such as oil 310*a*. The hydraulic system 194, such as the hydraulic spring system 194*a*, may optionally comprise one or more gas reservoirs 312 coupled, or attached, to the cylinder 295, for example, to the exterior 298 of the cylinder 295. As shown in FIGS. 12B-12D, the gas reservoirs 312 include a first gas reservoir 312*a* near the first end 296*a* of the cylinder 295 and a second gas reservoir 312*b* near the second end 296*b* of the cylinder 295. However, the number of gas reservoirs 312 may be one gas reservoir 312 or more than two gas reservoirs 312. Each gas reservoir 312 has a valve 313, such as a pressure service valve 314 (see FIGS. 12B-12D) attached to the gas reservoir 312. As shown in FIGS. 12B-12D, the first gas reservoir 312*a* has a first pressure service valve 314*a* and the second gas reservoir 312*b* has a second pressure service valve 314*b*. The gas reservoirs 312 are used to set the spring rate 116 (see FIG. 1) of the hydraulic system 194. A differential of the volume of compressed gas 306 in the first gas chamber 305*a* and the second gas chamber 305*b* of the cylinder 295 sets a neutral point of the hydraulic system 194. The overall pressure of both gas reservoirs 312 sets the spring rate 116 of the hydraulic system 194. The pressure service valves 314 allow the pressures of the hydraulic system 194 to be set and maintained. As the piston 285 reduces the volume of the compressed gas 306 in either the first gas chamber 305*a* or the second gas chamber 305*b* of the hydraulic system 194, the spring rates 116 increase. It is possible to tune the load stroke curve of each gas chamber 305 by including the optional gas reservoir 312 on either the first end 296*a* and/or the second end 296*b* of the cylinder 295 of the hydraulic system 194.

The hydraulic spring 132 in the form of the cylinder 295 is preferably a thick-walled cylinder in which the spring effect is produced by applying a load to the compressed gas 306 in the cylinder 295, through the piston 285 entering at the center of the first end 296*a* of the cylinder 295. The hydraulic system 194 uses fluid 310, such as oil 310*a*, as the damper, and uses compressed gas 306 as the spring in the place of mechanical springs to absorb load.

As shown in FIGS. 12B-12D, the fluid damper system 307, such as the oil damper system 307*a*, of the hydraulic system 194 is positioned within the interior 300 of the cylinder 295 between the first gas chamber 305*a* and the second gas chamber 306*b*. As shown in FIGS. 12B-12D, the fluid damper system 307, such as the oil damper system 307*a*, has an opening chamber portion 315 containing an opening fluid volume 316, such as an opening oil volume 316*a*, of fluid 310, such as oil 310*a*. As further shown in FIGS. 12B-12D, the fluid damper system 307, such as the oil damper system 307*a*, has a closing chamber portion 318 containing a closing fluid volume 320, such as a closing oil volume 320*a*, of fluid 310, such as oil 310*a*. As the piston 285 extends through its travel, the fluid 310, such as oil 310*a*, in the hydraulic system 194 transitions back and forth between the opening chamber portion 315 and the closing chamber portion 318 of the fluid chamber 308, such as the oil chamber 308*a*, through an opening 322 (see FIGS. 12B-12D) in a baffle structure 324 (see FIGS. 12B-12D). The opening 322 provides communication between the opening chamber portion 315 and the closing chamber portion 318. The baffle structure 324 is positioned between the opening chamber portion 315 and the closing chamber portion 318, so that the opening chamber portion 315 abuts an opening side 325*a* (see FIG. 12B) of the baffle structure 324, and the closing chamber portion 318 abuts a closing side 325*b* (see FIG. 12B) of the baffle structure 324. As shown in FIG. 12B, the baffle structure 324 has a first baffle structure portion 324*a* and a second baffle structure portion 324*b*, each with an exterior end 326 attached to an interior wall 328 of the cylinder 295. A piston rod body 330 (see FIGS. 12B-12D) of the piston 285 extends, and moves back and forth, through the opening 322 (see FIG. 12B) of the baffle structure 324.

As further shown in FIG. 12B, the fluid chamber 308, such as the oil chamber 308*a*, is contained, or bordered by a piston head 332 and a piston flange 334, such as an O-ring, mounted to the interior wall 328 of the cylinder 295, and sealed with one or more piston seals 335. As shown in FIG. 12B, the piston seals 335 comprise a first piston seal 335*a* at the piston rod body 330 and the first end 296*a* of the cylinder 295, a second piston seal 335*b* at the piston flange 334, and a third piston seal 335*c* at the piston head 332. The baffle structure 324 has variable orifices 336 (see FIGS. 12B-12D), such as a first variable orifice 336*a* (see FIG. 12B) and a second variable orifice 336*b* (see FIG. 12B), formed within the baffle structure 324. Each variable orifice 336 has an opening 337 (see FIG. 12C) at one end, and a valve 313, such as a one-way valve 338 (see FIG. 12C), at the other end. The one-way valves 338 only allow fluid 310, such as oil 310*a*, to travel in one direction. Each variable orifice 336 is configured to receive, and receives, a metering pin 340 (see FIGS. 12B-12D), such as a bottoming metering pin 340*a* (see FIGS. 12B-12D), into the opening 337. As shown in FIG. 12C, a first bottoming metering pin 340*b* is inserted into the first variable orifice 336*a*, and as shown in FIG. 12D, a second bottoming metering pin 340*c* is inserted into the second variable orifice 336*b*. As shown in FIG. 12B, the baffle structure 324 further has one or more baffle structure seals 342 configured to seal between the baffle structure 324 and the piston rod body 330 axially extending through the opening 322, to seal flow of fluid 310, such as oil 310*a*.

As shown in FIGS. 12B-12D, the fluid damper system 307, such as the oil damper system 307*a*, of the hydraulic system 194 further has a bi-directional damping profile 344 of the piston rod body 330 of the piston 285 included in the cylinder 295, that sets a variable orifice profile 345 (see FIG. 12C) that changes as a function of travel, as the piston 285 travels across the interior 300 of the cylinder 295. As shown in FIG. 12D, the bi-directional damping profile 344 in the cylinder 295 narrows and closes the opening 322 almost completely near the end of the travel of the piston 285. The bi-directional damping profile 344 and the opening 322 may be varied in size to change the damping characteristics across the stroke of the piston 285.

The variable orifices 336, such as the first variable orifice 336*a* and the second variable orifice 336*b*, couple the first baffle structure portion 324*a* and the second baffle structure portion 324*b* of the baffle structure 324, and the cross-sectional areas of the first variable orifice 336*a* and the second variable orifice 336*b* add to the size of the opening 322 (see FIGS. 12B-12D) and the bi-directional damping profile 344 (see FIGS. 12B-12D), in their respective directions. The first variable orifice 336*a* and the second variable orifice 336*b* allow for continued movement of the piston 285 after the opening 322 is closed off. The cross-sectional areas of the first variable orifice 336*a* and the second variable orifice 336*b* may be modified as the piston 285 nears the extent of its travel with the use of the metering pin 340 (see FIGS. 12B-12D), such as the bottoming metering pin 340*a* (see FIGS. 12B-12D). This allows damping to increase substantially as the piston 285 gets close to bottoming. With the use of one of the metering pins 340, such as the bottoming metering pins 340*a*, in each direction, the hydraulic system 194 is created that provides different load or stroke curves in each direction and prevents bottoming. In this version of the hydraulic system 194, the spring rate 116 (see FIG. 1), and the neutral position can be set by the gas pressure and sizes of the gas reservoirs 312 at each end of the cylinder 295.

As shown in FIGS. 12B-12D, the hydraulic system 194 further comprises one of more bottoming stops 346, such as a first bottoming stop 346*a* and a second bottoming stop 346*b*. The bottoming stop 346 is an optional feature. The bottoming stop 346 may be in the form of an elastomer type material or a crushable material that prevents impulse loading the strut 40 or fuselage structure 22 (see FIG. 1), such as the center fitting 24 (see FIG. 12A), should there be an overload or other issue that forces the piston 285 to bottom.

As shown in FIG. 12C, as the piston 285 nears bottoming near the first bottoming stop 346*a*, the gas pressure increases and resists the bottoming. If no optional gas reservoir 312 is included, the pressure and the load may increase substantially, thus stopping the piston 285. In addition, the metering pins 340 can close off the ability of the fluid 310, such as the oil 310*a*, to shift from one side of the baffle structure 324 to the other, such as from the opening side 325*a* to the closing side 325*b*, or from the closing side 325*b* to the opening side 325*a*, which also resists bottoming.

The hydraulic system 194, when present, is preferably positioned, or disposed, in the interior 20*a* (see FIG. 12A) of the fuselage 16 (see FIG. 12A). As shown in FIGS. 12A-12D, the hydraulic system 194 comprises at least one tensioner member 60, such as at least one spring member 60*a*, comprising at least one hydraulic spring 132 in the form of the cylinder 295, coupled, or attached, to the inboard end 44*a* (see FIG. 12A) of the strut tension member 54 (see FIG. 12A) of the strut assembly 12 (see FIG. 12A). The hydraulic spring 132 comprises a nonlinear spring 114 (see FIG. 12A) instead of a mechanical spring 112 (see FIG. 1) which is substantially linear, and the hydraulic spring 132 may minimize shock 195 (see FIG. 1) on the strut 40, such as the strut tension member 54, and may minimize shock 195 on the fuselage structure 22, such as the center fitting 24 (see FIG. 12A), when the second fitting element 164 (see FIG. 12A) engages the first fitting element 142 (see FIG. 12A). The spring rate 116 of the hydraulic spring 132 can change as a function of displacement or stroke. The hydraulic system 194 may provide a dampening solution for rapid strut length changes.

The hydraulic system 194 (see FIGS. 12A-12D) absorbs shock 195 (see FIG. 1) as a function of velocity 196 (see FIG. 1) of the extension and contraction of the piston 285 of the cylinder 295. The nonlinear characteristics of the hydraulic springs 132, and the hydraulic system 194, may be achieved using at least, one or more pistons 285, the plurality of piston seals 335, one or more gas chambers 305 configured for containing compressed gas 306, one or more fluid chambers 308 configured for containing a fluid 310, such as oil 310*a*, and separated by the baffle structure 324 having one or more variable orifices 336, and using one or more metering pins 340, and one or more valves 313, such as pressure service valves 314, one-way valves 338, and/or other suitable valves. The hydraulic system 194 may optionally comprise, as discussed above, one or more gas reservoirs 312 and one or more bottoming stops 346. The hydraulic system 194 may be a passive system or an active system. Preferably, the hydraulic system 194 is a passive system.

Figure 13:
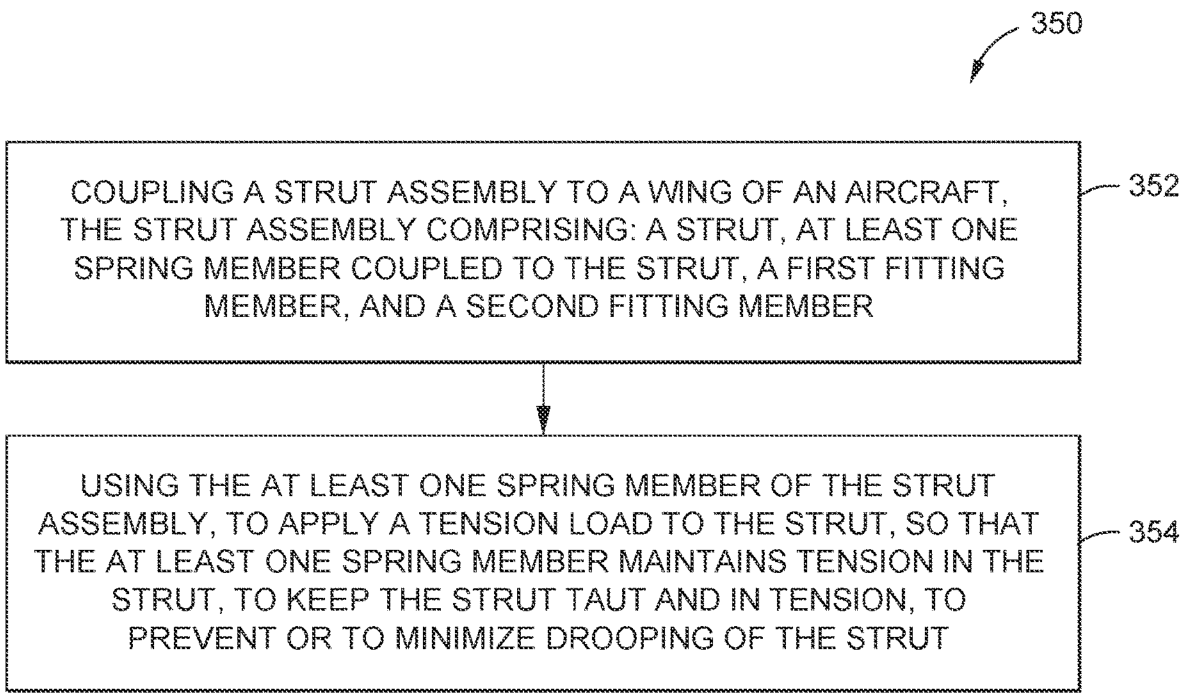
FIG. 13 is an illustration of a flow diagram of an exemplary version of a method of the disclosure.

Now referring to FIG. 13, FIG. 13 is an illustration of a flow diagram of an exemplary version of a method 350 of the disclosure. In another version of the disclosure, there is provided the method 350 of using a strut assembly 12 to maintain tension 136 (see FIG. 1) in a strut 40 (see FIGS. 1, 2A-2B) of a wing 14 (see FIGS. 1, 2A-2B) of a vehicle 10 (see FIGS. 1, 2A-2B), such as an aircraft 10*a* (see FIGS. 1, 2A-2B), or an aircraft 10*b* (see FIG. 4A).

The blocks in FIG. 13 represent operations and/or portions thereof, or elements, and lines connecting the various blocks do not imply any particular order or dependency of the operations or portions thereof, or elements. FIG. 13 and the disclosure of the steps of the method 350 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 13, the method 350 comprises the step 352 of coupling a strut assembly 12 (see FIGS. 1, 2A-2B) to the wing 14 of the vehicle 10, such as the aircraft 10*a*, or aircraft 10*b*. The strut assembly 12 comprises a strut 40 (see FIGS. 1, 2A-2B) having an outboard end 42 (see FIGS. 2A-2B), an inboard end 44 (see FIGS. 2A-2B) opposite the outboard end 42, and an elongate body 46 (see FIGS. 2A-2B) formed between the outboard end 42 and the inboard end 44. The outboard end 42 is coupled to the wing 14 of the aircraft 10*a*, or aircraft 10*b*, and the inboard end 44 is coupled to a fuselage 16 (see FIGS. 1, 2A-2B) of the aircraft 10*a*, or aircraft 10*b*.

As discussed above, in one version, the strut 40 comprises the strut tension member 54 (see FIGS. 1, 2A) axially positioned within an interior 74 (see FIG. 2A) of a strut structure 72 (see FIGS. 1, 2A). The strut structure 72 comprises an airfoil section 78 (see FIGS. 1, 3A-3C) having a structural leading edge 80 (see FIG. 2A) and a structural trailing edge 82 (see FIG. 2A).

The strut assembly 12 further comprises at least one tensioner member 60, such as at least one spring member 60*a* (see FIGS. 1, 4B, 5B, 6B), having a first end 108*a* (see FIGS. 4B, 5B, 6B) coupled to the strut 40, such as the strut tension member 54 (see FIGS. 4B, 5B, 6B), a second end 108*b* (see FIGS. 4B, 5B, 6B) opposite the first end 108*a*, and an extendable body 110 (see FIGS. 4B, 5B, 6B) formed between the first end 108*a* and the second end 108*b*. As shown in FIG. 1, the at least one spring member 60*a* comprises one of, a coil spring 124, a tension spring 125, a compression spring 126, a beam spring 127, a cantilever spring 128, a torsion spring 129, a leaf spring 130, a hydraulic spring 132, or another suitable spring member.

As discussed above, the strut assembly 12 further comprises the first fitting element 142 (see FIG. 1) having the through opening 154 (see FIG. 1) and the bearing surface 156 (see FIG. 1) facing inboard. The through opening 154 of the first fitting element 142 receives a first portion 155*a* (see FIGS. 5B, 5D) of the strut 40 extending through the first fitting element 142. The strut assembly 12 further comprises the second fitting element 164 (see FIGS. 1, 5B, 5D)) having the through opening 172 (see FIGS. 1, 5C, 5F) receiving a second portion 155*b* (see FIGS. 5B, 5D) of the strut 40 extending through the second fitting element 164. The second fitting element 164 has the bearing surface 174 (see FIGS. 1, 5B, 5E) facing outboard and opposite the bearing surface 156 of the first fitting element 142.

The strut assembly 12 may further comprise the bushing element 180 (see FIGS. 1, 5B, 5E) disposed within the through opening 154 of the first fitting element 142. The bushing element 180 has the opening 182 (see FIGS. 1, 5B, 5E) receiving the first portion 155*a* of the strut 40 extending through both the bushing element 180 and the first fitting element 142.

The step 352 of coupling the strut assembly 12 further comprises, coupling the strut assembly 12 to the wing 14, wherein, when the vehicle 10, such as the aircraft 10*a*, or aircraft 10*b*, is on ground in, or at, a 1 g on ground condition 30 (see FIGS. 1, 4A, 8A), the at least one spring member 60*a* applies a tension load 134 (see FIG. 1), or tension force, on the strut tension member 54 to prevent or minimize drooping of the strut 40; and when the vehicle 10, such as the aircraft 10*a*, or aircraft 10*b*, is in flight in, or at, a 2.5 g up-bending of wing flight condition 32 (see FIGS. 1, 5A, 9A), when the wing 14 is bending up, a tension 136 (see FIG. 1) in the strut tension member 54 is about proportional, or proportional, to a vertical acceleration 34 (see FIG. 1) of the vehicle 10, such as the aircraft 10*a*, or aircraft 10*b*; and, when the vehicle 10, such as the aircraft 10*a* or aircraft 10*b*, is in flight in, or at, a minus 1 g pushover flight condition 36 (see FIGS. 1, 6A, 10A), when the wing 14 is bending down, the spring member 60*a* applies a tension load 134, or tension force, on the strut tension member 54, to prevent or to minimize drooping of the strut 40, and does not apply excessive tension load, or an excess of tension load 134, to the wing 14, thereby causing significant bending of the wing 14.

As shown in FIG. 13, the method 350 further comprises the step 354 of using the at least one spring member 60*a* of the strut assembly 12, to apply a tension load 134, or tension force, to the strut 40, so that the at least one spring member 60*a* maintains tension 136 in the strut 40, to always keep the strut 40 taut and in tension 136, to prevent or to minimize drooping of the strut 40, that is, to obtain droop prevention 138 (see FIG. 1) or droop minimization 140 (see FIG. 1) of the strut 40.

Figure 14:
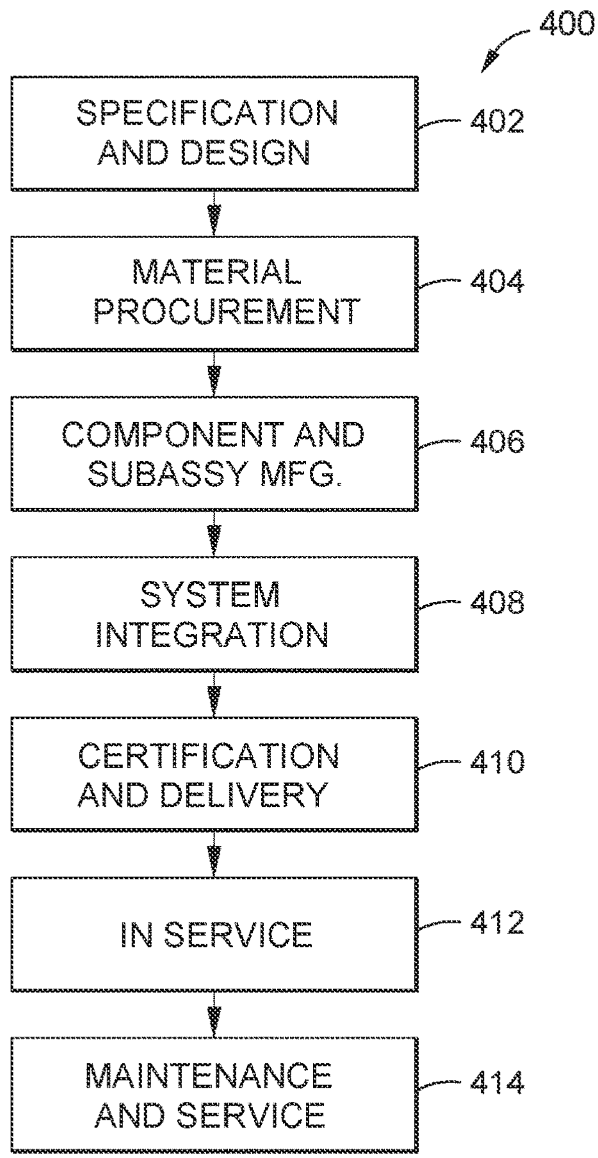
FIG. 14 is an illustration of a flow diagram of an exemplary aircraft manufacturing and service method.
Figure 15:
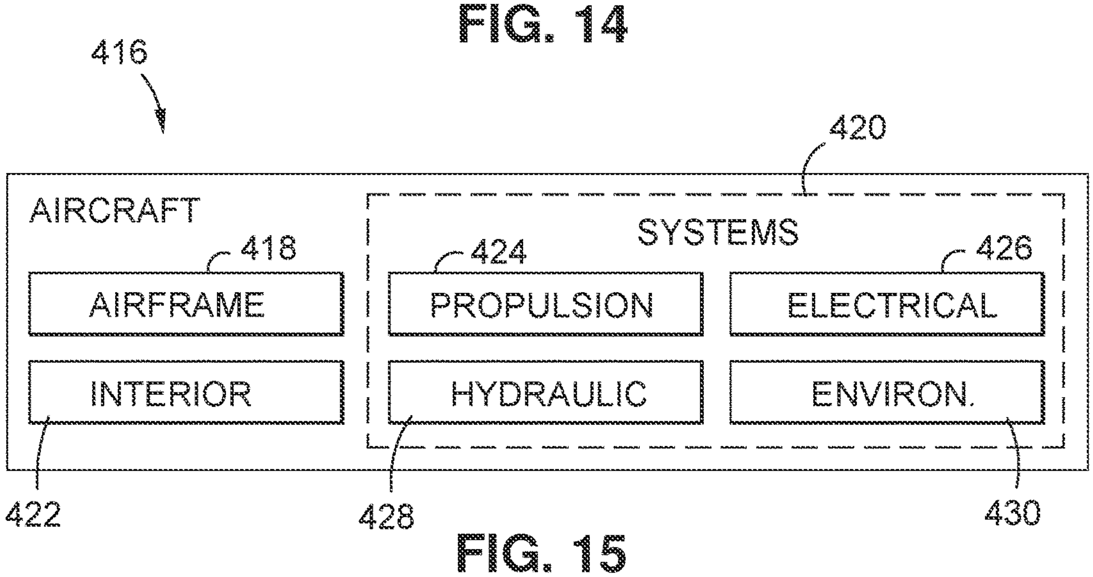
FIG. 15 is an illustration of an exemplary block diagram of an aircraft.

Now referring to FIGS. 14 and 15, FIG. 14 is an illustration of a flow diagram of an exemplary aircraft manufacturing and service method 400, and FIG. 15 is an illustration of an exemplary block diagram of an aircraft 416. Referring to FIGS. 14 and 15, versions of the disclosure may be described in the context of the aircraft manufacturing and service method 400 as shown in FIG. 14, and the aircraft 416 as shown in FIG. 15.

During pre-production, exemplary aircraft manufacturing and service method 400 may include specification and design 402 of the aircraft 416 and material procurement 404. During manufacturing, component and subassembly manufacturing 406 and system integration 408 of the aircraft 416 takes place. Thereafter, the aircraft 416 may go through certification and delivery 410 in order to be placed in service 412. While in service 412 by a customer, the aircraft 416 may be scheduled for routine maintenance and service 414 (which may also include modification, reconfiguration, refurbishment, and other suitable services).

Each of the processes of the aircraft manufacturing and service method 400 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 15, the aircraft 416 produced by the exemplary aircraft manufacturing and service method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included. Although an aerospace example is shown, the principles of the disclosure may be applied to other industries, such automotive.

Methods and systems embodied herein may be employed during any one or more of the stages of the aircraft manufacturing and service method 400. For example, components or subassemblies corresponding to component and subassembly manufacturing 406 may be fabricated or manufactured in a manner similar to components or subassemblies produced while the aircraft 416 is in service 412. Also, one or more apparatus embodiments, method embodiments, or a combination thereof, may be utilized during component and subassembly manufacturing 406 and system integration 408, for example, by substantially expediting assembly of or reducing the cost of the aircraft 416. Similarly, one or more of apparatus embodiments, method embodiments, or a combination thereof, may be utilized while the aircraft 416 is in service 412, for example and without limitation, to maintenance and service 414.

Disclosed versions of the strut assembly 12 (see FIGS. 1, 2A-2B, 5A, 5D), the aircraft 10*a* (see FIGS. 1, 2A-2B) or aircraft 10*b* (see FIGS. 4A, 5A, 5D) with the strut assembly 12 (see FIGS. 1, 2A-2B, 5A, 5D), and the method 350 (see FIG. 13) provide for an improved strut assembly 12 for a wing 14 of a vehicle 10 (see FIG. 1), such as an aircraft 10*a*, 10*b* (see FIG. 1), that is effective in tension 136 (see FIG. 1), while preserving a weight-savings aspect for the wing 14, that eliminates drooping of a strut 40, such as a strut tension member 54, for example, a cable 56 (see FIG. 1), a rod 58 (see FIG. 1), or a cord 59 (see FIG. 1), without adding unwanted weight, that avoids an excess of tension 136 (see FIG. 1) to the wing 14 to prevent bending stresses, that has a low aerodynamic drag and enables significant drag improvement because the width and area of the strut 40 is reduced, and that provides advantages over known strut members and strut assemblies. The strut assembly 12 includes a tensioner member 60 (see FIGS. 1, 5A, 5D), such as a spring member 60*a* (see FIGS. 1, 5A, 5D), that applies tension load 134 (see FIG. 1), or tension force, to the strut 40, such as the strut tension member 54, for example, the cable 56, of a strut-braced wing 14*c* (see FIG. 1), such that the strut 40, such as the strut tension member 54, for example, the cable 56, is in tension 136, when otherwise it would be slack under certain loading conditions. The tensioner member 60, such as the spring member 60*a*, maintains tension 136 in the strut 40, such as the strut tension member 54, for example, the cable 56, to keep the strut 40, such as the strut tension member 54, for example, the cable 56, taut and in tension 136, to prevent or to minimize drooping of the strut 40, such as the strut tension member 54, for example, the cable 56, thus obtaining droop prevention 138 (see FIG. 1), or droop minimization 140 (see FIG. 1). The strut assembly 12 with the strut 40, such as the strut tension member 54, for example, the cable 56, and with the tensioner member 60, such as the spring member 60*a*, eliminates or minimizes any drooping or droop of the strut 40, such as the strut tension member 54, for example, the cable 56, and minimizing additional weight to the aircraft 10*a*.

In addition, disclosed versions of the strut assembly 12 (see FIGS. 1, 2A-2B, 5A, 5C), the aircraft 10*a* (see FIGS. 1, 2A-2B) or aircraft 10*b* (see FIGS. 4A, 5A, 6D) with the strut assembly 12 (see FIGS. 1, 2A-2B, 5A, 5C), and the method 350 (see FIG. 13) enable increased efficiency for strut-braced wings 14*c* (see FIG. 1), and provide risk avoidance for aerodynamic instability of a strut that has no tension load 134. The strut assembly 12 is designed for load conditions 28, including the 1 g on ground condition 30 (see FIGS. 1, 8A), the 2.5 g up-bending of wing flight condition 32 (see FIGS. 1, 9A), and the minus 1 g pushover flight condition 36 (see FIGS. 1, 10A). The strut assembly 12 may be used with any aircraft, such as aircraft 10*a*, 10*b*, having strut-braced wings 14*c*, including small jet aircraft, large jet aircraft, commercial aircraft, military aircraft, cargo aircraft, and other types of aircraft. The strut assembly 12 is particularly suitable for large jet aircraft with high Mach numbers in a subsonic range, since low aerodynamic drag in the subsonic range is desirable.

Moreover, disclosed versions of the strut assembly 12 (see FIGS. 1, 2A-2B, 5A, 5C), the aircraft 10*a* (see FIGS. 1, 2A-2B) or aircraft 10*b* (see FIGS. 4A, 5A, 5D) with the strut assembly 12 (see FIGS. 1, 2A-2B, 5A, 5C), and the method 350 (see FIG. 13) provide for a strut assembly 12 with a strut 40, such as a strut tension member 54, for example, a cable 56 or a rod 58, that is never in compression or zero load, or always in tension 136 (see FIG. 1). The strut 40, such as the strut tension member 54 within a strut structure 72 (see FIG. 1) can have bending stiffness and still have benefit. For example, the tensioner member 60, such as the spring member 60*a*, handles the wing 14 in the down-bending position 251 (see FIG. 10A), in the minus 1 g pushover flight condition 36. In addition, the first fitting element 142 (see FIG. 8A), such as the side-of-body fitting 142*a* (see FIG. 8A), functioning as the stop element 160 (see FIG. 1), assists the wing 14 in the up-bending position 149 (see FIG. 9A), and the first fitting element 142 (see FIG. 8A), such as the side-of-body fitting 142*a*, carries load for the up-bending condition, for example, the 2.5 g up-bending of wing flight condition 32. The bushing element 180 (see FIGS. 1, 5B, 5D) allows for free movement of the strut 40, such as the strut tension member 54, for example, the cable 56, along the nominal axis of the strut tension member 54, for example, the cable 56. Further, in one version, where the strut 40 comprises the strut tension member 54 within the strut structure 72 (see FIG. 2B), the strut structure 72 may comprise a telescoping strut structure 72*c* (see FIG. 2B), with the strut assembly 12 within the interior 74 of the strut structure 72.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. A strut assembly for a wing of an aircraft, the strut assembly comprising:

a strut tension member axially positioned within a strut structure, the strut tension member having an outboard end, an inboard end opposite the outboard end, and an elongate body formed between the outboard end and the inboard end, the outboard end coupled to the wing of the aircraft, and the inboard end inserted through an opening of a fuselage of the aircraft and extending into an interior of the fuselage;

at least one spring member positioned in the interior of the fuselage, and having a first end coupled to the strut tension member, a second end opposite the first end, and an extendable body formed between the first end and the second end;

a first fitting element positioned in the interior of the fuselage and attached to, and spanning between, a forward bulkhead and an aft bulkhead in the interior of the fuselage, the first fitting element having a through opening and a bearing surface facing inboard, the through opening of the first fitting element receiving a first portion of the strut tension member extending through the first fitting element; and a second fitting element positioned in the interior of the fuselage and having a through opening receiving a second portion of the strut tension member extending through the second fitting element, the through opening of the second fitting element axially aligned with the through opening of the first fitting element, the second fitting element having a bearing surface facing outboard and opposite the bearing surface of the first fitting element, wherein the at least one spring member maintains tension in the strut tension member, to keep the strut tension member taut and in tension, to prevent or to minimize drooping of the strut tension member.

2. The strut assembly of claim 1, wherein the strut assembly further comprises a bushing element disposed within the through opening of the first fitting element, the bushing element having an opening receiving the first portion of the strut tension member extending through both the bushing element and the first fitting element.

3. The strut assembly of claim 1, wherein the strut tension member comprises one of, a cable, a rod, or a cord.

4. The strut assembly of claim 1, wherein the strut structure comprises an airfoil section having a structural leading edge and a structural trailing edge.

5. The strut assembly of claim 1, wherein the first fitting element, the second fitting element, and the at least one spring member are disposed in the interior of the strut structure, and the strut structure comprises a telescoping strut structure.

6. The strut assembly of claim 1, wherein the strut tension member is made of a material comprising one or more of, a composite material, including a carbon composite material, an aramid copolymer fiber material, a boron fiber composite material, or a metal material, including an aluminum material, a steel material, or a titanium material.

7. The strut assembly of claim 1, wherein the strut assembly has two spring members.

8. The strut assembly of claim 1, wherein the at least one spring member comprises one of, a coil spring, a tension spring, a compression spring, a beam spring, a cantilever spring, a torsion spring, a leaf spring, or a hydraulic spring.

9. The strut assembly of claim 1, wherein the strut assembly further comprises a hydraulic system disposed in an interior of the fuselage, and with the at least one spring member comprising at least one hydraulic spring in the form of a cylinder, the hydraulic system further comprising at least, one or more pistons, a plurality of piston seals, one or more gas chambers configured for containing a compressed gas, one or more fluid chambers configured for containing a fluid and separated by a baffle structure having one or more variable orifices, one or more metering pins, and one or more valves.

10. The strut assembly of claim 1, wherein the strut assembly further comprises an outer sheath coupled to one or more of, the at least one spring member, or the second fitting element.

11. An aircraft, comprising:

a fuselage;

two wings coupled to the fuselage, and extending from the fuselage opposite each other; and a strut assembly coupled to each wing, the strut assembly comprising:

a strut tension member axially positioned within a strut structure, the strut tension member having an outboard end, an inboard end opposite the outboard end, and an elongate body formed between the outboard end and the inboard end, the outboard end coupled to the wing of the aircraft, and the inboard end inserted through an opening of a fuselage of the aircraft and extending into an interior of the fuselage;

at least one spring member positioned in the interior of the fuselage and having a first end coupled to the strut tension member, a second end opposite the first end, and an extendable body formed between the first end and the second end;

a first fitting element positioned in an interior of the fuselage and attached to, and spanning between, a forward bulkhead and an aft bulkhead in the interior of the fuselage, the first fitting element having a through opening and a bearing surface facing inboard;

a bushing element disposed within the through opening of the first fitting element, the bushing element having an opening receiving a first portion of the strut tension member extending through both the bushing element and the first fitting element; and a second fitting element positioned in the interior of the fuselage and having a through opening receiving a second portion of the strut tension member extending through the second fitting element, the through opening of the second fitting element axially aligned with the through opening of the first fitting element, the second fitting element having a bearing surface facing outboard and opposite the bearing surface of the first fitting element, wherein the at least one spring member maintains tension in the strut tension member, to keep the strut tension member taut and in tension, to prevent or to minimize drooping of the strut tension member.

12. The aircraft of claim 11, wherein the strut tension member comprises one of, a cable, a rod, or a cord; of, and the strut structure comprises an airfoil section having a structural leading edge and a structural trailing edge.

13. The aircraft of claim 11, wherein when the aircraft is on ground in a 1 g on ground condition, the at least one spring member applies a tension load on the strut tension member, to prevent or to minimize drooping of the strut tension member.

14. The aircraft of claim 11, wherein when the aircraft is in flight in a 2.5 g up-bending of wing flight condition, when each wing is bending up, a tension in the strut tension member is proportional to a vertical acceleration of the aircraft.

15. The aircraft of claim 11, wherein when the aircraft is in flight in a minus 1 g pushover flight condition, when each wing is bending down, the spring member applies a tension load on the strut tension member, to prevent or to minimize drooping of the strut tension member.

16. A method of using a strut assembly to maintain tension in a strut of a wing of an aircraft, the method comprising the steps of:

coupling the strut assembly to the wing of the aircraft, the strut assembly comprising:

the strut comprising a strut tension member axially positioned within a strut structure, the strut tension member having an outboard end, an inboard end opposite the outboard end, and an elongate body formed between the outboard end and the inboard end, the outboard end coupled to the wing of the aircraft, and the inboard end inserted through an opening of a fuselage of the aircraft and extending into an interior of the fuselage;

at least one spring member positioned in the interior of the fuselage and having a first end coupled to the strut tension member, a second end opposite the first end, and an extendable body formed between the first end and the second end;

a first fitting element positioned in the interior of the fuselage and attached to, and spanning between, a forward bulkhead and an aft bulkhead in the interior of the fuselage, the first fitting element having a through opening and a bearing surface facing inboard, the through opening of the first fitting element receiving a first portion of the strut tension member extending through the first fitting element; and a second fitting element positioned in the interior of the fuselage and having a through opening receiving a second portion of the strut tension member extending through the second fitting element, the through opening of the second fitting element axially aligned with the through opening of the first fitting element, the second fitting element having a bearing surface facing outboard and opposite the bearing surface of the first fitting element; and using the at least one spring member of the strut assembly, to apply a tension load to the strut tension member, so that the at least one spring member maintains tension in the strut tension member, to keep the strut tension member taut and in tension, to prevent or to minimize drooping of the strut tension member.

17. The method of claim 16, wherein the step of coupling the strut assembly further comprises, coupling the strut assembly to the wing, wherein the strut assembly further comprises a bushing element disposed within the through opening of the first fitting element, the bushing element having an opening receiving the first portion of the strut tension member extending through both the bushing element and the first fitting element.

18. The method of claim 16, wherein the step of coupling the strut assembly further comprises, coupling the strut assembly to the wing, wherein the strut tension member comprises one of, a cable, a rod, or a cord.

19. The method of claim 16, wherein the step of coupling the strut assembly further comprises, coupling the strut assembly to the wing, wherein the strut structure comprises an airfoil section having a structural leading edge and a structural trailing edge.

20. The method of claim 16, wherein the step of coupling the strut assembly further comprises, coupling the strut assembly to the wing, wherein:

when the aircraft is on ground in a 1 g on ground condition, the at least one spring member applies the tension load on the strut tension member, to prevent or to minimize drooping of the strut tension member;

when the aircraft is in flight in a 2.5 g up-bending of wing flight condition, when the wing is bending up, the tension in the strut tension member is proportional to a vertical acceleration of the aircraft; and when the aircraft is in flight in a minus 1 g pushover flight condition, when the wing is bending down, the at least one spring member applies the tension load on the strut tension member, to prevent or to minimize drooping of the strut tension member.

* * * * *

UNITED STATES PATENT AND TRADEMARK OFFICE

CERTIFICATE OF CORRECTION

PATENT NO. : 12,195,179 B2
APPLICATION NO. : 17/980545
DATED : January 14, 2025
INVENTOR(S) : Robert E. Grip et al.

It is certified that error appears in the above-identified patent and that said Letters Patent is hereby corrected as shown below:

In the Claims

Column 59, Claim 12, Line 35: Please delete "; of" after the word "cord" and before ", and".

Signed and Sealed this
Twenty-fifth Day of February, 2025

Coke Morgan Stewart
*Acting Director of the United States Patent and Trademark Office*